United States Patent
Makeev et al.

(10) Patent No.: US 11,259,037 B2
(45) Date of Patent: Feb. 22, 2022

(54) METHOD AND APPARATUS FOR DECODING A RECEIVED SET OF ENCODED DATA

(71) Applicant: V-NOVA INTERNATIONAL LIMITED, London (GB)

(72) Inventors: Ivan Makeev, London (GB); Balázs Keszthelyi, London (GB); Stergios Poularakis, London (GB); Michele Sanna, London (GB); Robert Ettinger, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 16/954,050

(22) PCT Filed: Dec. 6, 2018

(86) PCT No.: PCT/GB2018/053555
§ 371 (c)(1),
(2) Date: Jun. 15, 2020

(87) PCT Pub. No.: WO2019/111013
PCT Pub. Date: Jun. 13, 2019

(65) Prior Publication Data
US 2021/0084317 A1    Mar. 18, 2021

(30) Foreign Application Priority Data

Dec. 6, 2017   (EP) ..................................... 17386046
Feb. 8, 2018   (EP) ..................................... 18386002
(Continued)

(51) Int. Cl.
*H04N 19/436*    (2014.01)
*H04N 19/119*    (2014.01)
(Continued)

(52) U.S. Cl.
CPC ......... *H04N 19/436* (2014.11); *H04N 19/119* (2014.11); *H04N 19/129* (2014.11);
(Continued)

(58) Field of Classification Search
CPC .................................................. H04N 19/436
(Continued)

(56) References Cited

U.S. PATENT DOCUMENTS

| 2014/0254666 A1* | 9/2014 | Rapaka | H04N 19/33 |
| | | | 375/240.12 |
| 2015/0113159 A1* | 4/2015 | Gogoi | H04N 21/2402 |
| | | | 709/231 |

(Continued)

OTHER PUBLICATIONS

International Search Report and Written Opinion for PCT/GB2018/053555 dated Feb. 15, 2019.
(Continued)

*Primary Examiner* — Yulin Sun
(74) *Attorney, Agent, or Firm* — Workman Nydegger

(57) ABSTRACT

A method of decoding a received set of encoded data representing information that has been compressed, wherein the encoded data set is divided into a hierarchy of subsets, is provided. The method comprises: obtaining, from at least one first subset, a respective set of offset values; and decoding a plurality of second subsets, each comprising a data structure of metadata and data, to derive a series of data values, wherein each second subset corresponds to a region of the information that has been compressed. Each offset value is associated with a second subset and indicates a relative position within the encoded data set that corresponds to the earliest element of the associated second subset with respect to the position within the encoded data set that corresponds to an element of another subset of the hierarchy of subsets. The decoding the plurality of second subsets includes identifying for each second subset, based
(Continued)

on the set of offset values, the position within the encoded data that corresponds to the earliest element of the second subset. The method further comprises reconstructing the information that has been compressed from the data values.

19 Claims, 30 Drawing Sheets

(30) Foreign Application Priority Data

Jul. 30, 2018 (GB) .................................... 1812407
Sep. 21, 2018 (GB) .................................... 1815437

(51) Int. Cl.
*H04N 19/167* (2014.01)
*H04N 19/176* (2014.01)
*H04N 19/30* (2014.01)
*H04N 19/46* (2014.01)
*H04N 19/96* (2014.01)
*H04N 19/129* (2014.01)
*H04N 19/44* (2014.01)
*H04N 19/182* (2014.01)
*H04N 19/91* (2014.01)

(52) U.S. Cl.
CPC ......... *H04N 19/167* (2014.11); *H04N 19/176* (2014.11); *H04N 19/182* (2014.11); *H04N 19/30* (2014.11); *H04N 19/44* (2014.11); *H04N 19/46* (2014.11); *H04N 19/91* (2014.11); *H04N 19/96* (2014.11)

(58) Field of Classification Search
USPC ...................................................... 375/240.25
See application file for complete search history.

(56) References Cited

U.S. PATENT DOCUMENTS

| | | | |
|---|---|---|---|
| 2015/0304667 A1* | 10/2015 | Suehring | H04N 19/174 |
| | | | 375/240.02 |
| 2019/0268599 A1* | 8/2019 | Hannuksela | G06T 3/0062 |
| 2019/0297339 A1* | 9/2019 | Hannuksela | H04N 19/59 |

OTHER PUBLICATIONS

Chi Ching Chi et al., "Parallel Scalability and Efficiency of HEVC Parallelization Approaches", IEEE Transactions on Circuits and Systems for Video Technology, Institute of Electrical and Electronics Engineers, US, vol. 22, No. 12, Dec. 1, 2012, pp. 1827-1838, XP011486343, ISSN: 1051-8215, DOI: 10.1109/TCSVT.2012.2223056.

Misra K et al., "New Results for Parallel Decoding for Tiles", 97. MPEG Meeting; Jul. 18, 2011-Jul. 22, 2011; Torino; (Motion Picture Expert Group or ISO/IEC JTC1/SC29/WG11), No. m21028, Jul. 17, 2011, XP030049591, p. 1-p. 2.

* cited by examiner

*100*

| 2 | 3 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 1 | 2 | 2 | 2 | 0 | 0 | 0 | 0 | 0 | 0 | 0 | 0 | 0 | 0 | 0 | 0 |
| 1 | 0 | 1 | 0 | 0 | 0 | 0 | 0 | 0 | 0 | 0 | 0 | 0 | 0 | 0 | 0 |
| 0 | 2 | 0 | 0 | 0 | 0 | 0 | 0 | 0 | 0 | 0 | 0 | 0 | 0 | 0 | 0 |
| 0 | 1 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

*FIG. 8*

METHOD AND APPARATUS FOR DECODING A RECEIVED SET OF ENCODED DATA

RELATED CASES

The present application is a 371 US Nationalization of PCT International Patent Application No. PCT/GB2018/053555, filed Dec. 6, 2018, which claims priority to European Patent Application No(s) 17386046.1, filed Dec. 6, 2017, and 18386002.2, filed Feb. 8, 2018. Said PCT/GB2018/053555 also claims priority to United Kingdom Patent Application No(s). 1812407.3, filed Jul. 30, 2018, and 1815437.7, filed Sep. 21, 2018. The entire disclosures of the aforementioned applications are incorporated herein by reference.

TECHNICAL FIELD

The present invention relates to methods, apparatuses, computer programs, and computer-readable media for decoding a received set of encoded data representing information that has been compressed.

BACKGROUND

When transmitting, or storing, image and video data it is particularly advantageous to reduce the size of the data. Techniques for encoding and decoding such data are varied and well known. Contemporary techniques provide a compromise between processing efficiency, data quality, and data compression.

Images are typically represented digitally by representing the colours of an image by a set of components each having a value. For example, the colours of an image can be represented using an RGB colour model or the YCbCr colour space wherein each pixel of an image is represented by three different values.

To compress the data, planes of the image are usually split firstly into blocks of data elements, such as blocks of 8×8 pixels, and each block then undergoes a domain transformation. Examples include discrete cosine transform and wavelet transform implementations. As is well known in the art, transformation coding is used to capture correlation structures in the data. The transformed data is then quantised to represent the large set of values using a smaller set of values and then typically undergoes a further compression step, such as entropy encoding. Entropy coding utilises frequently occurring values, or sequences of values, within a dataset in order to reduce the volume of data. For example, an entropy coding technique compresses the digital data by representing frequently occurring patterns with few bits and rarely occurring patterns with many bits.

The efficacy of each step depends on the outcome of the previous step. That is, the transformation and quantisation processes are designed to make the next step in the process more effective. For example, overall compression can be made more effective if the transform and quantisation processes represent the values of the image with frequently occurring patterns so that the entropy coding step is more effectual.

In order to make the entropy encoding step more effectual, some contemporary transformation processes (which occur prior to entropy encoding) produce a large number of zero value data elements. Such a dataset having a large number of zero value elements, either grouped together or otherwise, can be referred to as a sparse dataset. Run length encoding is often performed as part of the encoding step to reduce these zero data values.

The output of the entropy coding operation is thus a stream of data and the decoding operation is performed in a mirrored manner to the encoding operation. First the stream of data is decoded to recreate the information. To generate a series of blocks, the stream is divided and mapped to a plane of data using an inverse of the process used at the encoder and the blocks are then arranged in their location in the plane according to the order in which the blocks were received in the stream. For example, in a typical JPEG algorithm the blocks are arranged in a zig-zag or serpentine pattern. The blocks are then de-quantised. The blocks are then domain transformed using, for example a wavelet or discrete cosine transformation.

There remains difficulty in optimising the decoding process for example to take advantage of parallel decoding optimisations or separate decoding of subsets of the stream. Each block is concatenated with the other blocks and sent as one stream and therefore to accurately install each transformed block in the correct location in the plane each of the previous blocks must have been decoded sequentially from the combined stream—the order of the blocks as they appear in the stream dictates the location of the block in the grid.

Similarly, to search for and access each block in a stream to allow for parallel or separate decoding is not possible without decoding the previous blocks. Additionally, some entropy encoding algorithms will conflate the blocks such that they can't be separated unless the entire steam is decoded in one entropy decoding operation. Alternatively, if each of the parts of the stream have a variable length (in most coding algorithms) identifying suitable boundaries in the data to enable separating the stream into subsets is difficult without compromising compression, further reinforcing the need for sequential decoding.

To implement parallel processing, it has previously been proposed to divide the image data into multiple parts and combine compressed streams. An alternative approach that has been proposed is to scan the compressed stream for boundaries in the encoded data or alternatively insert markers in the stream with predefined codes to aid the scanning process. None of the proposed approaches have been shown to be optimal.

It has been previously proposed to encode data in a hierarchical manner so as to reduce the overall data size of a signal. In such encoding techniques, residual data (i.e. the data required to correct low quality information present in a base layer) is used in progressively higher levels of quality. Such a hierarchical technique is described in WO 2013/171173, which proposes a tiered hierarchy of renditions of a signal. In this proposed technique, a base layer of quality represents the image at a first resolution and subsequent layers in the tiered hierarchy are residual data or adjustment layers necessary for the decoding side to reconstruct the image at a higher resolution. Techniques are proposed in WO 2013/171173 that structure the data in each layer to exploit correlation in the residual layers to reduce information entropy by transforming a block of values into a set of directional components. Each layer in this hierarchical technique, particularly each residual layer, is often a comparatively sparse dataset having many zero value elements.

The concept of a hierarchical, tiered data structure is also disclosed in earlier filed patent application GB1812407.3. Both of GB1812407.3 and WO 2013/171173 are incorporated by reference in their entirety.

It has previously been proposed to store sparse matrices using quadtrees. The techniques build a tree to store the spatial structure of the matrix. When considering any possible implementation of the known formats for reconstructing images using sparse matrices, each requires intensive memory usage. Each of the known formats that demonstrate efficiency gains require a large amount of data to be stored in memory to properly reconstruct the locations and values of the data in a matrix.

It remains a goal of industry to reduce the size of image and video data stored or transmitted and to reduce the processing time and memory utilisation of encoding or decoding sparse datasets in image reconstruction. There also exists a need for encoding and decoding techniques that facilitate parallel processing of stored and transmitted data representing information that has been compressed.

SUMMARY OF THE INVENTION

In accordance with a first aspect of the invention there is provided a method of decoding a received set of encoded data representing information that has been compressed, wherein the encoded dataset is divided into a hierarchy of subsets, the method comprising: obtaining, from at least one first subset, a respective set of offset values; decoding a plurality of second subsets, each comprising a data structure of metadata and data, to delve a series of data values, wherein each second subset corresponds to a region of the information that has been compressed, wherein each offset value is associated with a second subset and indicates a relative position within the encoded dataset that corresponds to the earliest element of the associated second subset with respect to the position within the encoded dataset that corresponds to an element of another subset of the hierarchy of subsets, and wherein the decoding the plurality of second subsets includes identifying for each second subset, based on the set of offset values, the position within the encoded data that corresponds to the earliest element of the second subset; and reconstructing the information that has been compressed from the data values.

The method advantageously allows subsets of a received set of encoded data to be located by obtaining location information in the form of offset values from a first subset. A benefit of providing, to a decoder for example, information as to where subsets of the received dataset begin, for instance in cases where the set is in the form of a received stream, is beneficial in that the decoder can fetch and decode each subset of data immediately, as soon as each subset has been received and located. In this way, the decoder is not required to process or decode a plurality of subsets in series, but may instead decode them in parallel, thereby increasing the speed and efficiency with which the set overall is decoded.

Typically, the received set is received as a stream, and each subset is a portion of that stream.

The set of offset values that is obtained from a subset may comprise one or more offset values. Thus the information obtained from each subset may provide information about the location of one or more second subsets. Preferably each offset value has a respective associated second subset. Likewise preferably each second subset has associated with it a respective offset value. In some embodiments, however, the correspondence between subsets and offset values is not necessarily one-to-one, as is explained later in this disclosure.

Information about the location of each second subset may be provided in the form of a relative position indication in accordance with the method. The relative position of the earliest element of a subset may be used to locate that earliest element, and thereby to locate the beginning of the subset in the set of data. A relative position may be thought of as a difference between two positions. Thus in some embodiments an offset value indicates a difference between the position within the encoded dataset that corresponds to the earliest element of an associated second subset and the position within the encoded dataset that corresponds to the earliest element of another subset. The term "difference" as used in this context may refer to a quantity of data, and typically to a length of a stream of data or a number of data elements, by which positions of two elements differ. A difference between two positions is preferably a signed value indicating a quantity of data indicating the relative position of one element with respect to another, the magnitude of which typically represents an amount of data or a length of a stream or portion of data. The sign of such a value may be implicitly signalled. For example, all offset values might be arranged to have the same sign so that the sign is implicitly known or so that it is signalled or transmitted only once for a plurality of such values.

A position can be thought of as information about where in a received set an element of data, or a data symbol, can be fetched. The positions corresponding to an element typically constitutes that position being the position of the element in the set. As noted above, generally a position means positional information that can be used, for example, by a decoder, to fetch the earliest, or another, element of a subset. Typically the position is that of the start of the first element, or information from which the position of the start of the first element can be inferred. In general, the element of the subset that is received earliest is what is meant by the term "earliest element". Thus it is typically the first element of the subset to be received by a decoder.

The term element may refer to any data element. Typically this term refers to a bit or a byte of data. It may refer to a data symbol or any type of data item that the received dataset may comprise. Typically, therefore, the earliest element of an associated second subset is or corresponds to the beginning of the second subset, and so an offset value allows that beginning or starting point within the stream or set to be located.

Typically, if the other subset referred to in the method is another of the plurality of second subsets, that other subset preferably has associated with it an offset value. Preferably the offset value associated with that other second subset precedes the offset value associated with the second subset. In this context, precedes typically means comes earlier in the received dataset, and is preferably therefore received earlier. In some embodiments, or in some cases, the other subset with respect to which an offset value provides location information on the associated second subset immediately precedes our second subset. In many cases, however, such pairs of subsets are separated by other data or other subsets, and are received or positioned in different orders in the received dataset.

In some embodiments, more than one offset value indicates a relative position of an associated second subset with respect to the same other subset in the hierarchy. Preferably the other subset, with respect to which an offset value indicates the position of the associated subset, is different for each of a plurality of, or more preferably all of, the offset values or the associated second subsets. The associations can be configured such that the numerical values of the offset values themselves are minimised, that is the sizes of the values are made as small as possible so as to occupy less data within the stream or set. Smaller offset values that comprise less data in themselves result in the data overhead in a received set that is attributable to the offset values being reduced. The benefit of this configuration may be understood, for instance, by comparison with an embodiment wherein multiple second subsets are associated with offset values that indicate positions relative to the same subset and those second subsets are increasingly distant in the received dataset from that other subset. In that comparative case, increasingly distant second subsets would have associated with them increasingly large offset values, whereas in the former case less data would be required for offset values that indicated relative positions of second subsets with respect to respective other subsets that are closer to those second subsets.

The other subset with respect to which an offset value indicates a relative position of an associated second subset may be a first subset, which is preferably in a lower tier in the hierarchy than the second subset, or it may be another of the plurality of the second subsets, which is preferably in the same tier. The position that is identified for each second subset as part of the decoding of the method is typically an absolute position, or may be a position relative to the start of the encoded dataset, or relative to a position corresponding to the first element at the same hierarchical level as the second subset. In some embodiments, the identified position may be relative to a predetermined or fiducial point within the received set or stream.

Typically the relative position indicated by each offset value corresponds to the earliest element of the associated second subset with respect to the position within the encoded dataset that corresponds to the earliest element of the other subset. In this case, the location of the beginning of each subset with respect to the beginning of the other subset can be acquired. This allows a simple sum operation over the offset values to be used to locate the beginning of a given second subset.

In other embodiments, the element of the other subset relative to which the position of the earliest element of the associated second subset is indicated may be any of the other elements of that other subset. As long as the location in the dataset of that element of the other subset is known, which may be the case because the relative position of that element with respect to the earliest element of its own subset is known, for example, then the offset value relative to that element can be used to locate the beginning of the associated second subset, and thus identify its position for decoding.

In some embodiments, an offset value simply indicates the positional difference between the earliest element of its associated second subset and an element of another subset. However, in other embodiments, offset values may be configured to represent a difference of those positional differences. Thus, in some embodiments an offset value indicates said relative position by way of comprising a value representing a difference between: a value indicating a relative position within the encoded dataset that corresponds to the earliest element of the associated second subset with respect to the position within the encoded dataset that corresponds to an element, or specifically the earliest element, of said other subset, and a value indicating a relative position within the encoded dataset that corresponds to said element, or the earliest element specifically, of said other subset with respect to the position within the encoded dataset that corresponds to an element, or specifically the earliest element, of a further subset. In cases where said other subset is a first subset, the offset value may instead indicate said difference by way of comprising a value equal to the value indicating the difference between the position within the encoded dataset that corresponds to the earliest element of the associated second subset and the position within the encoded dataset that corresponds to the earliest element of said other subset. Thus there might be no further subset, and the notional position within the encoded dataset that corresponds to the earliest, or other, element of the further subset may be assigned a value of zero.

Preferably, the identifying the position of a second subset comprises calculating the position as a sum of obtained offset values. That sum may include all or some of the offset values in a respective set obtained from a first subset, and may further include all or some of offset values obtained from one or more other respective first subsets. In such embodiments a decoder may perform a sum operation over a plurality of offset values in order to arrive at a value indicating the absolute position, or the position relative to the beginning of a stream or set or a predetermined starting point therein of a second subset.

In such embodiments, the offset values are preferably arranged as a series. The order of a series may be signalled explicitly by information in the first subset or subsets, or may be implicitly known or derived upon or after receipt of the dataset. Each respective set of offset values that is obtained may comprise a series of offset values. Multiple obtained sets may be arranged in a series such that the obtained superset of offset values comprises a series of offset values. In cases such as this, the identifying the position of a second subset may comprise calculating a sum of the offset values in the series preceding and including an offset value associated with the second subset. Calculating the sum typically comprises calculating a cumulative sum over the series of offset values, typically up to the offset value associated with a subset being located. In cases such as that noted above, wherein an offset value indicates a relative position by way of comprising a value representing a difference of positional differences, the cumulative sum up to and including an offset value associated with the second subset is typically equal to the difference between the position of the earliest element of said second subset and the position of the earliest element of another subset. In other cases, wherein an offset value associated with a second subset is equal to the difference between the position of the earliest element of said second subset and the position of the earliest element of another subset, the cumulative sum up to and including that offset value is typically equal to the position, or is an indicator thereof, of the earliest element of said second subset. It may otherwise be equal to the difference between the position of the earliest element of said second subset and the position of the earliest, or the latest, element of the first subset.

In some advantageous embodiments, decoding two or more of the plurality of second subsets is performed in parallel in accordance with the identifying of the subset positions.

Thus the decoding of two or more second subsets may overlap in time, or may be performed substantially simultaneously or occur or begin at the same time. Preferably, the decoding in parallel is performed by way of locating the first element of each of the plurality of second subsets prior to the decoding of the first of the plurality being completed. Locating the first element of each of the plurality of second subsets may be prior to the decoding of one or more of the plurality having begun.

Typically, obtaining the set of offset values comprises deriving from the first subset a set of metadata comprising the set of offset values.

In some embodiments, if a first subset contains information indicating a relative position within the encoded dataset that corresponds to the earliest element of a second subset with respect to the position within the encoded dataset that corresponds to the latest element of that first subset, the obtaining an offset value from said information is performed in accordance with a predetermined value indicating a relative position that corresponds to the earliest element of said first subset with respect to the position that corresponds to said latest element of said first subset. The latest element typically refers to the element that is received latest, or has the latest position, for example in the stream. This is as opposed to the earliest element of a subset. This is typically the case where the first subset is a header, such as a tertiary header. For such first subsets, obtaining an offset value can be thought of as being performed implicitly. This typically involves adding the difference value, that is adding a value that typically indicates the size or length of, or an amount of data in, the first subset.

Other first subsets, or first subsets of other types, may contain information indicating a difference between the position within the encoded dataset that corresponds to the earliest element of a second subset and the position within the encoded dataset that corresponds to the earliest element of that first subset. For such first subsets obtaining the offset value can be performed explicitly from that information.

In some embodiments, alternatively or additionally to parallel decoding, sequential decoding is performed. Thus, in some embodiments decoding two or more of the plurality of second subsets is performed sequentially. Such embodiments are appropriate for cases wherein it is desired to prioritise the decoding of portions of a stream on a slow data connection, for instance. In such embodiments, typically a first one of the set of offset values that corresponds to a first one of said two or more second subsets that is to be decoded earlier than a second one of said two or more second subsets is lower than a second one of the set of offset values that corresponds to the second one of said two or more second subsets. The configuration that a given subset is to be decoded earlier than another may be set or determined, for instance, by an encoder from which the dataset is received. The first offset value being lower may indicate that the position is earlier in the received set of data than that corresponding to a comparatively higher or greater value.

It is possible to apply such configurations to embodiments wherein there are more than two tiers in the hierarchy of subsets. It is envisaged, for instance, that a first, or root, tier, is decoded, each of the second tier and any further tiers may be decoded sequentially one after another. In such cases, the subsets within each of these following tiers decoding may be performed in parallel.

The method may further comprise, in some embodiments, decoding the at least one first subset to derive a series of data values, wherein each first subset corresponds to a region of the information that has been compressed. This is typically the case wherein the first subset is not a header but is a tessera.

Typically, the hierarchy is partially ordered. Preferably, the hierarchy is totally ordered, for example in accordance with a depth-first pre-order traversal decoding process.

In some embodiments, if an offset value indicates a difference of zero between the position within the encoded dataset that corresponds to the earliest element of an associated second subset and the position within the encoded dataset that corresponds to the earliest element of another subset, the method comprises determining that the associated second subset does not exist in the set. This may comprise indicating that the second subset contains no data elements. This typically means that, upon receipt or processing of the set, the zero-difference offset value indicates that the associated subset is not present and so no decoding is performed upon that second subset, with processing and/or decoding then proceeding to the next subset in the hierarchy to be decoded. In some embodiments, a subset being indicated, by way of an associated zero-value offset, not to be present in the received set indicates, or results in, a portion of the information that has been compressed that corresponds to the non-existent subset being reconstructed as being formed of zero-value elements, or of elements having another implicitly signalled or predetermined value. For instance, where the compressed information is a digital image formed of pixels having values, a non-existent subset may result in a portion of that image corresponding to that notional subset being void, or having zero-value pixels only. In some embodiments, a non-existent subset as indicated by a zero-value offset may indicate that the information that has been compressed includes no information corresponding to that subset. Thus a subset not being present in the received set may signal that a gap or hole, or possibly an information area of reduced size or dimensions, is present in the information to be reconstructed.

Alternatively, an indication by an offset value being zero may be thought of as a position of the indicated earliest element of a subset within the dataset being the same as the earliest element of the other subset. For example, an offset value may be zero, if offset values that are obtained explicitly indicate positional differences. Alternatively, if each offset value is a difference of positional differences, as described earlier in this disclosure, a void or non-existent second subset may be indicated by a value with the same magnitude and opposite sign, that is the negative of, as the cumulative sum of offset values preceding but not including the offset values associated with the second subset. The difference of zero may therefore indicate that the associated second subset begins at the same position in the dataset or stream as the other subset. This typically means that no data is contained in the associated second subset.

In alternative embodiments, the method may comprise, if an offset value indicates a difference of zero between the position within the encoded dataset that corresponds to the earliest element of an associated second subset and the position within the encoded dataset that corresponds to the earliest element of another subset, determining that the associated second subset is a duplicate of the other subset. Advantageously, therefore, encoded data that would otherwise require two identical subsets to be included in the received set of data can be transmitted and/or received in a more data-efficient manner. This is achieved by including a single subset that is treated as two identical subsets. This behaviour can be signalled using offset values.

In some embodiments, a predetermined value may be set which, when an offset value is equal to said special value, may be used to trigger specific behaviour upon receipt of the data set or during decoding. The special value may be thought of as an escape trigger, in that its presence trigger may cause a deviation, in a decoder for example, from the typical or routine manner in which a second subset associated with an offset value having the escape trigger value is processed. Preferably the escape trigger is selected to have a value of no or limited utility in processing a received data set, for example a value corresponding to an uncommonly occurring positional difference. For instance, in an embodiment the escape trigger might have a value of −1, or it might have a value that is greater than the greatest offset value of those in the obtained set that actually indicate subset positions, that is of those non-escape trigger offset values.

The previously described embodiments wherein an offset value of zero cause specific behaviour may be thought of as a specific case wherein the value 0 is an escape trigger value.

Further specific examples of escape trigger configurations are presented later in this disclosure.

Typically the information that has been compressed is split into a plurality of blocks of data elements, and each second subset corresponds to a region of the information that has been compressed and that it represents one or more of said blocks.

Although the term "stream length" is used in this disclosure, the positional difference between two adjacent subsets in a received set of data is not necessarily equal to the length or size of either of those subsets. A stream length as referred to in this disclosure does not indicate the length, size, or quantity of data of a subset, but rather represents a distance between two start positions, or between a start position and another position within another subset, of two subsets in a data set. Thus, streams or subsets may be separated by gaps.

Indeed, the size of a set of data, or the length of a stream of data, that comprises or represents a subset may exceed the size of that subset, or the sum of the lengths of the elements thereof (which may be one bit per element for example). In a subset, after the earliest element, any element may be preceded or followed by elements or bits that do not belong to the current subset, or do not form part of the subset. This has the effect of allowing space after the latest element of the current subset. The advantage of such "final padding" is that offsets can be made more predictable, for example multiples of 16 bits, which can allow them to be recorded with fewer bits per offset.

Thus, in some embodiments, the encoded dataset includes one or more data elements that are not comprised by a subset. Preferably, these additional data elements are situated immediately before the end of a subset, in particular before one or more final data elements of a subset. Being situated may be thought of being positioned at a given point or location in the set.

Alternatively, in some embodiments, one or more of these "padding" data elements that are not comprised by the subset are situated between a position that corresponds to the earliest element of a subset and a position that corresponds to the earliest element of another subset. As noted above, additional data elements may be located between adjacent subsets. They may be located between two data elements comprised by a subset while not themselves being comprised by the subset. The exclusion of a data element from a subset in spite of it being located between two elements thereof may be implicitly signalled or predetermined, for example by a predetermined format, or may be explicitly signalled. Additional data elements may be included in the dataset in a quantity that causes two or more portions of the encoded dataset that each contain a respective subset to be the same size or contain the same amount of data elements. Such implementations, wherein the respective data portions within which the subsets are individually contained in the set are the same or are configured to be similar may be advantageous in that offset values indicating differences of positional differences or have lower values and will therefore allow greater data efficiency. The other subset referred to in these cases may be adjacent in the dataset to the respective subset.

A further envisaged advantage of including "final padding" between subsets in the data set is that some or all of the data elements that are not comprised by any subset, or any first, second, or further subset specifically, may be utilised for a different type of data. For example, the padding data elements may comprise any of local video metadata, checksums, and audio data.

Alternatively, in some embodiments, none or some of the subsets may be accompanied by additional, padding data elements. In some embodiments, there might be no padding space anywhere in a given dataset. Thus, in some embodiments, at least two of the subsets are adjacent in the encoded dataset such that no data elements are situated between them. Thus it may be that no data elements other than those comprised by the subsets are situated between the subsets or are present in the dataset at all.

Although the method as described above refers only to first and second subsets, the hierarchy may contain three or more tiers in some embodiments. Thus, the method may further comprise decoding a plurality of third subsets, each comprising a data structure of metadata and data, to derive a series of data values, wherein each third subset corresponds to a region of the information that has been compressed. It will be understood that the method as described above may accordingly be repeated similarly for fourth, fifth, or any further order of subsets. The above described features relating to the second subsets may apply mutatis mutandis to the third, or further, subsets. In such embodiments, typically an offset value indicates a relative position within the encoded dataset that corresponds to the earliest element of an associated third subset with respect to the position within the encoded dataset that corresponds to an element, or specifically the earliest element, of another subset, which may be a first, second, or third subset. Typically, the decoding the plurality of third subsets includes identifying for each third subset, based on the set of offset values, the position within the encoded dataset that corresponds to the earliest element of the third subset. Thus the method may further comprise obtaining a respective set of offset values from at least one of the second subsets. The method may accordingly typically comprise reconstructing the information that has been compressed from the data values.

In embodiments such as this involving third subsets, typically identifying the position of a third subset comprises calculating the position as a sum of offset values obtained from the at least one first subset and, where the method further comprises obtaining a respective set of offset values from at least one of the second subsets, of offset values obtained from said at least one second subsets.

Obtaining the respective set of offset values from a second subset may comprise decoding the first subset to derive the offset values.

In such embodiments, preferably the obtained offset values, from the first, or first and second, or further subsets, are arranged as a series of offset values, and typically the identifying the position of a second subset comprises calculating a sum of the offset values in the series preceding and including an offset value associated with the second subset.

In accordance with a second aspect of the invention there is provided a decoder apparatus configured to execute the method according to the first aspect. The apparatus may typically be a computer device comprising a processor, memory, and a data connection by which a dataset may be received. Typically, the apparatus comprises an offset module configured to obtain, from at least one first subset, a respective set of offset values; and a decoding module configured to decode a plurality of second subsets, each comprising a data structure of metadata and data, to derive a series of data values, wherein each second set of subsets corresponds to a region of the information that has been compressed, wherein each offset value is associated with a second subset and indicates a relative position within the encoded dataset that corresponds to the earliest element of the associated second subset with respect to the position within the encoded dataset that corresponds to an element of another subset of the hierarchy of subsets, and wherein the decoding module is configured to identify, as part of decoding the plurality of second subsets, for each second subset, based on the set of offset values, the position within the encoded data that corresponds to the earliest element of the second subset; the apparatus typically further comprising a reconstruction module configured to reconstruct the information that has been compressed from the data values.

In accordance with a third aspect of the invention there is provided a computer readable storage medium having stored thereon program code configured for executing the method according to the first aspect. Thus the program code may contain computer executable instructions configured to cause a computer device to perform the steps of: obtaining, from at least one first subset, a respective set of offset values; decoding a plurality of second subsets, each comprising a data structure of metadata and data, to derive a series of data values, wherein each second subset corresponds to a region of the information that has been compressed, wherein each offset value is associated with a second subset and indicates a relative position within the encoded dataset that corresponds to the earliest element of the associated second subset with respect to the position within the encoded dataset that corresponds to an element of another subset of the hierarchy of subsets, and wherein the decoding the plurality of second subsets includes identifying for each second subset, based on the set of offset values, the position within the encoded data that corresponds to the earliest element of the second subset; and reconstructing the information that has been compressed from the data values.

BRIEF DESCRIPTION OF THE DRAWINGS

FIG. 8 shows a grid of values before decoding and after reconstruction in an example decoding method suitable for use with the present invention;

FIG. 9b illustrates a recreated grid at the stage of the process illustrated in FIG. 9a;

FIG. 10b illustrates a recreated grid at the stage of the process illustrated in FIG. 10a;

FIG. 11b illustrates a recreated grid at the stage of the process illustrated in FIG. 11a;

FIG. 12b illustrates a recreated grid at the stage of the process illustrated in FIG. 12a;

FIG. 14b illustrates a recreated grid at the stage of the process illustrated in FIG. 14a;

FIG. 15b illustrates a recreated grid at the stage of the process illustrated in FIG. 15a;

FIG. 16b illustrates a recreated grid at the stage of the process illustrated in FIG. 16a;

FIG. 17b illustrates a recreated gild at the stage of the process illustrated in FIG. 17a;

FIG. 18b illustrates a recreated gild at the stage of the process illustrated in FIG. 18a;

FIG. 19b illustrates a recreated gild at the stage of the process illustrated in FIG. 19a;

DETAILED DESCRIPTION

Figure 1A:
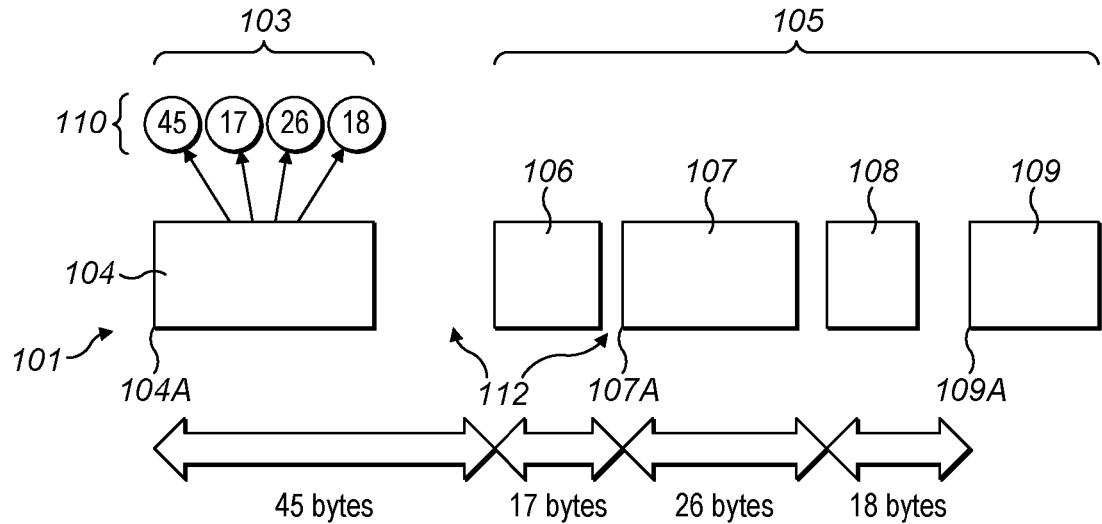
FIG. 1 shows a first example of a received dataset comprising a first subset and a plurality of second subsets with two examples of offset values.
Figure 1B:
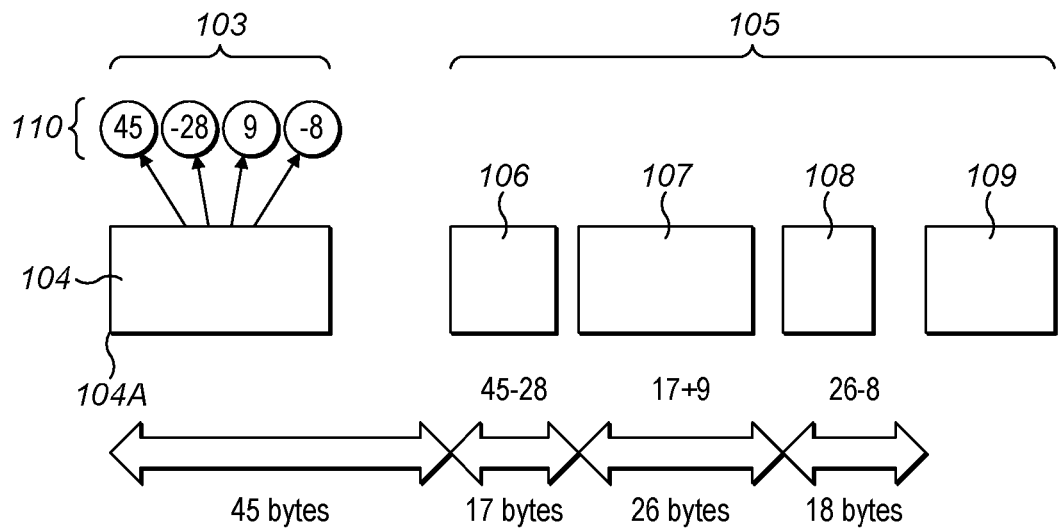

With reference to FIG. 1, a simplified example received set of encoded data is shown schematically, with indications of offset values which can be used to locate subsets within the received set. A and B show the same received set of data with two alternative modes of indicating subset locations using offset values. The received set of encoded data 101 comprises a hierarchy of subsets including a first subset in region 103 and second subsets in region 105.

A set 110 of offset values is obtained from the first subset 104 by a decoder apparatus receiving the set of data 101. This may be performed regardless of whether the whole set 101 has been received in its entirety. In cases where the set is received by way of a slow data connection, and/or where the set 101 is particularly large, it may be the case that the decoder advantageously begins the obtaining of offset values, with a view to locating subsets within the set 101, prior to the whole set 101 being received. The set of offset values comprises four offset values: 45, 17, 26, and 18. The decoder apparatus determines from this obtained set that the locations of four second subsets may be acquired.

The decoder first determines from the first offset value, 45, that a second subset 106 is positioned within the dataset 101 at such a location that its earliest element, or its beginning 106A, is 45 bytes away from the earliest element or the beginning 104A of the first subset 104. In other words, the offset value of 45 indicates the decoder that the relative position of the earliest element 106A of the first of the second subsets 106 is spaced apart from the beginning 104A of the first subset 104 by a distance, or rather a quantity of data in the set, equal to 45 bytes. Thus the offset value of 45 that is associated with the second subset 106 indicates that the second subset 106 is positioned 45 bytes away from, specifically later than in the present example, the beginning of the first subset 104, but does not necessarily indicate that the length of the first subset 104 is equal to 45 bytes. Although it may be the case in some examples that the final element of the first subset 104 is adjacent to or immediately precedes the earliest element of the second subset 106, in the present example gaps 112 exist in the set, which is received as a stream 101, separating the subsets. Thus the stream 101 comprises data elements at the regions indicated at 112 which do not form part of any of the hierarchy of subsets.

The decoder likewise uses the offset value of 17, which is associated with the second of the second subsets 107 to determine that the beginning 107A of that subset 107 is positioned 17 bytes later than the beginning 106A of the first of the second subsets 106 in the received stream 101.

The remaining two offset values, 26 and 18, are associated with the second subsets 108 and 109 respectively. As illustrated by the arrows in the figure, those offset values respectively indicate that the third of the second subsets 108 is located with its earliest element 26 bytes later than the earliest element of the second subset 107, and similarly that the earliest element of the fourth of the second subsets 109 has its earliest element located 18 bytes along from the earliest element of the third of the second subsets 108.

In this way, the decoder apparatus can acquire from the offset values 110 the starting locations 106A-109A of each of the second subsets 106-109. Therefore the decoder is advantageously afforded the ability to fetch data from, and decode, each of the second subsets without first having to decode any of the preceding subsets.

The example illustrated at B in FIG. 1 is identical to that shown at A except for the manner in which the offset values 110 indicate the relative positions of the second subsets in region 105. In the example shown at B, each offset value 110 indicates the relative position of an associated second subset 106-109 by way of indicating a relationship, specifically a difference, between the relative position of the earliest element of a second subset associated with the offset value with respect to the position of the earliest element of another subset and a relative position of the earliest element of that other subset with respect to the position of the earliest element of a further subset. In this example, the offset values are arranged as a series shown at 110 such that the position of a second subset can be identified by calculating a sum of the offset values in the series preceding and including an offset value associated with that second subset. It can be seen that the offset values 110 in the example shown at B indicate the differences between the offset values in the series 110 shown for example A. Therefore, the length of the stream, or the amount of data in the set, separating second subsets may be calculated by adding an offset value to a relative position determined for another second subset. For instance, the position of the earliest element of the second subset 106 may be found from the first offset value in the series, 45. In the present example, the notional preceding relative position or offset value is initialised 20, and thus the first offset value in the series 110 gives the relative position of second subset 106 with respect to the first subset 104.

The relative position of the beginning of the second of the second subsets 107 may be found by adding the second offset value, −28, to 45, resulting in a value of 17 which indicates that 17 bytes of data exist between the earliest elements of the first 106 and second 107 of the second subsets. The relative position of the third of the second subsets 108 with respect to the second of the second subsets 107 is obtainable by adding the third offset value, 9, to the value of 17 that is obtained for the second of the second subsets 107. This results in a value of 26, indicating that 26 bytes separate the earliest elements of the second and third second subsets 107, 108. Finally in the present example, the relative position of the fourth 109 of the second subsets, which is equal to 18 bytes with respect to the starting position of the third of the second subsets 108 may be found by adding the fourth offset value, −8, to the obtained value of 26.

It will be appreciated that obtaining a cumulative sum over the series 110 of offset values results in the corresponding offset values shown in example A. Namely, the calculating a cumulative sum of the series 45, −28, 9, −8 results in the series 45, 17, 26, 18. Thus the individual relative positions of the second subsets with respect to other subsets may be determined, as in example A, using the offset values 110 given in example B.

It follows that obtaining a cumulative sum of either the series of offset values shown in example A and the cumulative sum of the offset values shown in example B, which as noted above are the same, results in the absolute position (or the relative position with respect to the notional beginning of the stream shown at 104A) of each of the associated subsets. Thus the cumulative sum of the series 45, 17, 26, 18 results in the series 45, 62, 88, 106.

In this way, each of the examples shown at A and B allows the positions of the earliest elements in the second subsets to be signalled to the decoder by way of including in the first subset offset values that require less data than explicitly signalling each of the absolute positions of the second subsets would.

In some implementations it may be advantageous, or required, for the maximum size of the set of offset values, that is the number of values in the set (which is equal to 4 in the present example) to be predetermined, or known by the decoder. For example, in some examples wherein the encoded data set corresponds to image information, the width and height of a plane might be signalled using this information, and from this the number of Tiles per Surface can be computed at once.

If the number of offset values in the obtained set were not predetermined or signalled in advance, then, in the above described example, the Tableau could fully determine the number of Tiles. Using quadtrees however, as described later in this disclosure, the decoding/desparsification of the Tableau may require this number.

Figure 2A:
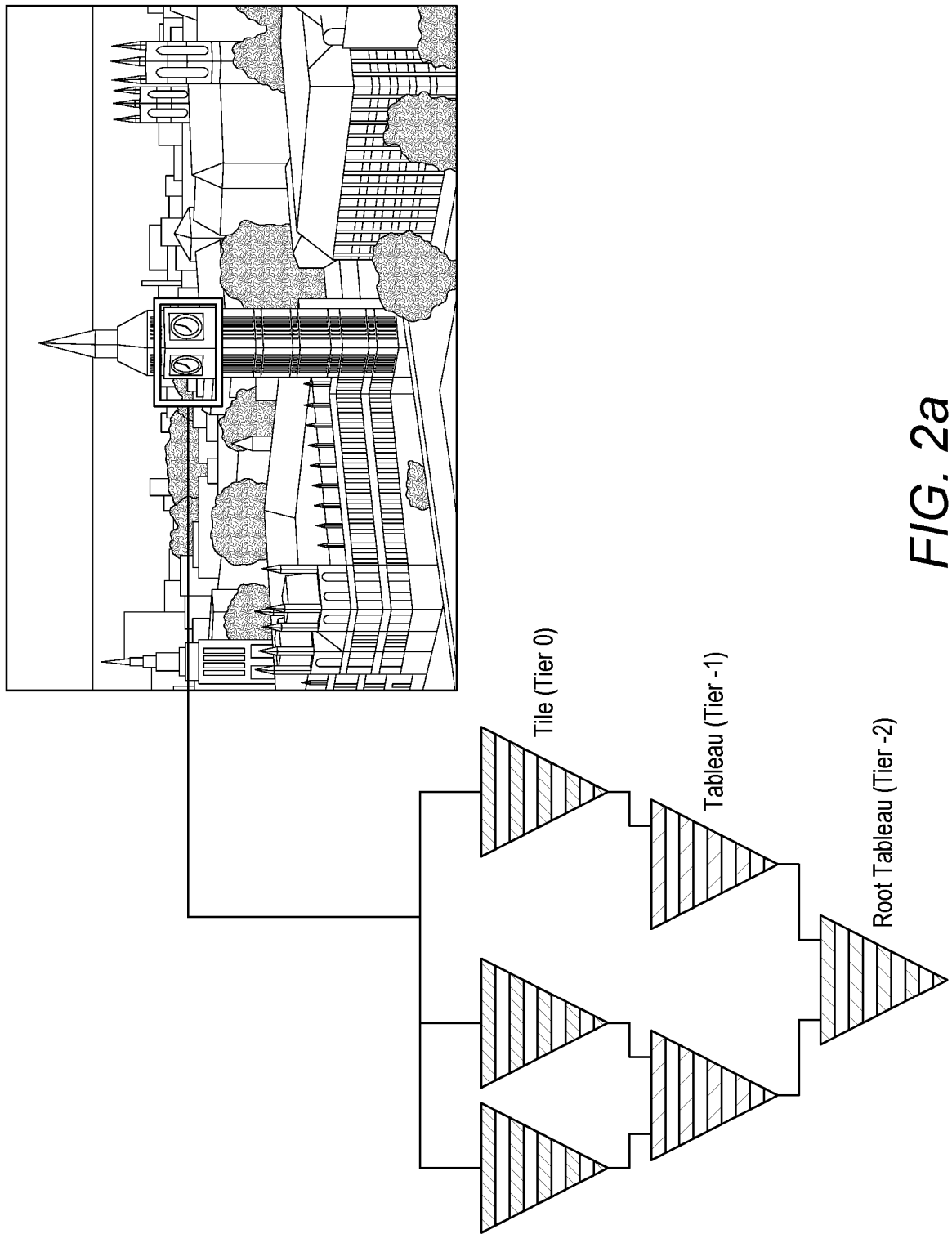
FIG. 2 shows an example data structure bitstream layout after a header of the stream, as six streams within multiple hierarchical tiers of the structure.

As described earlier in this disclosure, methods of decoding such as this may be advantageously applied to sets of encoded data corresponding to hierarchical, tiered data structures. A further example method is shown schematically in FIG. 2. In that figure, a set of data comprising a hierarchy of subsets with three tiers is shown at A, wherein it is indicated that the encoded data obtainable from the received set or stream corresponds to a portion of an image that has been compressed.

It can be seen that there are six subsets of data in tiers 0, −1, and −2, which correspond to tiles, tableaux, and a root tableau, respectively.

These subsets, which in the present example are S-trees, are illustrated at B arranged as a bitstream. In addition to the six subsets within the two tableau tiers and a tile tier there is also a tertiary header that is received before the aforementioned six subsets.

Figure 2B:
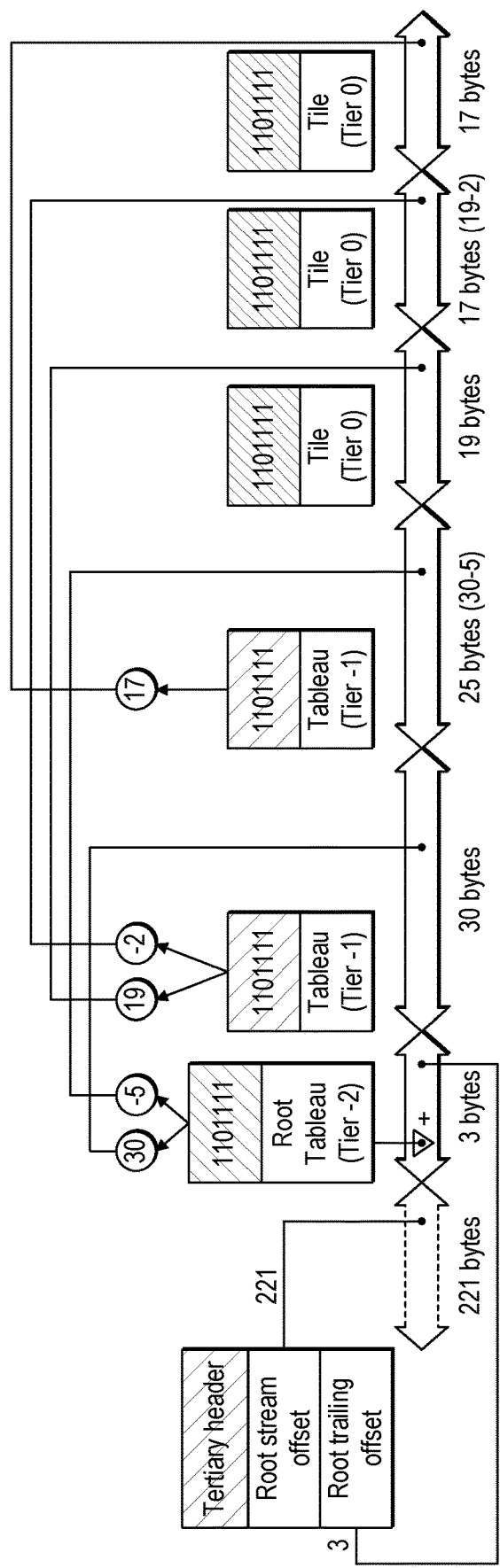

The mechanism illustrated schematically in FIG. 2 effectively allows one to find blocks of data within a bytestream (or bitstream). Although we illustrate in FIG. 2 that a root tier is first and then an intermediate tier and final tier are next in the stream, this may not be the case in practice as the mechanism allows for the interleaving of blocks or data structures while still being able to accurately locate the block. In other words, the illustrated mechanism provides for random access in a bytestream using a hierarchical data structure.

To document the syntax and semantics of a high efficiency compressed bytestream that uses hierarchical representation of compressed data to allow decoders to flexibly recreate uncompressed imagery, the bytestream should allow decoded images to be visually lossless at high bitrates and to be free from block boundary artefacts at low bit rates. The mechanisms should preferably define a compression scheme for an array of scalar valued matrices based on hierarchical, integer-transform, sparse quad-tree encoding techniques. The mechanism should then define selectable up-scaling mechanisms used between the different hierarchical layers.

In the hierarchical data structure shown at A in FIG. 2, there is shown a hierarchical structure comprising tiers. For a tier of a first type (i.e. tile), a first type of data element is defined comprising a subset of the set of encoded data; and for a tier of a second type (i.e. root or tableau), a second type of data element is defined comprising one or more attributes associated with the first type of data element. The location of the first type of data element in the recreated array is determined from the information contained in the second type of data element. The location of the second type of data element in the recreated array is typically determined from the information contained in a second type of data element (root tableau) or, in the case of the root tableau, from a header.

By defining the data structure required to map the instances of where residual data occurs within a frame of data, it is possible to provide a faster decoding and encoding methodology. In particular the amount of data used to encode the data is sparsified thus reducing the amount of data which needs to be read during decoding. Furthermore, the data, and metadata describing the structure of the data allows for individual portions of the frame to be selectively decoded without reference to other portions of the frame. Thus it is possible to parallelise the decoding process. The technique further reduces the data in memory, for example by allowing data in memory at an instant to be a subset of the data for the whole plane. It is envisaged that in certain embodiments, for example in video-on-demand applications, once the locations of subsets, or Tesserae, are known, a request could be sent to a video-on-demand server from which the encoded data set is being received to omit sections of the bitstream containing portions of the frame that are not required or are not to be viewed. In this way, frames that are required for viewing may be received more quickly.

In the figure, certain terminology is used. A tessera is a data structure that is used to hold the data. A tableau is a data structure, i.e. a tessara, that contains attributes of the tessara of the higher tier. For example, in this illustrated example, the location of the subsequent tessara or data structure of the higher tier. A tile is a tessara or data structure which contains data elements that are compressed information. For example, the image shown top left is made up of a series of tiles. Each tile is referenced by a tableau in a lower tier. The number of tiers is reflective of the size of the data structures in each tier. In this example we show three tiers, a tier of tiles (i.e. containing data) and two tiers of tableaux (i.e. containing metadata or attributes of the subsequent data structures).

The illustration of FIG. 2 shows that in the bitstream the root tableau is first included, then included are all the tableau and then all the tiles. However, nothing prevents the mechanism having the structures in any order, for example a root tableau then a tile then another tableau and another tile.

Within each tableau there is provided an offset value. This offset value indicates a relative position from the current location of a subsequent structure, preferably in a higher tier. That is, from decoding the root tier, one can identify the location of the tableau data structures. From decoding the tableau data structures one can identify the relative locations of all the tiles. Thus, once the tableau have been decoded the tiles can be located within the stream without having to decode all the tiles first. Similarly, if one needs to find a tile, one can follow the path from the root tier through to the tile from following the hierarchical data structure.

As shown, in one option, a header is included which references the location of the root tier. The root tableau of that tier includes an offset value. In FIG. 2 for example, the value 30 may indicate that a tableau in the next tier is 30 bytes away from the earliest element of another tableau, in this case another tableau in that tier.

Each data structure may include optionally the precise location of the subsequent data structure, a relative offset of the data structure from a fixed point or the length of the data structure that is referred to. In this latter example, once the tableau is decoded one can identify the lengths of each of the tiles and subsequently deduce where a data structure will start based on a sum of the lengths of the previous tiles.

FIG. 2 shows an extract of a set of metadata values, in the form of a header (at the left side of the stream 2001 at B), wherein indicators of the positions within the encoded data set corresponding to the first elements of respective subset of a set of the encoded data set are given as stream offsets. In the present example the header is a tertiary header. The two types of stream offset shown in the present example are a root stream offset and a root trailing offset. These two indicated offsets constitute the only metadata from the header that affect the layout of the associated data structure. These two offsets control, or signal to the decoder, the locations within the received stream of two of the tesserae of the associated data structure but do not directly affect the locations of the other tesserae of that data structure. These other locations are discussed later in this disclosure.

FIG. 2 shows an example of a bitstream layout of a data structure. The root tableau is in Tier (−2) and follows (221) octets after the end of the header since the root stream offset of the data structure has a value of (221). The root tableau has two children, which are both in Tier (−1). It also has three grandchildren, namely two children of its first child and one child of its second child. These grandchildren are all in Tier (0). The terms "child" and "grandchild" are used in this paragraph and the following paragraph in the context of a tree data structure, all of the nodes of which are themselves tesserae.

The decoding process of the root tableau, once completed, establishes the length of the root tableau in the bitstream layout of the data structure. The offset from the start of the root tableau in FIG. 2 to the start of its first child is formed by adding (3) to the length in octets of the root tableau, since the root trailing offset of the data structure has a value of (3). An advantageous trade-off may be achieved by way of not using an offset_to_tier-1_from_start_of_root instead. In some implementations, it may be configured to be necessary for the root tessera to be completed before anything in the next-highest tier in the hierarchy of subsets, tier-1, can be located. This is typically completed relatively rapidly, and so the delay caused by this requirement is typically acceptable. Conversely, the root trailing offset is often small compared with the offset value indicating the position of the earliest element of tier −1. In many cases the former may have a value of zero. This improves compression by allowing the size of the header to be reduced.

The offset from the start of this first child to the start of the second child has a value of (30) octets and the offset from the start of the second child to the start of the first grandchild has a value of (30−5=25) octets. These children are tableaux, where the first one defines offsets of (19) octets from the start of the first grandchild to the start of the second grandchild and (19−2=17) octets from the start of the second grandchild to the start of the third grandchild, and the second one defines a spare offset of (17) octets from the start of the third grandchild. The spare offset is the last of the offsets and, though it has a value, might not lead to or indicate the position of any specific element of any specific data structure.

Root stream offsets are positive or zero. Root trailing offsets, though positive and non-zero in the above described example, may in general be positive, negative or zero. The other offsets are also positive, negative, or zero, but the value zero corresponds to a void target of the offset, that is one of the possibly many entirely void tesserae such as all those absent from FIG. 2A.

Offsets in bytes (referred to in this example as octets) for a tableau or tile, counted from the end of the header, are as follows where k is an integer satisfying 1≤k≤n. An offset to a root tableau, counted from the end of the header, shall be a root stream offset. An offset to the start of a tableau (or tile) in Tier −n+k, counted from the end of the header shall be the offset to the root tableau plus a total sum of stream lengths, where one stream length is associated with each label of the tableaux in all Tiers below Tier −n+k−1, plus a partial sum of stream lengths, where one stream length is associated with each label of the tableaux of Tier −n+k−1.

As an example, an offset to the start of a tableau (or tile) in Tier −n+1 will be the offset to the root tableau, plus zero total sum, plus a partial sum of stream lengths, where one stream length is associated with each label of the root tableau.

The bitstream 2001 contains a stream length difference value instead of encoding the stream length element of labels directly.

According to the above, offsets to tesserae depend on the data in previous tableaux. For example, without the data of the root tableau of a surface, there is no way to access the data in the subsequent tiers of that surface.

Each tier contains one or more tableaux, except Tier 0, which contains one or more tiles.

Once the root tableau has been decoded, the total number of Tier −n+1 tableaux is known from the total number of non-zero stream lengths, which are calculated by an additional decoding process during the traversal stage of decoding.

After decoding all the Tier k−1 tableaux, the decoder is able to select the head and total number, of the Tableaux (for k<0) and Tiles (for k=0), in Tier k. In the case of Tier −n, the offset of the root tableau is obtained from the header.

FIG. 2 shows the first seven encoded bits in each of six tesserae belonging to one surface, using incorrect bit values from a dummy bitstream. Links from the root tableau lead to Tier −1 tableaux (or tiles, for smaller surfaces, unlike in the current example) and links from Tier −1 tableaux lead to tiles. This figure is independent of the encoded bits in the tiles, but not the tableaux.

From the sources and targets of the links connected to all the tableaux and offsets in FIG. 2, it is apparent that the decoded tesserae might be combined into one larger data structure.

In this example streams exist only for tesserae that are not entirely void. The offsets shown at the bottom of FIG. 2 shall be signed but shall not be zero. This means that the start of a stream is located on any byte-boundary within the bitstream except that, in order of depth-first pre-order traversal of the labels of a given tableau, the start of a non-void tessera differs from the start of the next non-void tessera. The stream length value of zero is used for denoting an entirely void tessera. It can appear within a label but is not used for location of a stream.

FIG. 2 shows five stream length differences, from which stream lengths (forming part of tessera labels) are simply obtained and shows the use of the stream lengths as offsets. The start of the bitstream, and the primary and secondary headers are not included in FIG. 2.

The offset in octets from the start of the bitstream to the start of the root tableau is the sum of root stream offsets and the lengths of the headers. The offset in octets from the start of the root tableau to the first tessera of the tier above the root is the sum of an element of root trailing offsets and the number of octets used in decoding the root tableau.

The five remaining offsets from streams in FIG. 2 are the stream lengths from labels on the root tableau, and from the Tier −1 Tableaux present in this example. These are retrieved from stream length differences, as shown, by adding them to the previous stream length. The notional previous stream length is initialized to zero at the start of each tableau.

For example, in FIG. 2, the offset of the following tessera from the start of the root tableau shown is 3 octets greater than the length of the root tessera.

In FIG. 2, stream length differences leading to offsets of 0 (void tesserae) are not shown and all others are shown. In FIG. 2, it is assumed that two non-zero stream length differences on a tableau have no intervening stream length difference.

The location reached by the final offset of Tier −1 has no specific role in this example. For example the last offset of 17 octets in FIG. 2 might not lead to the start of a stream of any tessera in any surface.

In a variation on the example illustrated at FIG. 2, in some cases offset values may be obtained from one or more subsets that indicate the starting position of a subset with respect to an element of another subset other than the earliest element of that other subset. A received set of encoded data including such offset values advantageously facilitates the locating of subsets in the stream for decoding relative to any of a number of positions within a given subset.

In some variations of decoding processes such as those exemplified above, the decoder may be configured to recognize a particular offset value as being a special, "escape trigger" value that causes specific behaviour in the decoder in relation to the decoding of the subset associated with the offset value having the special value. The escape trigger in an (outer) leaf of a subset corresponding to a tier −1 tableau, for example, may have various uses:

(1a) It can mean that the single corresponding Tile in tier 0 will be encoded in an unconventional way by an UnconventionalThing.

(1b) For parallel decoding (of later Tiles) it could still be necessary to send a streamlength of an UnconventionalThing instead of a Tile, unless the thing goes into a separated part of the bitstream.

(2a) It can mean that there is still a normal tile, but its streamlength is incompatible with the normal representation of streamlengths i.e. it is an outlier and would not fit in the available statistics/bitlengths.

(2b) In this case, following the escape value that was coded conventionally, one can insert some bits that signal the current streamlength unconventionally. In preferable embodiments, this might be uncompressed. Whatever is done in 2b would suffice for 2a.

A further example illustrating the mechanism with which a compressed image comprising a plurality of tiles may be decoded is described with reference to FIGS. 3-7.

Figure 3:
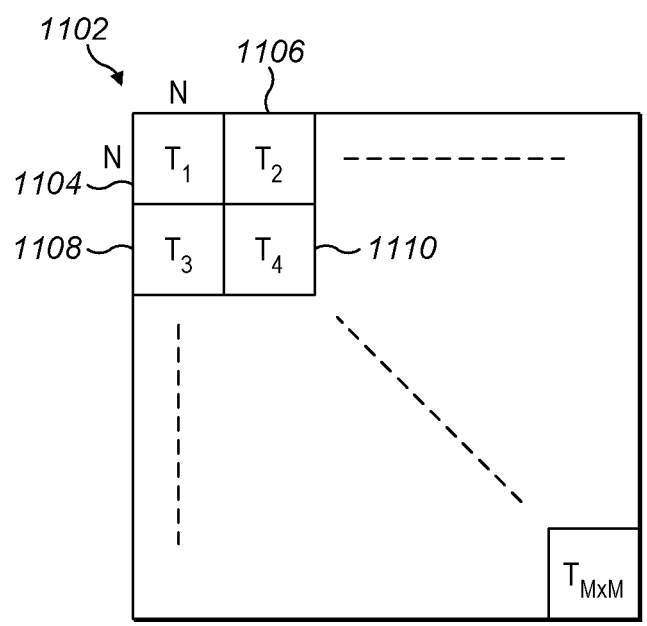
FIG. 3 is an example of the relationship between a Tableau of streamlengths for a gild of Tesserae, and the encoded stream according to an aspect of the invention.
Figure 3:
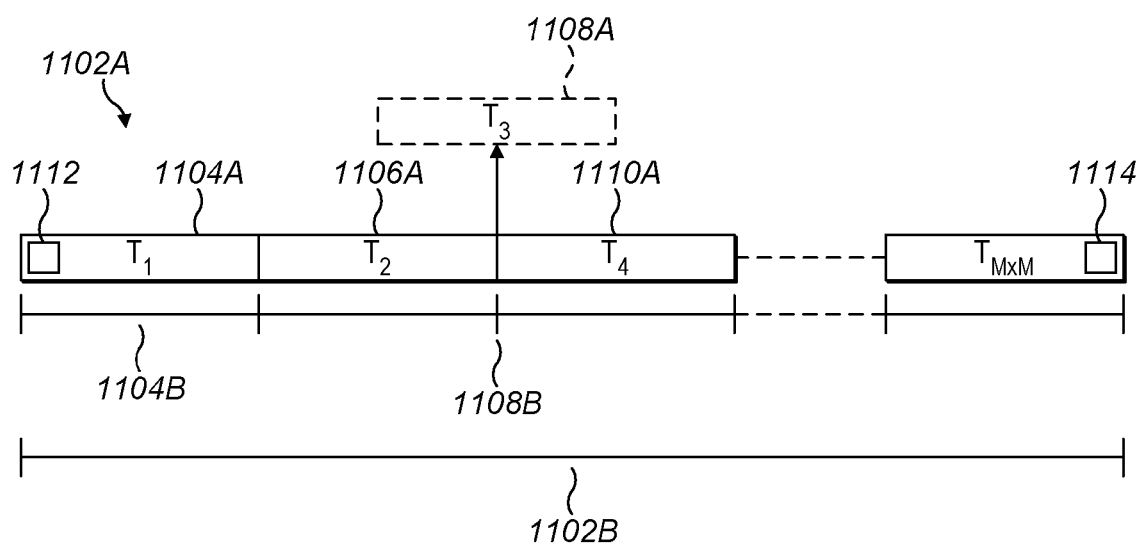

With reference to FIG. 3, each individual Tessera, e.g. 1104, 1106, etc. that form the large grid of Tesserae 1102, can be encoded and subsequently decoded independently of any other Tessera. In the following description, a Tessera that is used to represent residuals data is also named a "Tile", whilst a Tessera that is used to represent metadata is also named as a "Tableau".

To allow for parallel encoding and decoding, the location of a Tessera on a grid of Tesserae needs to be known. For example, with reference to FIG. 3, to encode and subsequently decode Tessera 1110, its location on the grid of Tesserae 1102 needs to be known. The location of Tessera 1110 on the grid of Tesserae 1102 is correspondent to the location of stream 1110A within the larger stream 1102A.

Therefore, an aspect of the invention is the identification of the location of data relating to a given Tessera, or a plurality of Tessera, within a stream of data, which represents a gild of Tesserae, to allow for parallel encoding and decoding of said gild of Tesserae. This aspect further allows partial decoding of a stream of data; that is, an individual Tessera can be decoded without the requirement of any preceding Tessera also being decoded. This aspect is achieved by using a Tessera to define a gild of Tesserae.

As an example, with reference to FIG. 3, to decode Tessera 1110 using sequential decoding, the preceding tiles 1104, 1106, and 1108, would need to be decoded first by decoding their streams 1104A, 1106A, and 1108A. To decode the Tessera 1110 using parallel decoding, the location of the stream 1110A corresponding to Tessera 1110 within the overall stream 1202A needs to be known.

As described above, a key aspect of the invention is that a Tessera can be used to define a grid of Tesserae. Such a Tessera is referred to herein as a Tableau. A Tableau of size N×N, records metadata. In an embodiment, the metadata recorded is the streamlength of each Tile in an N×N grid of Tiles (in the case the Tableau belongs to Tier-1 as described further below) or the streamlength of each Tableau in a grid of Tableaux (in the case the Tableau belongs to Tier-2 or above as described below). Whereas a Tile records residual information for an N×N block of data, a Tableau records metadata for an N×N arrangement of Tesserae.

Each Tile is referred to as belonging to Tier-0. The corresponding Tableau is referred to as belonging to Tier-1. Accordingly, an aspect of the invention is that a hierarchy of Tesserae are formed to represent a large grid unit.

Figure 4:
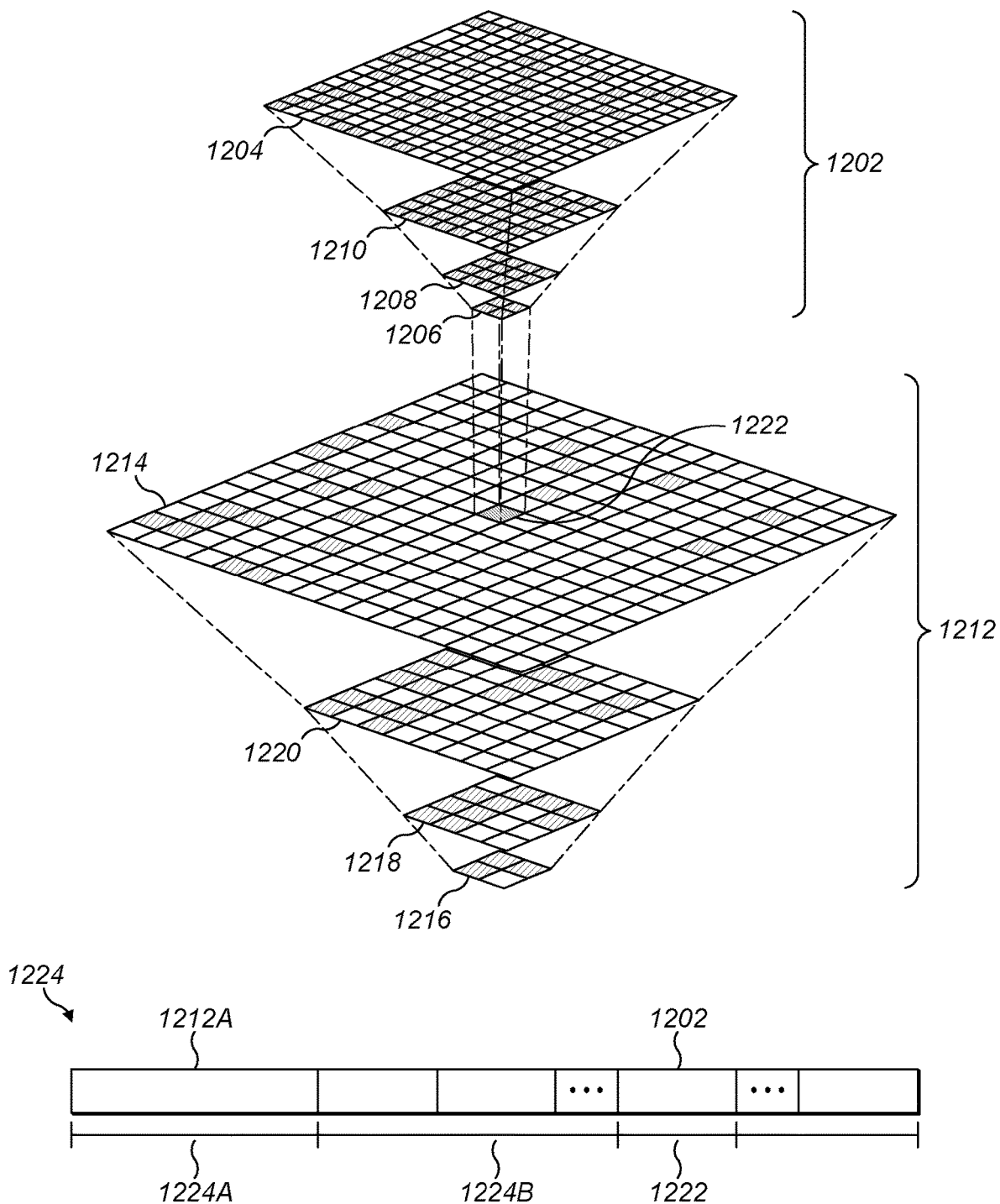
FIG. 4 is an example of the relationship between Tier-0 and Tier-1 Tesserae according to an aspect of the invention.

FIG. 4 shows a representative example of the relationship between Tier-0 and Tier-1 Tesserae, and the encoded stream 1224 of the two tiers.

A single Tier-0 Tessera 1202 is shown. Tessera 1202 is a Tessera of residual data (i.e., a Tile) and comprises a 16×16 grid 1204 of residual data. Tessera 1202 further comprises a 2×2 LOS 1206, a 4×4 LOS 1208, and an 8×8 LOS 1210. "LOS" as used here refers to the level of sparsification, in accordance with the data being defined in a sparsified manner.

A single Tier-1 Tessera 1212 is shown. Tessera 1212 is a Tableau and comprises a fixed size encoding unit 1214 of metadata, for example streamlengths. Tableau 1212 further comprises a 2×2 LOS 1216, a 4×4 LOS 1218, and an 8×8 LOS 1220.

Tableau 1212 defines a grid of metadata associated with the Tiles at Tier-0. Each non-zero element of Tableau 1214 records the metadata, for example streamlengths, of a Tile at that position in the grid of Tiles. As an example, element 1222 of Tableau 1212 corresponds to the total streamlength needed to encode Tile 1202.

The Tier-1 and Tier-0 Tesserae form a single stream 1224. Stream 1224 is read left to right such that the portion of the stream relating to Tier-1 1224A is read before the portion relating to the Tier-0 Tesserae {1224B}. This notation indicates that 1224B applies to all of the subsequent bits. For example, in the Figure, 1224B includes the element 1222.

In the example shown in FIG. 4, partial or parallel decoding can be performed by decoding the initial portion 1212A of stream 1224 relating to Tableau 1212. Tableau 1212 is then traversed using the same traversal order used during encoding (e.g. z-order traversal). During traversal, a mapping function may be applied to obtain the decoded streamlength values. Said decoded streamlength values then allow for portions of the Tier-0 stream 1224B to be read and decoded in parallel.

Figure 5:
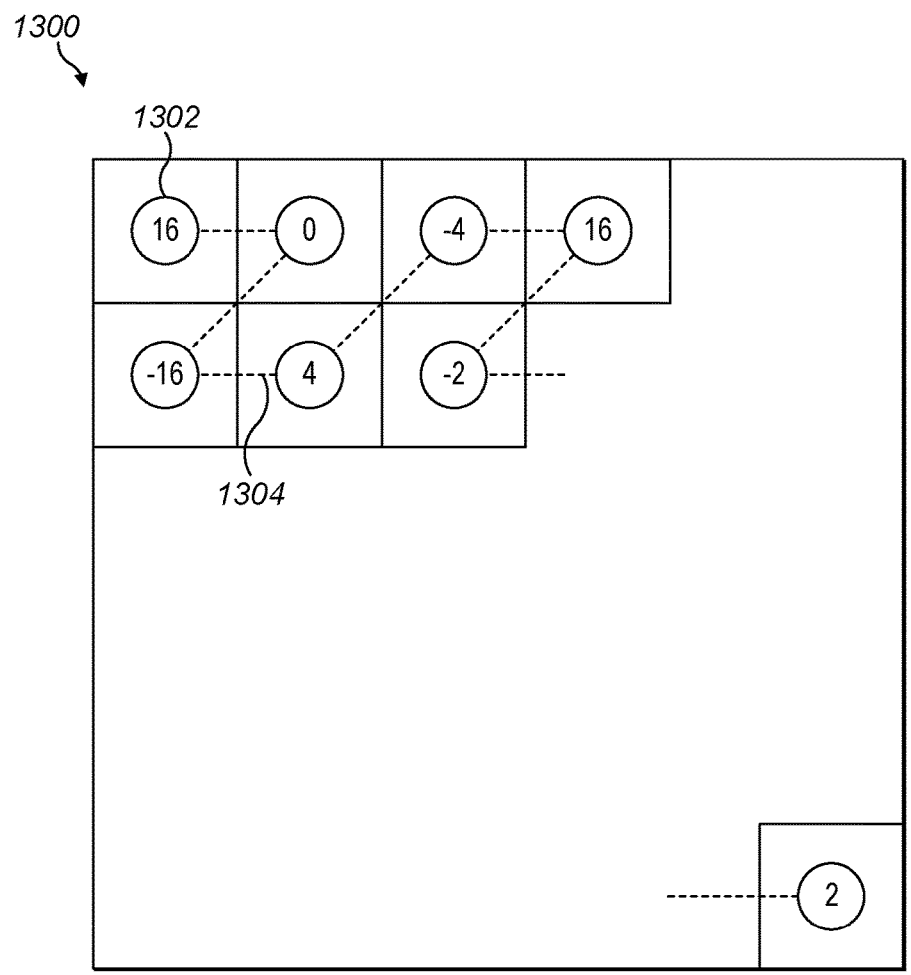
FIG. 5 is an example of how streamlengths are decoded from a Tableau according to an aspect of the invention.
Figure 5:
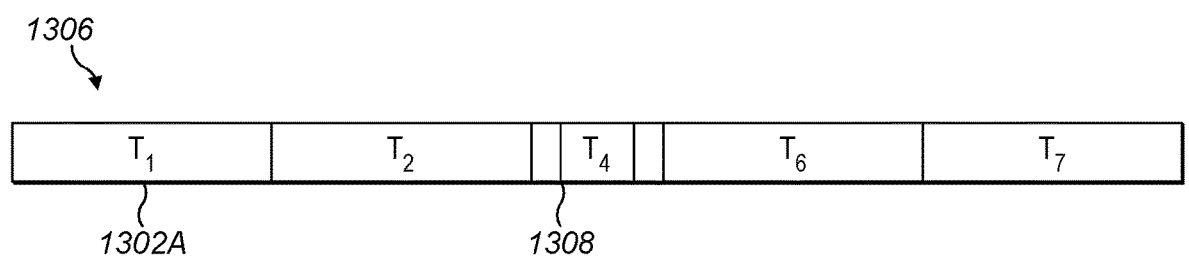

FIG. 5 shows a representative example of how streamlengths are decoded from a Tableau.

A Tableau 1300 is shown, composed of N×N elements. For ease of understanding a subset of the total number of elements are displayed. Each element corresponds to the streamlength of an associated Tile. For example, element 1302 contains the value 16 indicating that 16 bytes are required to read the Tessera of residual data associated with element 1302.

The elements of Tableau 1300 are visited in a set order 1304. This order corresponds to a z-order traversal of the elements. The same traversal is used for encoding the elements of the Tableau as is used for decoding. In further embodiments, another order may be used to visit the elements of Tableau 1300.

FIG. 5 further shows a stream 1306. The stream 1306 corresponds to the stream of the grid of Tiles that Tableau 1300 defines. Stream 1306 can therefore be understood to comprise one or more portions of data, said portions relating to individual Tiles. For example, portion 1302A of stream 1306 corresponds to the encoded stream of Tile T1. Accordingly, portion 1302A has a streamlength 1302 defined in Tableau 1300.

In some examples, embodiment, when the prefix difference function as described in Equation 2 is used for encoding, the prefix sum function can be used for decoding. The prefix sum function is defined as $$v_i = f(u_i) \qquad (3)$$
$$= \sum_{j=0}^{i} u_j$$

where $u_i$ is the value to be decoded, $v_i$ is the decoded value, and $u_0=0$.

If the elements of Tableau 1300 were encoded using a mapping function, said elements must be decoded using the inverse of said mapping function. For example, in the example shown in FIG. 5 a prefix difference mapping function, as defined in Equation 2, is used during encoding, and therefore a prefix sum mapping function as defined in Equation 3 should be used to decode the values. For example, the values [16, 0, −16, 4, −4, 16, −2] would be converted using Equation 3 into the actual streamlengths sequence as [16, 16, 0, 4, 0, 16, 14], meaning that Tile T1 has a streamlength of 16, Tile T2 has a streamlength of 16, Tile T3 has a streamlength of 0 (and in fact is not present in stream 1306), Tile T4 has a streamlength of 4, Tile T5 has a streamlength of 0 (and in fact is not present in stream 1306), Tile T6 has a streamlength of 16 and Tile T7 has a streamlength of 14. Thus, if only Tile T6 need to be decoded, the decoder would first compute the streamlengths up to Tile T5 by summing the streamlengths of Tiles T1 to T5, in this example 36 bytes, and then would skip the first 36 bytes and decode the next 16 bytes knowing that those bytes correspond to Tile T6.

The use of Tableaux in Tier-1 allows for massively parallel decoding as a plurality of decoders can be used to decode portions of the frame by using Tableau 1300 to find the location of said portion of data within stream 1306.

Figure 6:
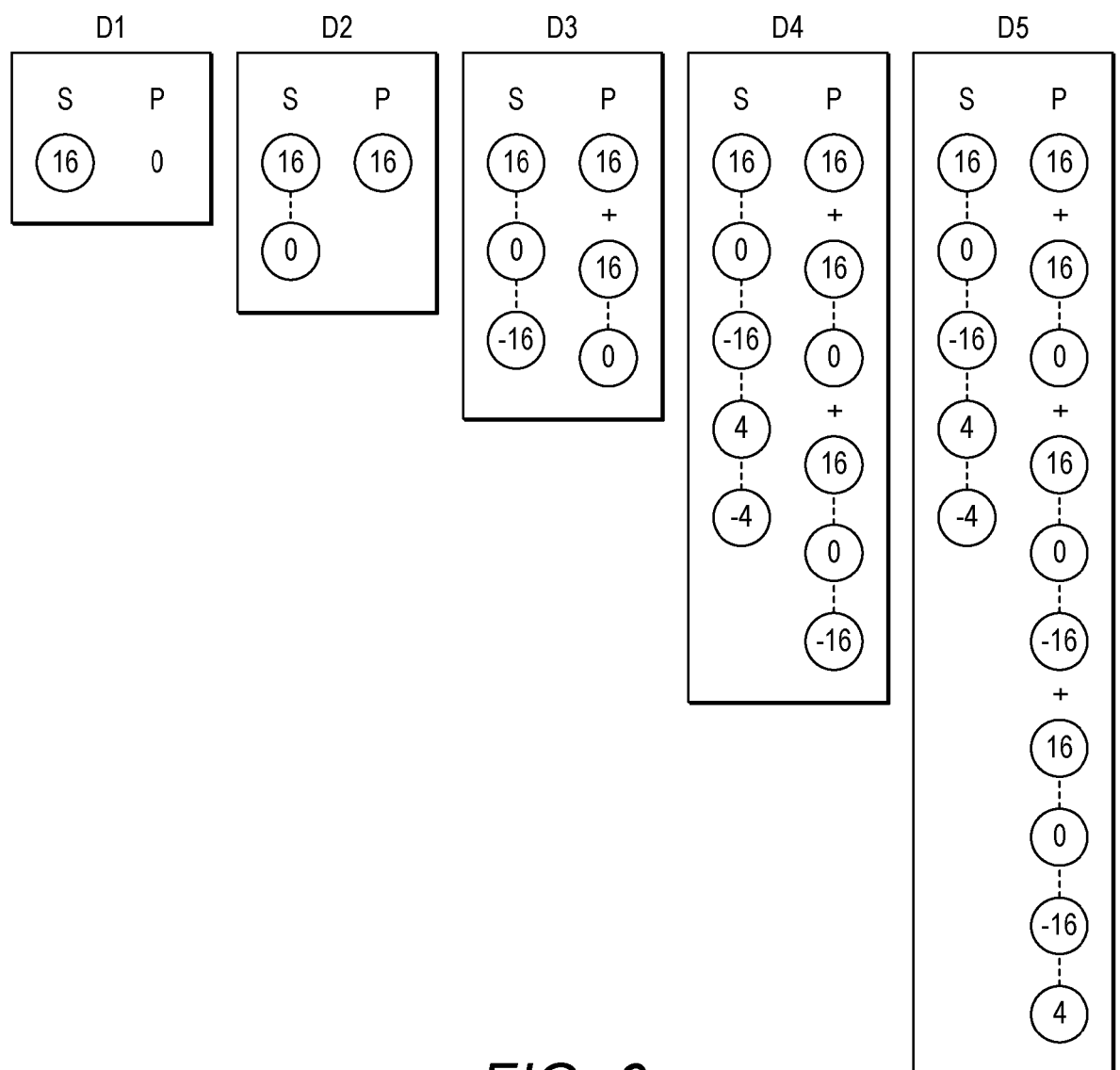
FIG. 6 is an example of how decoders can use a Tableau's streamlengths to decode in parallel according to an aspect of the invention.

FIG. 6 is an example of how four decoders can be used in parallel to decode the first four Tiles represented by Tableau 1300 of FIG. 5. In general, each Tile can be decoded by a separate decoder thus allowing massively parallel decoding to take place.

For example, if the streamlengths are encoded as in FIG. 5 using the difference mapping function, each decoder would traverse the quadtree of Tableau 1300 to obtain a streamlength (S) and a position (P) of a Tile in stream 1306. The streamlength would be computed as the sum of element values on Tableau 1300 encountered during traversal. The position would be computed as the cumulative sum of element values on Tableau 1300 encountered during traversal.

As an example, with reference to FIG. 5 and FIG. 6, decoder D4 decodes Tile T4. The streamlength of Tile T4 in stream 1306 is given as the sum of values encountered during traversal: (16+0−16+4)=4. Therefore, 4 bytes are required to decode Tile T4. The position 1308 of Tile T4 in stream 1306 is given as the cumulative sum of values encountered during traversal: (16)+(16+0)+(16+0+−16)=32.

However, if the streamlengths in Tableau 1300 were recorded as the actual streamlengths, namely as [16, 16, 0, 4, 0, 16, 14] in the example of FIG. 5, then the decoder could compute the streamlength (S) of a Tile as the actual value read in the position corresponding to that Tile, and the position (P) of a Tile as cumulative sum of element values on Tableau 1300 encountered during traversal. For example, using again the example of Decoder D4 decoding Tile T4, the streamlength would be the value found in position 4 of the traversal (i.e., 4) and the position would be 16+16+0=32.

Therefore, an aspect of the invention is that frames of video can be encoded and decoded in parallel to allow for massive parallelisation and partial decoding.

One important aspect of the present invention is that, in the same way that the Tessera structure allow to decode each Tile separately in a parallel manner (for example using a separate decoder for each Tile), also each Tile can be encoded separately by using a separate encoder for each Tile. As the Tessera defines the streamlength for each Tile, in the above described manner, the data for each Tile can be extracted and processed independently. Furthermore, as the Tiles do not have an interdependence, unlike in many encoding systems, there is no requirement to have any knowledge of neighbouring Tiles to decode a Tile.

Various encoding schemes could be used to encode the various Tesserae. In an embodiment, Huffman Coding is used to encode and compress a stream in parallel. Accordingly, Huffman Coding is used to decode a stream in parallel. In such an embodiment, Huffman Coding may also be used to decode a stream sequentially. In a further embodiment, if Huffman Coding is used to encode a stream sequentially, then a stream may be decoded using Huffman Coding in parallel or sequentially.

In an embodiment, Arithmetic Coding is used to encode and compress a stream in parallel. If Arithmetic Coding is used to encode and compress a stream in parallel, then an encoded stream is decoded in parallel. In a further embodiment, Arithmetic Coding is used to encode and compress a stream sequentially, and Arithmetic Coding is used to decode a stream sequentially.

Figure 7:
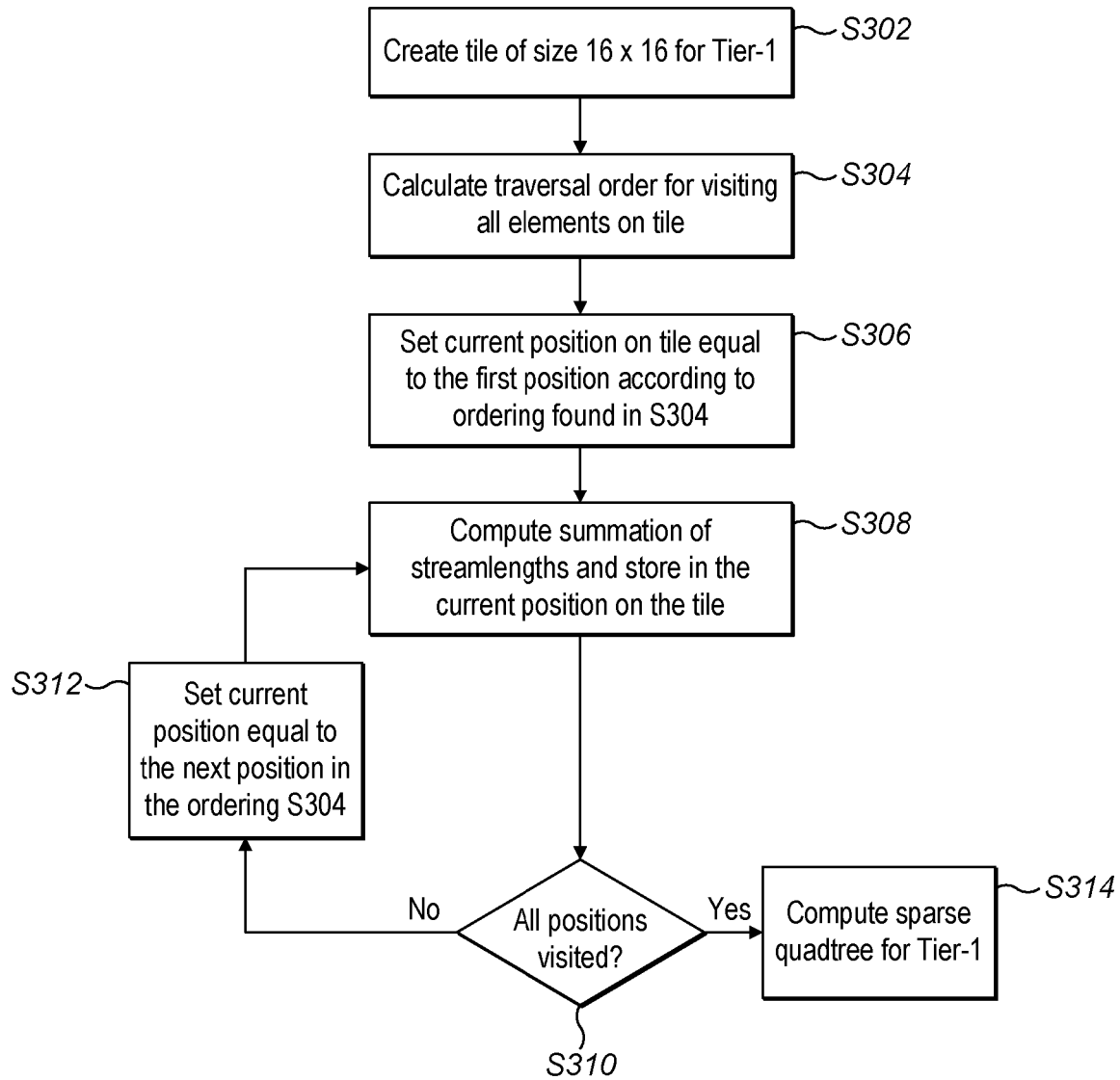
FIG. 7 is a flowchart for the creation of a Tier-1 representation according to an aspect of the invention.

FIG. 7 is a flowchart of the process of creating a Tableau, i.e. Tier-1 Tessera, used to define the metadata, for example streamlengths, of each Tile in the grid of Tiles comprising Tier-0 as described above.

Conceptually the following may be described as the extension of the principles described with reference to Tier-0. The elements which define each N×N Tile are combined so as to define a single entity.

The following description is made with reference to a frame of video data of size 256×256 elements and a fixed sized encoding unit of size 16×16 elements. This is a non-limiting example, and the below described process can be applied to a frame of video data of any size, e.g. 128×128, 512×512, 1024×1024, etc.

At step S302, a Tableau is created of dimension 16×16. As described above this Tableau is used to store the streamlengths of the residual information of each 16×16 Tessera of residual data. Note that other metadata associated with the Tiles could be stored in the Tableaux, for example metadata associated with the distribution of the residuals in the Tiles.

In an embodiment, a Tableau may be initialised such that each of its 256 elements are set to have the value "0". In such an embodiment, a first pass must be made over every element on the Tableau setting its value to zero.

In a further embodiment, every leaf node of a Tableau is visited and the value set accordingly.

The setting of the values is as described with reference to determining the values of the quadtree for Tier 0.

At S304, the order in which to visit each element of the Tableau created in S302 is determined. In an embodiment, the order is set to be the z-order traversal of the Tableau. This enables the elements of the Tableau to be visited in a sequential manner. In further embodiments, other orderings could be used such as random order, incremental row traversal, etc. Preferably the order is the same as used for the preceding tier (Tier-0).

At S306, a position is set to track which element on the Tableau is currently being visited. The current position on the Tableau is set to be the first position as found according to the traversal order computed at S304. A position on the Tableau refers to the location of a single element and in an embodiment can be an integer index corresponding to the traversal order of the elements of a Tableau. In a further embodiment, the position can be an integer tuple representing the row and column location of the element on the fixed size encoding unit of the Tableau.

At S308, the streamlength is computed. This corresponds to the total bits or bytes needed to encode the residual information of each of the Tiles. The streamlength is stored in the current location on the Tableau. In an embodiment, a mapping function is used to record the value to be stored. In an embodiment, this mapping function is identity (Equation 1 below). In further embodiments, other mapping functions may be used such as prefix difference (Equation 2 below).

In some examples, when a Tessera is encoded, a mapping function may be used to calculate the value to be encoded. At a specific location i on an N×N block, where i is in the range $[0, N^2)$, the value of the element at said position is represented as $u_i$ and the value to be encoded is represented as $v_i$. The mapping function, f( ), can be used to calculate the value to be encoded from the value of the element such that:

$$v_i = f(u_i) \tag{1}$$

In some examples, the mapping function is set to be the prefix difference function such that $$v_i = f(u_i) \tag{2}$$
$$= (u_i - u_{i-1})$$

where $u_0 = 0$.

At S310, a check is made to see whether all positions in the ordering found in S304 have been visited. If the result of this check is false, and there are still positions to be visited, then the process proceeds to step S312. At step S312, the current position is set to be the next position to visit in the list. If the result of the check at step S310 is true, then the process proceeds to S314.

At S314, the Tableau created in S302 now contains the streamlength information related to each 16×16 Tiles of the original 256×256 residual grid. As not every element of the Tableau will be non-zero, in a preferred embodiment the Tableau is encoded as a sparse quadtree. Therefore, at S314 the sparse quadtree structure for the Tableau is computed according to the means described above.

The sparse quadtree is defined in the same manner as described above with the reference to Tier-0. Again, the data is encoded in a strictly bottom-up manner in order to sparsify the data.

The above process may be repeated as many times as necessary in order to define a desired frame size, and resulting in a further hierarchical tier e.g. Tier-2, Tier-3 etc., with each tier having its own sparse quadtree to map streamlengths of its constituent elements. The final hierarchical Tier will define a single Tableau.

As noted, techniques described herein provide for parallel processing and random access to a portion of data to be decoded and recreated. The decoding of each module may be implemented using separate FPGAs or on a GPU, processor or using virtualisation. In each case, the optimisation of processing can be improved as parallelism allows replicability. For example, an FPGA may comprise a replicated processing block to enable each data structure to be decoded in parallel. Similarly, a single instruction can be executed on multiple processors at the same time and where the structure of processors is the same, each can be performing the same instruction at the same moment. If no instruction is to be performed, the processor may simulate an instruction being performed by others. Further, random simultaneous access may facilitate for example, that two decoders access the same memory for different purposes within a plane among certain spatial locations.

Where a special offset value may be signalled, such as −1, this may be used as an escape character to signal to the decoder any information. In a particular example, a −1 character for example may signal that the next character may be a raw binary number streamlength where it may be more economical not to send an optimised streamlength offset as described elsewhere in the present application.

In certain embodiments, techniques described herein also facilitate metadata injection. That is, invisible data can be sent in a bytestream that is invisible to a standard decoding process because it is bypassed by a streamlength offset however a subsequent decoding process or simple retrieval may be able to access the data. For example, 'invisible' metadata may be for copy protection or for signalling to a decoder the content of the plane or frame of data.

As noted above, the present invention provides a technique and apparatus for decoding, data, which is applicable in particular to transmitting and storing image and video data. The present invention is particularly advantageous when used in combination with techniques for encoding a sparse 2D array into a data stream and recreating a sparse 2D array from an encoded data stream.

Such a technique can take advantage of the sparseness of a 2D array of data to be decoded and/or encoded, that is the relative amount of zeros in the expected array and the way those zero values are grouped within the array. Similarly these techniques are beneficial where the frequently occurring values are of any predetermined value, instead of zero, but are identical and grouped together.

Typically the data can be of any nature as long as the values can be mapped into a 2D array, although the techniques are also applicable to linear data and most beneficial for image reconstruction. In the case of a picture or video, the data could be values associated with a colour space (e.g., the value of a red component in an RGB colour space, or the value of a Y component in a YUV colour space, etc.), or alternatively the data could be residual data (whether transformed or not) or metadata used to decode a bytestream. Residuals are further defined in the present application, but in general residuals refer to a difference between a value of a reference array and an actual array of data.

It should be noted that techniques described in the following examples are agnostic as to the meaning or use of the decoded array. Rather the concept of decoding a sparse array from an encoded bytestream is discussed, for example. Of course, the data set may be used to reconstruct a larger dataset by combining multiple decoded data sets. Once recreated the data may represent any information which has been compressed, such as an image or sonogram. As will be understood from the following described examples, encoding and decoding techniques wherein a quantity of data to be compressed and transmitted or stored by way of a scheme involving encoding the data in a hierarchy of data structures from which the original data can be reconstructed are especially suitable for use with the invention.

A plurality of individual datasets may combine to reconstruct a larger dataset and the dimensions of the individual data sets within the larger array may be chosen according to an optimal size for processing of each data set in parallel. For example, using OpenCL terminology, the work-item for each dataset may be made more efficient by limiting the dimensions of the sub-datasets.

The following examples relate to an illustrative example of de-sparsifying and decoding a specific sparse array. In particular, the description shows how processes of de-sparsification and decoding can interact with each other. Although the description refers to a specific example, the skilled person would readily understand the general principles behind it and how the process can be applied more generally to de-sparsifying and decoding data.

FIG. 8 illustrates an example of a recreated sparse 2D array 100 which will be used throughout the present description. This array is the recreated array which is encoded in an example bytestream. As can be seen, the array contains a large amount of zeros and small clusters of non-zero values, as symbols.

The technique of this example takes advantage of the sparseness or consistency of the data by not sending or implicitly signalling quadrants (or blocks) where the array is sparse (or consistent) and thus achieves compression gains. Moreover, since the decoder does not need to store significant data in memory or monitor for defined symbols, decoder efficiency can be improved.

If no data is sent for quadrants in the array, there are introduced of course significant challenges at the decoder. The following sets out a technique by which a decoder may recreate a 2D array of sparse data where much of the sparse data has not been received, while any non-zero values are accurately located within the array, efficiently. In particular, the specific structure used to encode and/or decode the data together with the order used to decode said structure enables the technique to minimise the amount of information needed to be received by the decoder, thus optimising decoding and reducing the amount of data to be transmitted. Moreover the data structure and implementation provides for efficient implementation in terms of both processing capability and speed and memory usage.

During the process of decoding, an ordered tree is built. Code symbols from the bytestream are converted to decoded symbols and attached to nodes of the tree. The invention introduces a special symbol which is used by the decoder to build the tree. We refer to this special symbol here as a node symbol. The node symbol indicates to the decoder how to build the tree. Within the node symbol is information which tells the decoder how to map the information from the bytestream to the tree and what it can expect in the bytestream. Using a specific traversal order, the decoder maps the nodes symbols to the tree and can subsequently map the data received in the bytestream to leaves of the tree in the correct locations. The spatial information or the order of the original information is then contained within the tree. The mapping of the node symbols and traversal leaves blank spaces in the tree which can be simulated or inferred to indicate that a predetermined value was in that location in the original information but was not sent in the bytestream.

Within the bytestream, the node symbols are interspersed. That is, the node symbols and data symbols occur between or amongst one another within the bytestream and the different symbols can also be thought of as distributed or dispersed among each other within the bytestream. A feature of the bytestream is that the decoder cannot know the order of node symbols and data symbols prior to the decoding process. Thus there is no set or predetermined ordering to the interspersal of the symbols. The location of the data symbols is deduced from the information contained within the node symbols. The node symbols and data symbols may not occur within the bytestream one by one or regularly but rather will be present within the bytestream irregularly, but not randomly.

Figure 9A:
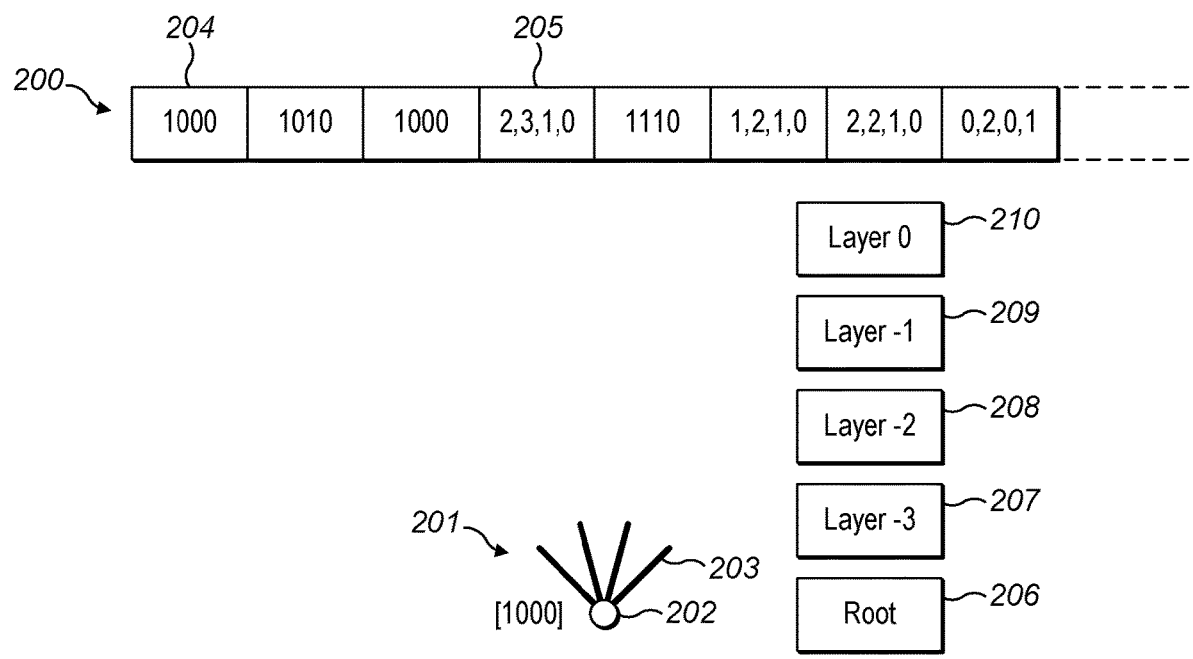
FIG. 9a illustrates a logical representation of a bytestream and an intermediate stage of processing an ordered tree.
Figure 9B:
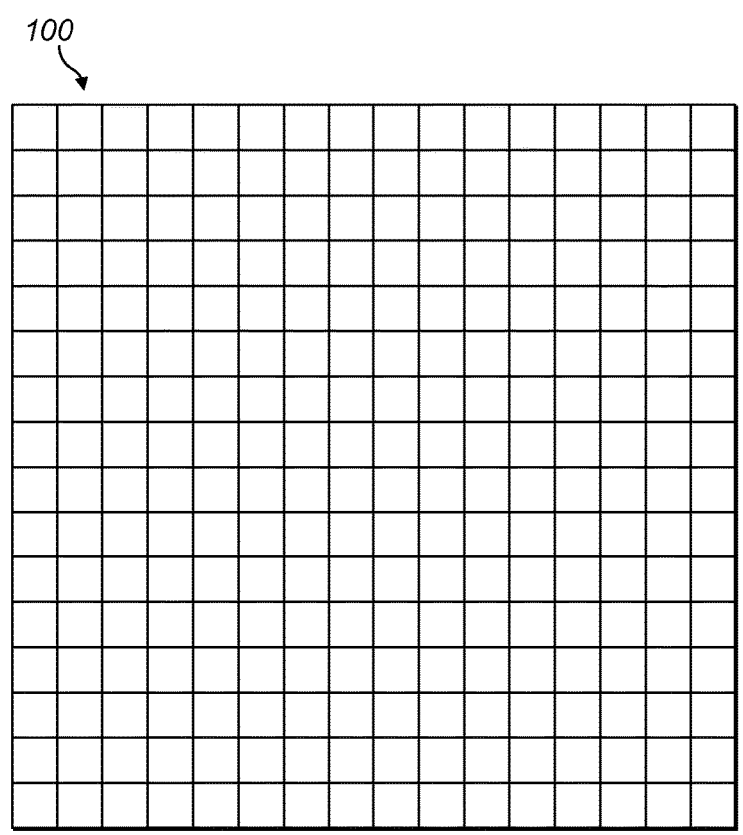

The following elaborates on the process in more detail. With reference to FIG. 9a, the technique first reads the stream 200 to identify a first symbol. The figures in general, and FIG. 9a for example, show a representation of the received bytestream 200. As will be understood, the representation 200 is not truly a bytestream but rather a logical representation. For the purposes of this description, we assume the decoder knows or otherwise has identified the stream length from a wider bytestream along with other metadata and we consider only a specific, simple encoded dataset. The logical representation is separated into bytes or nibbles. The logical representation is a series of four-bit values or nibbles, each representing a T-Node Symbol 204 (node symbols), and a series of four symbols 205 (data symbols) each representing a value and a node in the Top Layer, or Layer 0. This will become clear from the below as the process of decoding the data is explained.

The decoder begins by building a tree 201. A tree is a well-known data structure in computer science. In particular the tree is an ordered tree, that is, the tree is a rooted tree in which the order of the subtrees is significant. The exemplary tree 201 is a quadtree composed of nodes and edges that connect the nodes 202, however binary trees, octrees and other trees may be utilised depending on the information to be compressed. A parent node is connected to a child node by an edge. In a quadtree, each parent node has exactly four child nodes. A quadtree can contain a number of leaf nodes. A leaf node is defined as a node containing no children and may alternatively be referred to as an outer-node, or terminal node. A root node is defined as a node without a parent. Nodes containing both parents and children are referred to as inner-nodes.

The present example technique defines a data structure called a sparse quadtree. In the sparse quadtree, each parent node has either exactly four child nodes, or no children.

As mentioned above, once the tree is built, the Top Layer 210 of the tree, or the final layer, includes the data values of the array 100. The order in which the data values are included in the tree represents the spatial information of the array. In the present example, since we are illustrating the concepts using a quadtree to recreate a 16×16 grid of data, there are four layers and a root in the tree giving 256 possible leaves, each representing a value in the 16×16 grid. As mentioned, other sized grids may utilise different ordered trees.

During decoding, the tree 201 is traversed in a generally bottom to top definition; that is, the tree 201 is generally traversed from the lowest level to the highest level. The tree is generally traversed as greedily from low to high as possible interleaved with minimal backtracking to scan over the breadth. In an embodiment, the tree is traversed in a depth-first pre-order manner. This allows for spatial information to be utilised as part of the encoding and decoding process. It further ensures that the elements are decoded in the same order that they are encoded. In further embodiments, other traversal methods could be employed to utilise further aspects of the structure of the tile such as breadth-first, in-order or post-order. What is essential is that the same traversal is used in the decoding as the encoding to ensure that spatial information is retained. Thus, the sparse quadtree data structure defines the instances and location of data.

The data in the bytestream 200 may either be a node symbol 204 or a data symbol 205. The node symbol 204 is a series of binary values or flags that indicate to the decoder if a particular branch in the tree 201 has an expected child where the branch has an expected child if there is a data node included in the data set for the Top Layer descendants of that branch. That is, the bytestream contains information on the existence of a child node or not. If not, it can be assumed that all descendant leaves from that node are the same, predetermined value (in the example the value is zero). When the decoder traverses the tree to reach a leaf (a node in the Top Layer), the bytestream 200 contains a series of four data symbols 205, each representing a value of the leaf of the tree. The tree can be subsequently mapped to a grid using a defined order with each leaf on the tree corresponding to a location in the grid. In this way the spatial information of the grid is inherent or predetermined by the structure of the tree and is not signalled.

As indicated above, the node symbols and data symbols are interspersed within the bytestream. As the decoder parses the bytestream and builds the tree, it can assign the data symbols identified to a data location within the tree. By building the tree with a predetermined traversal, the decoder can anticipate whether the next symbol in the stream will be a data symbol or a node symbol.

If the surface was less than 16×16 (for a tree with 5 layers) the decoder could at some stages anticipate that "what would for a 16×16 surface be anticipated as the next symbol" has been omitted from the bytestream and hence anticipate a different next node or data symbol. For example, only node symbols and data symbols that are in the signalled area may be transmitted, thus preventing the sending and receiving of certain node symbols and data symbols. Similarly, certain bits of a node symbol may be set as any value but may not be treated as real values corresponding to areas of the array during decoding. The signalled region/volume may also include every node whose node symbol has a mixture of masked and non-masked bits, as will be described below.

When reaching the Top Layer, the bytestream will preferably include all four data symbols for a branch, even if the data symbol corresponds to the predetermined value, i.e zero for a sparse tree. That is, the data symbols are explicitly encoded for all nodes in the outer layer or lowest level of abstraction. When this is considered in the grid representation, all values in the smallest blocks are sent when at least one of the values of the block is non-zero. Optionally, the node symbol that corresponds to the penultimate layer in the tree is not sent but rather is implicitly assumed by the decoder. Since in this scenario the data symbols are explicitly sent, it will be understood that the node symbols in this layer would be understood to include a set of positive flags (or [1111] as will become clear from the description below). Note that the value may not be positive but may be a masked value.

Another way of looking at this implicit signalling feature is that a node symbol is sent or included within the bytestream only if a grandchild node exists for the visited node of the tree. In other words, a node symbol shall have a grandchild node. The quantity of code-less layers (currently 1) could be alterable.

At the decoder, since it knows not to expect a node symbol for this layer, the decoder can assume the symbol to be retrieved is a data symbol when this node is visited in the traversal and can build the branches of the tree accordingly.

It has been identified that such a combination of implicit node symbols signalling and explicit data symbol signalling achieves optimal efficiency whilst minimising memory storage. Since the node symbol for the layer is not sent in the bytestream but rather all data symbols in the outer layer are sent, then overall this achieves efficiency gains in practice where it is statistically likely that non-zero values are clustered or grouped together within an overall data set.

In the art, there is no consideration of the effect on the subsequent stages of encoding after sparsification. According to the present disclosure, sparsity can be ignored where this makes sense to help the entropy encoder avoid encoding rare symbols. Also, the invention optionally allows a dense quadtree, by arrangement, if there is too little sparsity to justify the node symbols (which will become implicit [1111] s).

In the figures the stage of building the tree is illustrated in the Figures labelled a and the knowledge the process has of the gild is illustrated in the Figures labelled as b. Thus in FIG. 9*a*, the process knows that the tree 201 has a root 202 and since it is a quadtree is has four branches 203. The process cannot yet deduce any information to map to the grid 100 of 2*b*.

As shown in FIG. 9*a*, the reconstructed tree structure has a set of layers. A layer is considered to be the subset of nodes that have the same Distance from the root. The Distance is the minimum number of Branches (or edges) between two nodes. The number of layers is set by the size of the array which is to be reconstructed. This size may be either predetermined or may be signalled in the bytestream.

Where combining multiple datasets, the number of layers corresponds to the dimensions of the grid and so may be set to optimise parallel processing, that is, that each work-item is made optimally efficient.

The example considers a quadtree but the nodes may have any number of children. The tree may accordingly be referred to as an n-Tree, a tree where no node has more than n Children. That is, a quadtree is an n-Tree where n is 4. A quadtree is well known in the art and is a tree data structure in which each internal node has exactly four children except leaf nodes and all leaves are on the same level, the level corresponding to the locations in the grid. The data can be stored compactly in an array as an implicit data structure.

In the example described, the tree has four layers 207, 208, 209, 210 and a root 206 which reconstructs a tree for a 16×16 grid. That is, the Rise is 4. The Rise is the absolute value of the Altitude of the Root of an n-Tree. It corresponds to the number of Layers in the n-Tree excluding the Root. The Altitude is an index, −j, increasing with Distance from Root, reaching 0 at maximum Distance from Root. Note: −j is always ≤0. In other words, the Number of Layers in an n-Tree corresponds to Rise plus 1.

For completeness, a node at Altitude −j−1 is a Parent of a node at Altitude −j, where both nodes are linked together by only one Branch and a node at Altitude −j+1 is a Child of a node at Altitude −j, where both nodes are linked together by only one Branch (or edge). A node at Altitude −j+x is a Descendant of a node at Altitude −j, where x is the Distance between the two nodes and a node at Altitude −j−x is an Ancestor of a node at Altitude −j, where x is the Distance between the two nodes.

The decoder begins to build the tree 201 once it has read the bytestream. At this stage, the grid 100 is empty as shown. The decoder knows that the tree 201 must have a root node 202 and simulates four branches 203 from that root node 202 as the decoder knows that the tree 201 is a quadtree (or 4-tree). Thus the root 202 and the first four branches 203 are known or assumed.

Where we describe the steps of simulation, it will be obvious to the skilled person that these steps are for illustration only and can be implemented by the skilled person in different ways or orders.

The tree can be traversed in any known manner. The example here utilises a depth-first approach, specifically a Depth-First Pre-Order Traversal. A Depth-First Pre-Order Traversal can be considered to be a strategy for traversing an Ordered Tree from least to greatest Altitude. If a Leaf is reached, the strategy backtracks through Ancestors of that Leaf, before traversing further sections of the same Tree.

In other words, the tree is deepened as much as possible on each child before going to the next sibling. In context, the decoder will start from the Root 206 of the tree and proceed towards Layer 0 210, the Top Layer, as far as possible before retreating to the next sibling in the previous Layer. The decoder will repeatedly retreat after all siblings in that layer have been visited until a Depth-First Pre-Order Traversal of that grid has been completed.

Returning to the example of FIG. 9a, the first 4-bit value 204 of the stream 200 is taken. In this example, the value is 1000. This value may be referred to as a T-node symbol. A Label is data attached to a node in a Tree other than what is implicit in the Tree's structure and order of nodes. The T-node symbol informs the decoder of the data in the stream and tells the decoder how to reconstruct the tree 201.

In the 4-bit value of the stream, the T-Node Symbol, a "1" indicates that the Child of the node is an expected child, that is, there will be data sent in the stream representing the Children of that node—or, alternatively, a "1" indicates that the Child node will have itself children, and therefore it will be present. On the other hand, a "0" indicates that the Child of the node is not expected, that is, no data will be sent in the stream for those nodes and no child is expected to be received for that branch—or, alternatively, a "0" indicates that the Child node will not have itself children, and therefore it will not be present. The decoder can assume that all the leaves from those latter branches are zero values. This will optionally be simulated and is described below.

At the end of the branches 203 of the root node 201, the decoder now knows that there is a node having further children for which data will be received in the stream and three nodes for which no further data was or will be sent.

Figure 10A:
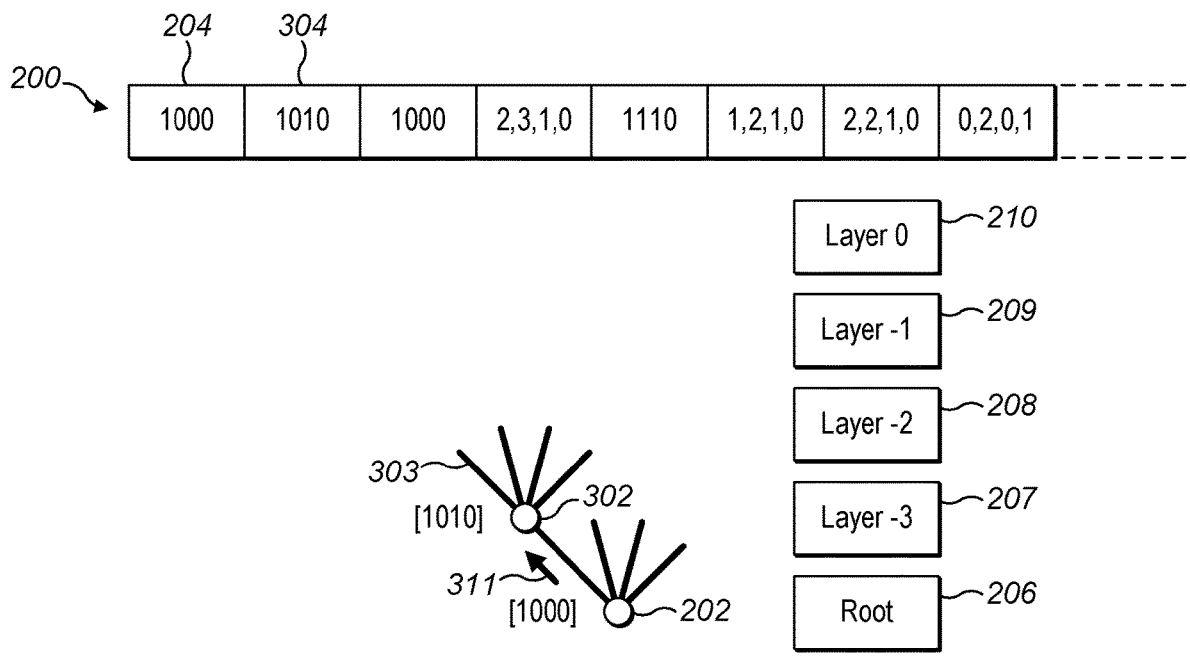
FIG. 10a illustrates a logical representation of a bytestream and an intermediate stage of processing an ordered tree.
Figure 10B:
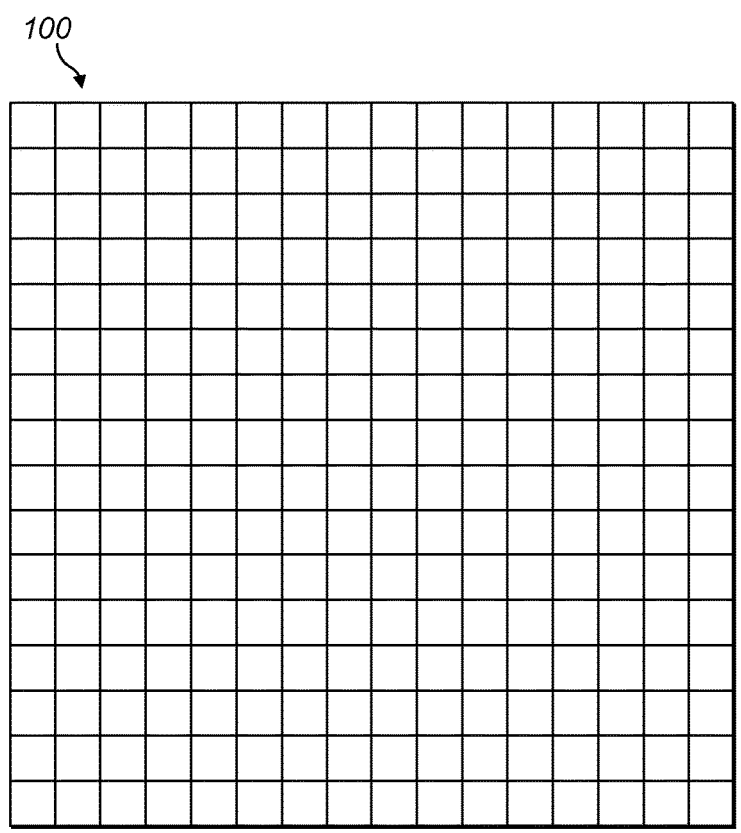

In the depth-first pre-order traversal order and referring to FIG. 10a, the process moves to the left-most node 302. There was a 1 received in the stream for this branch in the T-Node Symbol 204. It will be recalled that the T-node symbol 204 indicates that further data will be received, the next 4-bit value 304 of the stream is taken. In this example, the value is 1010. The decoder simulates the 4 branches of that node 302, as shown. Again, no information in the grid 100 of 3b can be deduced.

Figure 11A:
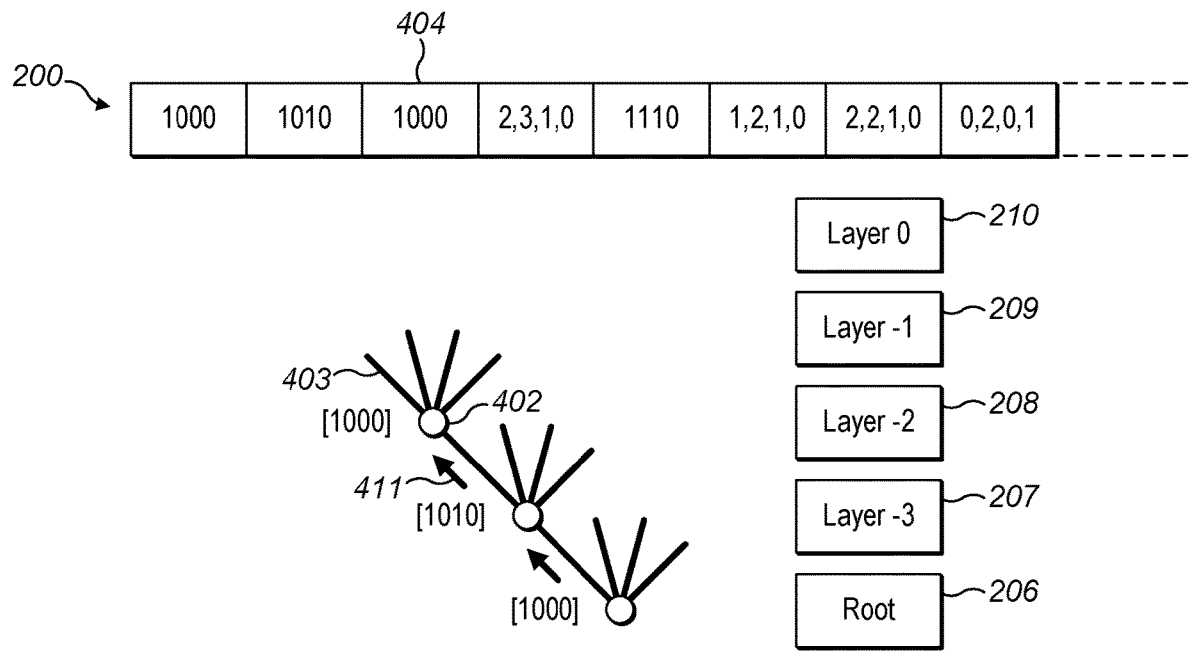
FIG. 11a illustrates a logical representation of a bytestream and an intermediate stage of processing an ordered tree.
Figure 11B:
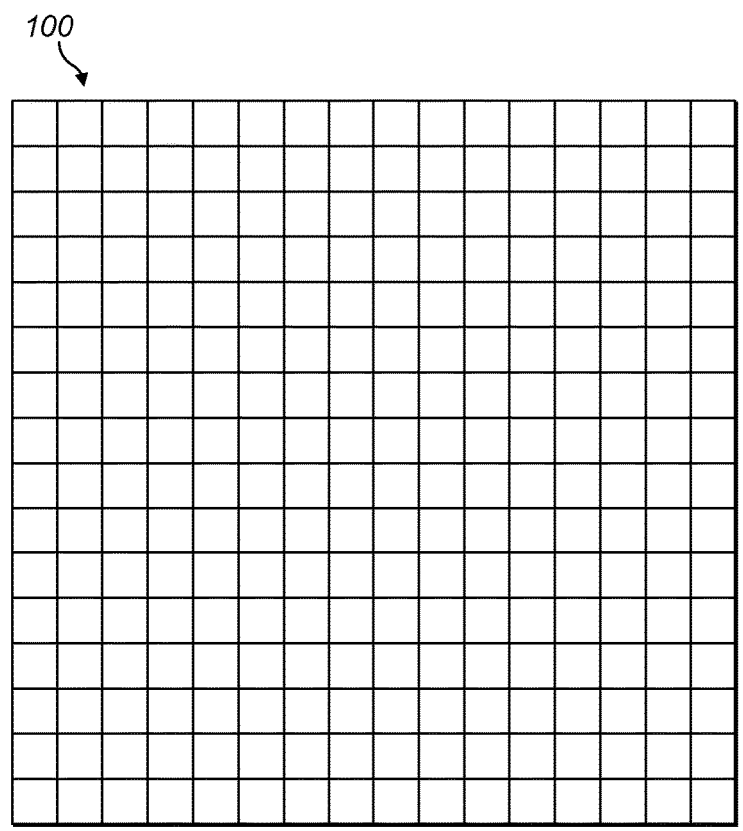

Arrow 311 shows the traversal as will be explained in more detail below. The left-most branch 303 is traversed and since the first value of the T-node symbol 302 is '1' the decoder looks to the next 4-bit value. The decoder is now in Layer −2 208 as shown in FIG. 11a. As shown, the data retrieved next 404 is 1000 signifying that further data will be received for the leftmost branch 403 but no further data will be sent for the three remaining branches. Again, no information in the grid 100 of FIG. 11b can be deduced and arrow 411 illustrates the traversal.

The decoder has now populated the root and the left-most part of the Layers-3 207 and −2 208 from the left-most node of Layer-2 208, as shown in FIG. 11a. Moving to FIG. 12a, since the decoder has reached Layer −1, it now expects 4 data symbols. It is noted that all values in Layer 0 are sent if the decoder reaches that level even if the actual value is zero (for a sparse array or alternatively the same as the predetermined value) and thus no symbol is signalled for Layer −1 209 since this will always be known and no symbol is attached to the node 512 of this Layer.

The decoder now takes the data symbols from the stream to populate the tree in the nodes 513 of the Top Layer. In the example the symbols or values are '2', '3', '1' and '0' and the decoder populates the tree as shown in the Figure. In the example traversal order, the tree is populated with the symbols from left to right and each Leaf in Layer 0 (the Top Layer) is known. The four data symbols can be considered as part of a Label recalling that a Label is data attached to a node of the tree. Again 511 shows the traversal order.

Rather than send the node symbol of Layer-1, which in this example would be [1110] (only if you chose to send the pre-determined value of the $4^{th}$ symbol implicitly) since the fourth data symbol in this quadrant is a 0, the preferred implementation instead includes all data values for this quadrant in the bytestream directly, even if the value is a zero (or the predetermined value). In other words, all sibling data values are sent where at least one sibling is non-zero. In this way the Layer-1 node symbol need not be sent. It has been shown that the implicit signalling of the node symbol for Layer-1 and the explicit signalling of all values for each 2×2 block containing a non-zero value is more efficient than sending non-zero values only and signalling their location in the bytestream.

If for example the tree was a binary tree, instead of encoding and sending the penultimate layer, the bytestream instead would include both data values where at least one of two neighbouring data values is non-zero.

Once the data symbol has been retrieved, in a preferred implementation the tree beneath that data symbol can be trashed to the extent it is no longer needed. In this way, efficient use of memory resources can be achieved as the interspersed data symbols result in the entire structure of the grid not being needed in order to accurately identify or place the data values.

The following is a summary of the present example:
1) the first T-Node Symbol of the bytestream (1000) corresponds to the T-Node Symbol of the Root Layer;
2) the second T-Node Symbol of the bytestream (1010) corresponds to the T-Node Symbol of Layer −3;
3) the third T-Node Symbol of the bytestream (1000) corresponds to the T-Node Symbol of Layer −2;
4) there is no T-Node sent for Layer −1 because the T-Node of Layer −1 would always be (1111), and therefore it is implicitly present once the T-Node Symbol of Layer −2 has indicated there is a child node and data symbols for that branch;

5) The values in the Label correspond to Layer 0 and are "attached" to the branches of Layer −1.

For further clarification, within a data structure there are five layers (wherein a layer is a set of nodes), from the Root Layer to Layer 0. Each Layer is associated with a set of data. In the case of the Root Layer, Layer −3, and Layer −2, this set of data is called a 'T-Node Symbol' or node symbol (these terms may be used interchangeably) and effectively indicates whether the four children node from a specific layer will have children (in which case it is a logical value of "1") or no children (in which case it is a logical value of "0"). Where there are no children, this indicates that no data symbols exist in the Top Layer for that branch of the tree. Layer 0 is a special layer in that it contains leaves, i.e. nodes with no children, and in particular includes the data symbols in those leaves.

In the bytestream, there will be node symbols for the Root Layer, Layer −3 and Layer −2. Due to the way that node symbols work and their meaning (as described in this application), and the fact that Layer 0 is the "final" layer, node symbols for Layer −1 is implicitly sent, since the node symbols in Layer −2 would have already implicitly indicated whether or not the child node of Layer −2 (i.e., Layer −1) has children. Given that the children could only be the data symbols in Layer 0 (residuals or metadata for example), then the bytestream would only simply directly indicate Layer 0 data symbols. Note we have a maximum of 21 node symbols for each data structure (one for the root, up to four for Layer −3, and up to 16 for Layer −2).

From a nomenclature point of view, the term "Label" may refer to: (a) a node symbols for Root Layer or Layer −3 (e.g., in the present figures these would be data blocks [1000] and [1010]) (b) the "group" of Layer −2 and the data symbols of Layer 0 (e.g., in the present figures, these would be either the third and fourth data block in the bytestream, i.e. [1000] and {2,3,1,0} or the last four data blocks in the bytestream, i.e., [1110], {1,2,1,0}, {2,2,1,0} and {0,2,0,1}) and (c) each individual data symbol in Layer 0 (e.g., in the present figures, each one of data blocks {2,3,1,0}, {1,2,1,0}, {2,2,1,0} and {0,2,0,1}).

Figure 12A:
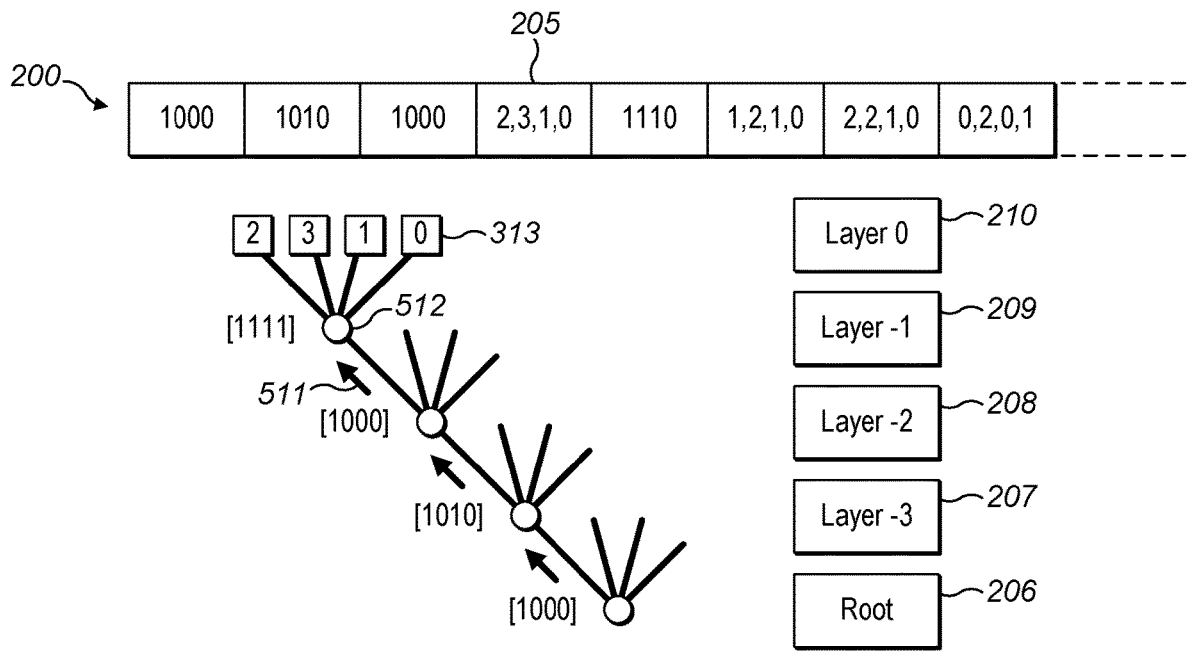
FIG. 12a illustrates a logical representation of a bytestream and an intermediate stage of processing an ordered tree.
Figure 12B:
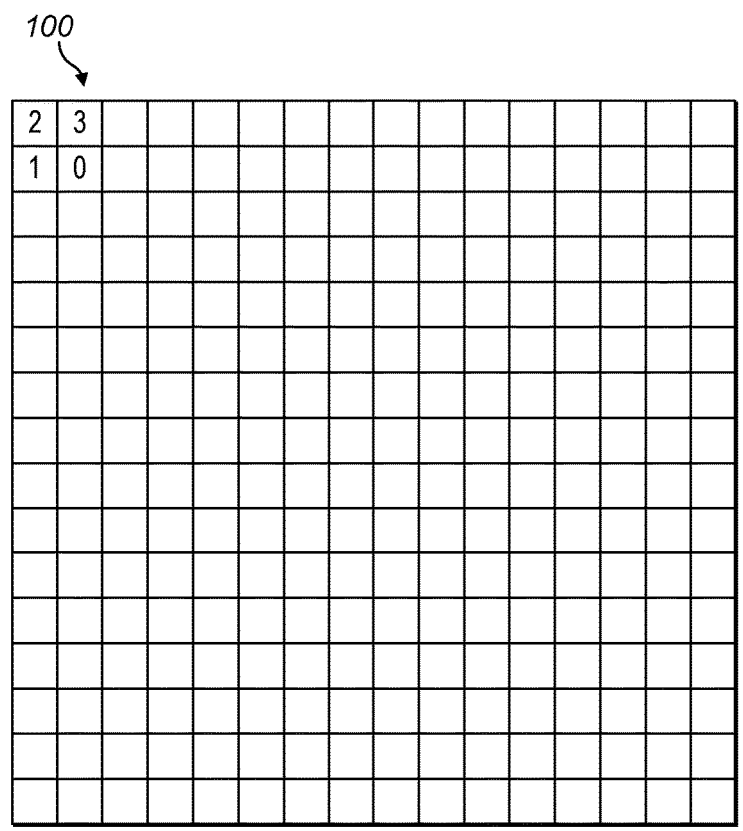

We now have values which can be mapped to the grid 100 as shown in FIG. 12b. Whether the grid is populated as the tree is populated or after is unimportant but we populate the grid here when the data is placed into the tree for illustrative purposes. As above, the tree can be mapped using spatial information inherent to the data structure. In practice, the process may wait until the entire tree is populated.

Each data symbol or value is referred to in the examples as a discrete value however in preferred embodiments the value in the array is a differentially encoded value which is relative to another symbol in the data set. In other words, differences may be relative to the values for the previous non-sparsified element, apart from values in the first non-sparsified element of a grid, which are absolute. For example, if the first value is 4 and the second value is 5, the first value retrieved will be a 4 and the second value will be a 1, which is the difference between the first value and the second value. As will be understood the difference values can be translated into real values before the mapping or as a part of the mapping.

As shown in FIG. 12b, the 16×16 grid 100 of decoded values can be populated by the symbols received. A grid is a fully populated, dense, rectangular 2D array. The four symbols represent a 2×2 block in the upper left of the grid.

In the example, the 2×2 block is ordered: top-left, top-right, bottom-left, bottom-right. As will be understood, in practice this order may be any order provided the encoder and decoder are in agreement.

The values in the stream shall be interleaved in the example in depth-first order, which corresponds to z-order in image space. The z-order is defined recursively in the examples but of course this may be any order, as will be understood. Z-order is an ordering of overlapping two-dimensional objects. In the example, the data of the tree is mapped to the grid in a Morton ordering. A Morton ordering maps multidimensional data to one dimension while preserving locality of the data points. It was introduced in 1966 by G. M. Morton. The Morton order for the example is sub-partitioned into 2×2 blocks. The terms Z-order, Lebesgue curve, Morton order or Morton code are used in the art.

Morton ordering is well known in the art and will be understood. It will also be understood that any suitable mapping of the data from the tree into the grid may be utilised.

In practice Morton ordering using 2×2 blocks means that the symbols of the tree are mapped to the grid in the following example order for an 8×8 grid:

| 0 | 1 | 4 | 5 | 16 | 17 | 20 | 21 |
|---|---|---|---|---|---|---|---|
| 2 | 3 | 6 | 7 | 18 | 19 | 22 | 23 |
| 8 | 9 | 12 | 13 | 24 | 25 | 28 | 29 |
| 10 | 11 | 14 | 15 | 26 | 27 | 30 | 31 |
| 32 | 33 | 36 | 37 | 48 | 49 | 52 | 53 |
| 34 | 35 | 38 | 39 | 50 | 51 | 54 | 55 |
| 40 | 41 | 44 | 45 | 56 | 57 | 60 | 61 |
| 42 | 43 | 46 | 47 | 58 | 59 | 62 | 63 |

Figure 13:
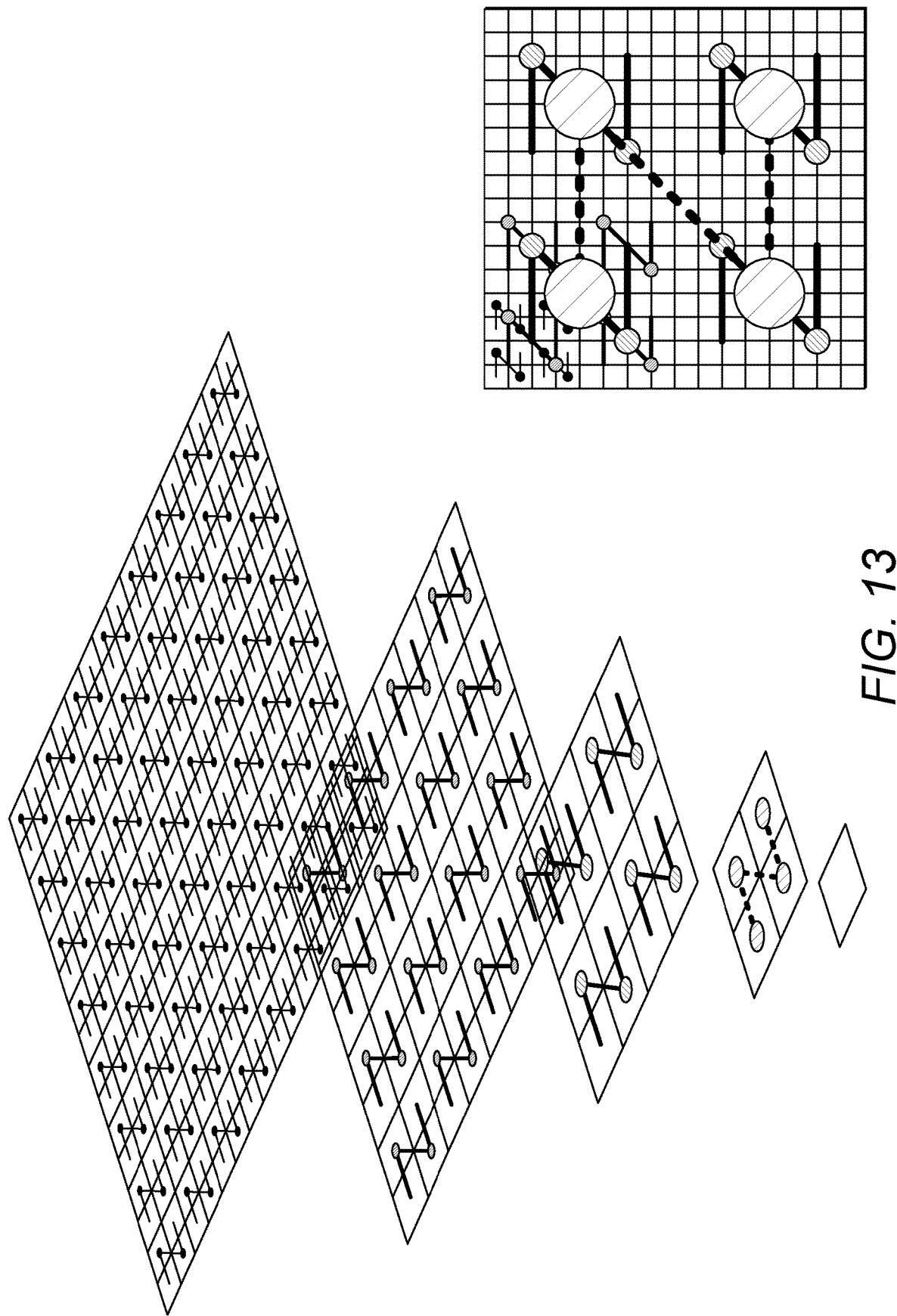
FIG. 13 shows representation of a Morton order mapping of the ordered tree to a grid.

When considering the mapping of the tree to the grid, it can be considered that the z-order mapping results in each branch of the tree being a quadrant of the grid. The Layer −1 branches each being a 2×2 block, the Layer-2 branches each being a 4×4 block and the Layer −3 branches each being an 8×8 block (the Root representing the 16×16 grid). The Morton ordering and depth-first pre-order traversal are illustrated figuratively in FIG. 13.

While a Morton ordering is a preferred ordering, it is also contemplated that other orders such as a Hilbert space-filling curve, also known as a Hilbert pattern or Hilbert curve, may be used which may provide implementation or efficiency gains depending on the array to be compressed and the likely locations of non-zero elements in the array. In certain circumstances the Hilbert curve ordering will also have better locality preserving behaviour.

Figure 14A:
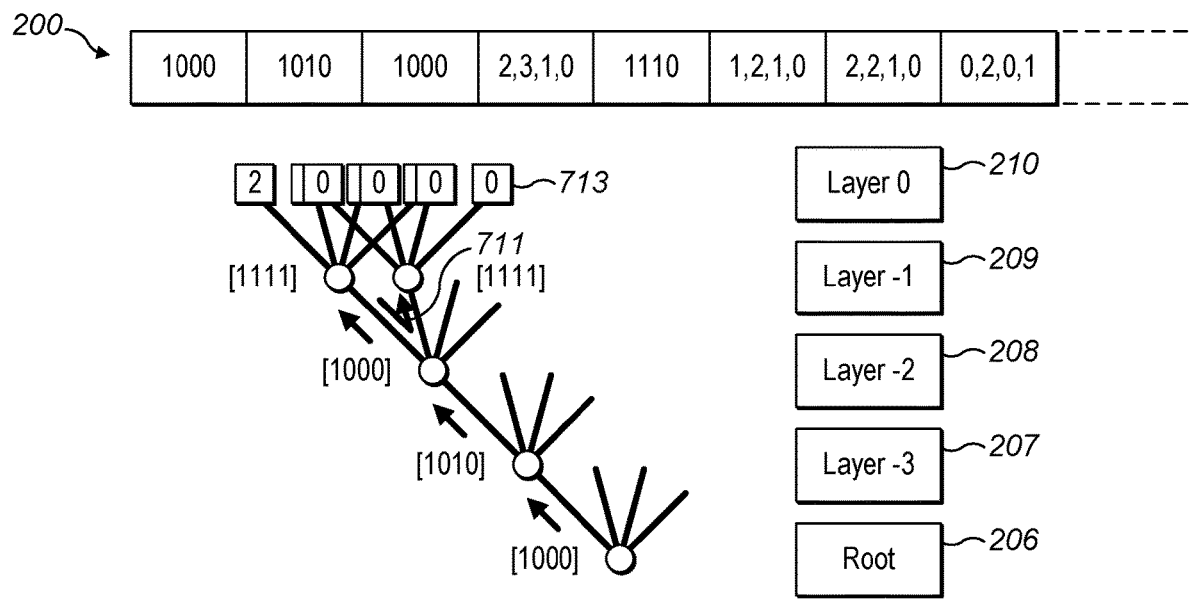
FIG. 14a illustrates a logical representation of a bytestream and an intermediate stage of processing an ordered tree.

With reference to FIGS. 12a and 12b, it can be seen that the first four symbols have been decoded and mapped. Following the traversal order, the decoder decodes the tree, as shown in FIG. 14a. Arrow 711 shows the traversal order. Since the data previously received for Layer-2 indicated a 0 value for this node, the decoder is able to simulate or infer the sparse portion of the tree and map zero values to the grid. Where a 0 is received in the T-node symbol, the 0 indicates that no data will be sent for that node. If no data is to be sent, the decoder assumes the value is zero.

The present context assumes that the grid is sparse and so assumes a zero value where no data is sent. Of course it will be readily understood that any value could be used as the value that is not sent. For example, the value not sent could be any value or a 1.

Figure 14B:
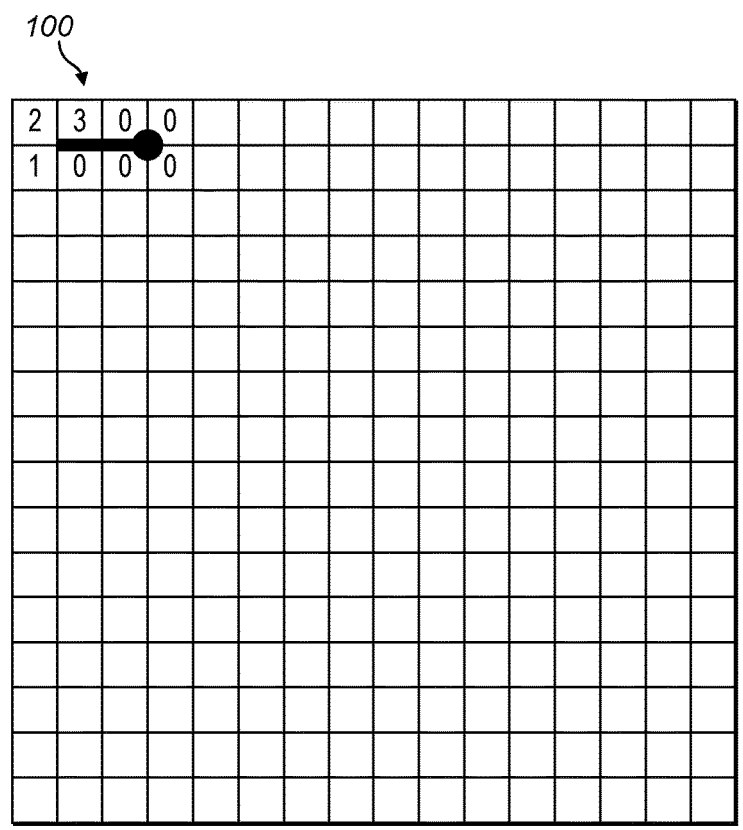

As shown in FIG. 14a, the process assumes that the values 713 in the Top Layer 210 are zero and simulates the tree. The zero values can then also be mapped onto the grid 100 following the z-order mapping as shown in FIG. 14b. The four zero values are mapped to the 2×2 block to the right of the 2×2 block previously mapped.

While we describe a process of simulation here it will be understood that the traversal can instead be terminated for that branch and the grid populated using the inferred values without having to simulate the tree as the values will be indicated by the termination of the traversal. However, we describe simulation here as an implementation option which allows for clearer presentation of the technical concepts.

Figure 15A:
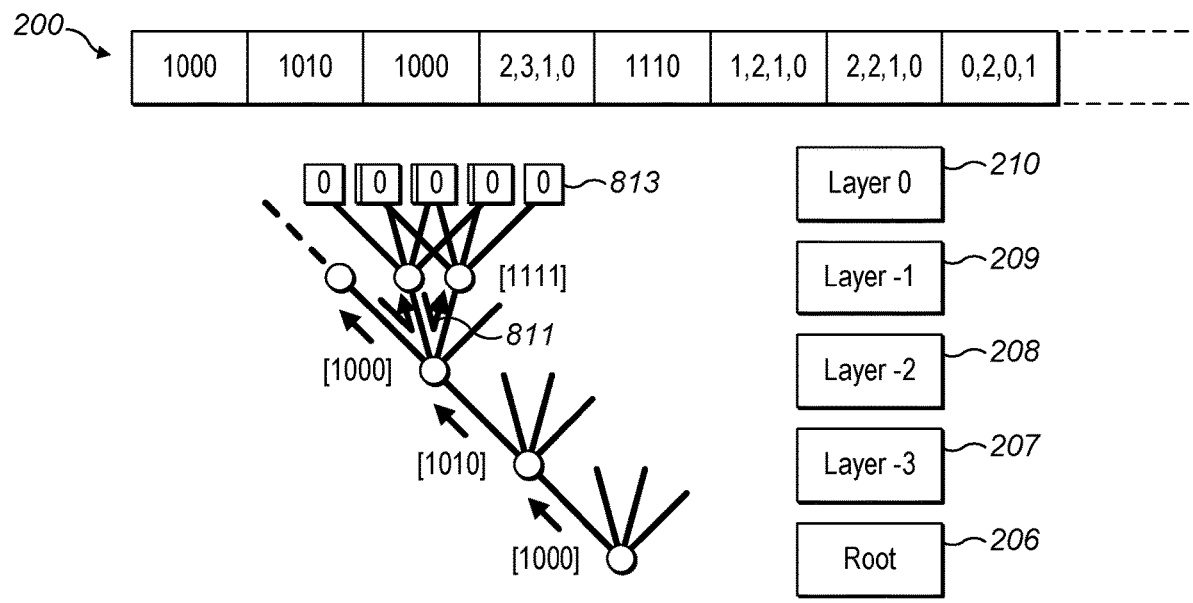
FIG. 15a illustrates a logical representation of a bytestream and an intermediate stage of processing an ordered tree.
Figure 15B:
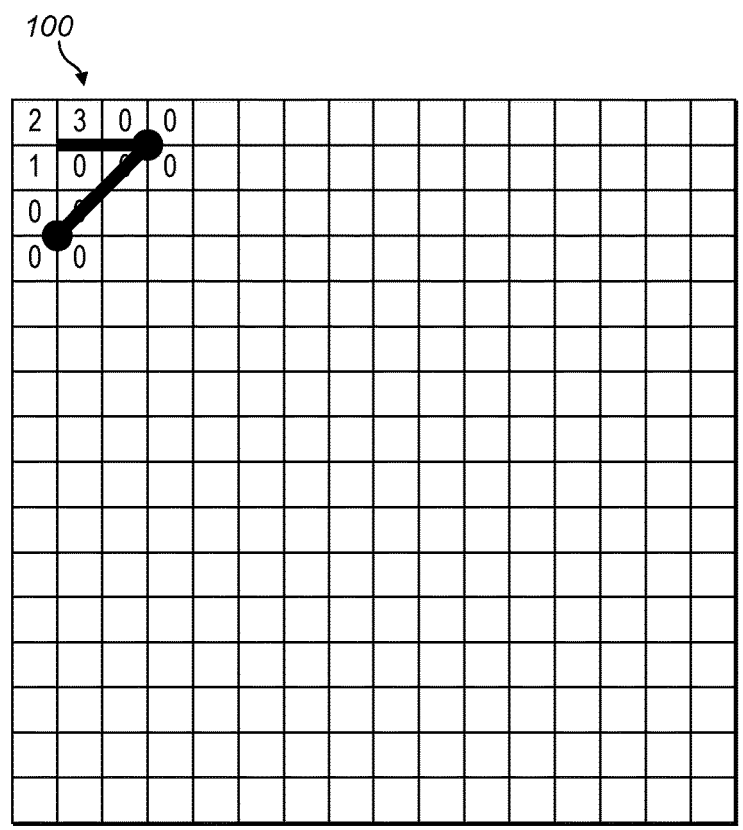

The simulation process continues as shown in FIG. 15a. In this figure the leftmost branch of the tree is redacted for clarity of presentation. The previously parsed node symbol indicated that the next node in the traversal 811 terminates. Therefore, the decoder can simulate that the leaves 813 of this node are sparse in Layer 0. The zero symbols can be mapped to the grid according to the z-order mapping. As shown in FIG. 15b, a block of 2×2 zero values are entered beneath the first block placed, that is, at the bottom-left of the 4×4 quadrant.

Figure 16A:
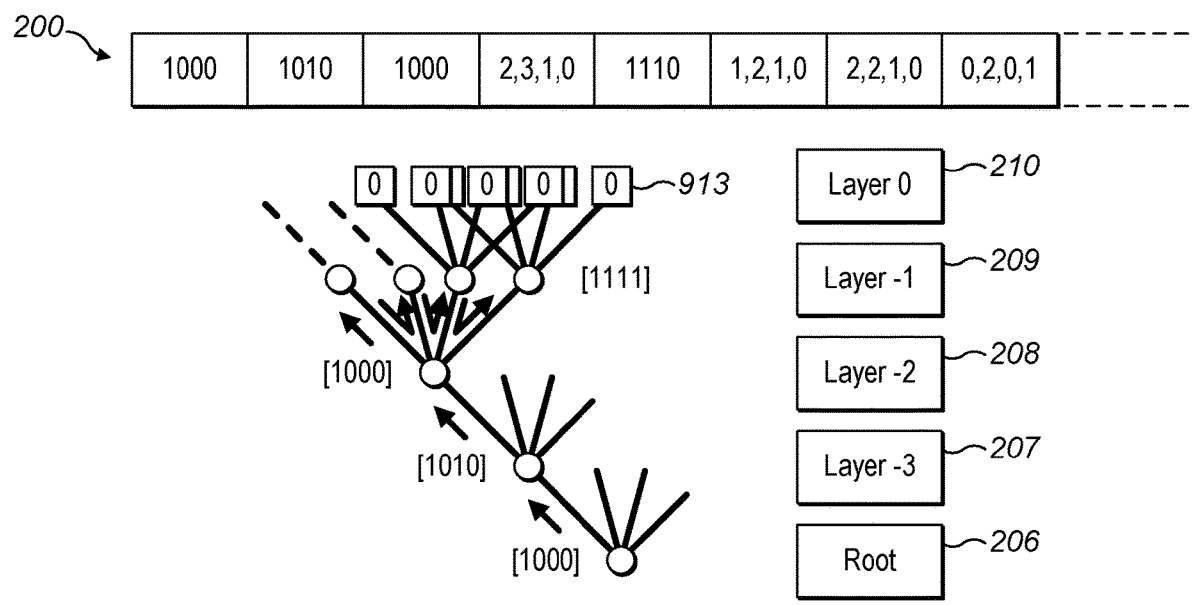
FIG. 16a illustrates a logical representation of a bytestream and an intermediate stage of processing an ordered tree.
Figure 16B:
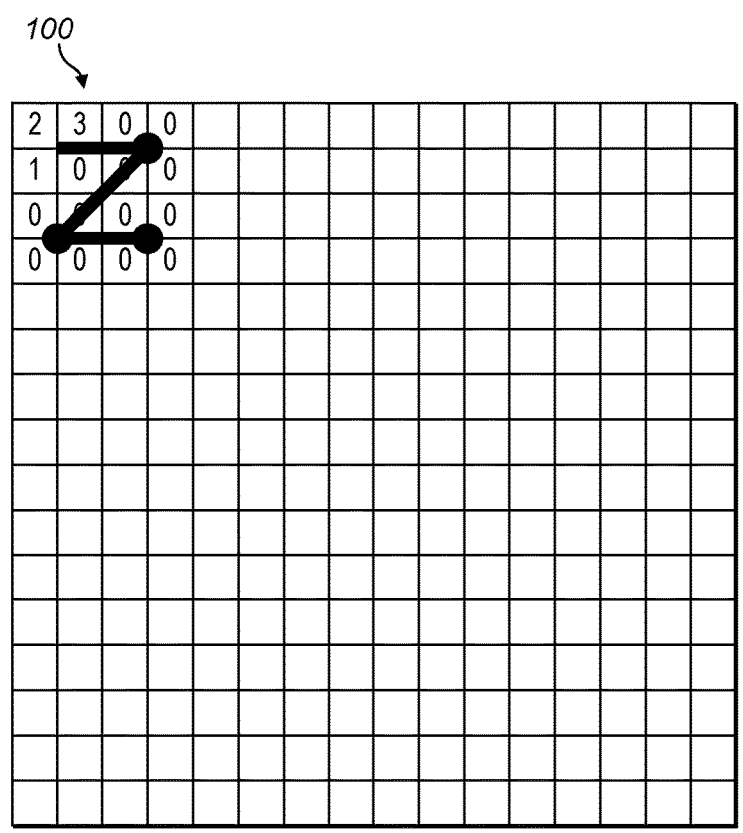

The quadrant in the grid 100 is completed by simulating the final leaves 913 of that node. As the node symbol for that node indicated 1000, the sparse values can be simulated as shown in FIG. 16a. The zero values are mapped to the final 2×2 block of the 4×4 quadrant according to the z-order, as illustrated in FIG. 16b. The 2×2 block of zero values is entered as the bottom-right block of the quadrant. The process now has a complete quadrant. In practice, the simulation may be done in one single step for each of the Layers (e.g., all the nodes associated with the zero node symbols in that Layer are simulated simultaneously and the corresponding zeros are mapped in the grid). The simulation can be a notional process, i.e. done implicitly rather than explicitly.

Figure 17A:
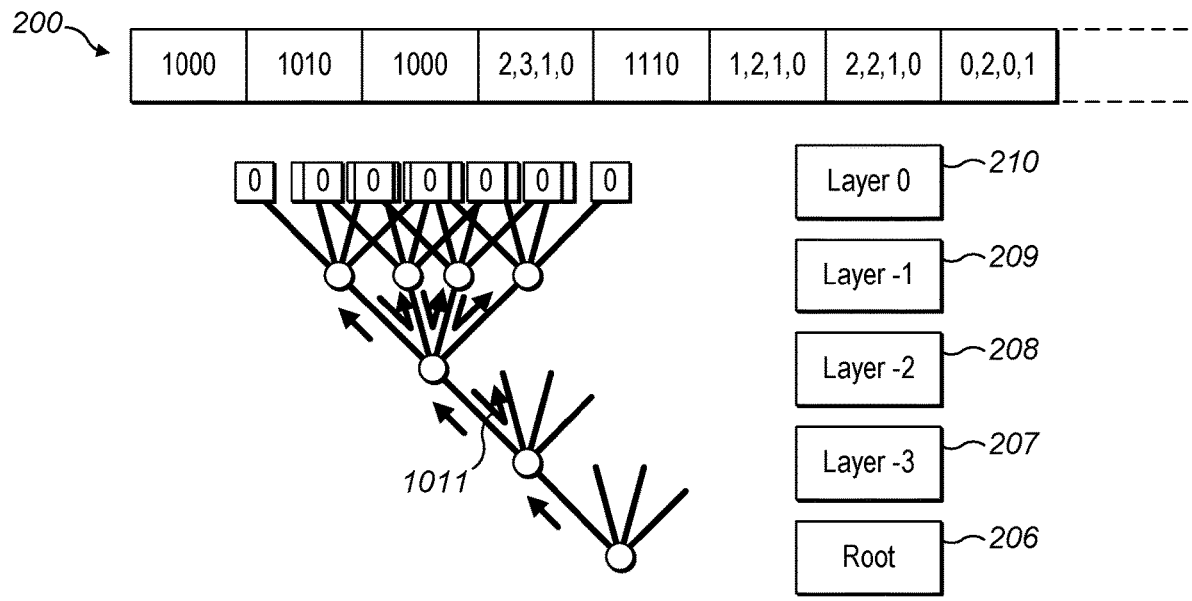
FIG. 17a illustrates a logical representation of a bytestream and an intermediate stage of processing an ordered tree.
Figure 17B:
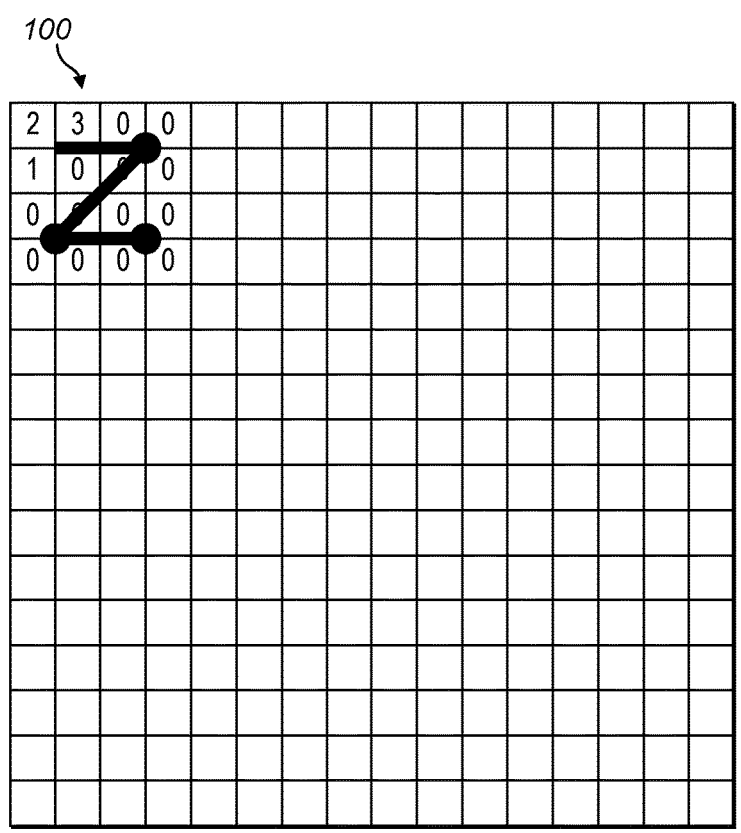

FIG. 17a illustrates the depth-first pre-order traversal. The arrows 1011 indicate how the process traverses the tree to consider the next node. The process descends the tree now it has populated all branches from the previous node. The process then continues to the sibling. Sibling Nodes are nodes having same Altitude and same Parent. As all the leaves have been populated, the next node to consider is the sibling in Layer −2.

Figure 18A:
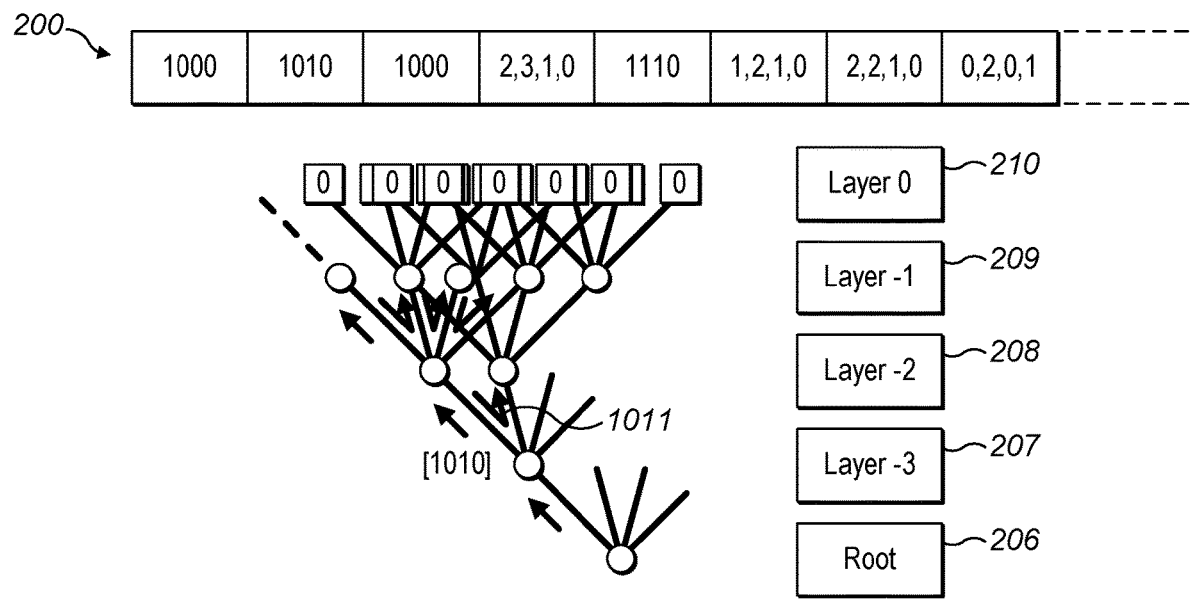
FIG. 18a illustrates a logical representation of a bytestream and an intermediate stage of processing an ordered tree.
Figure 18B:
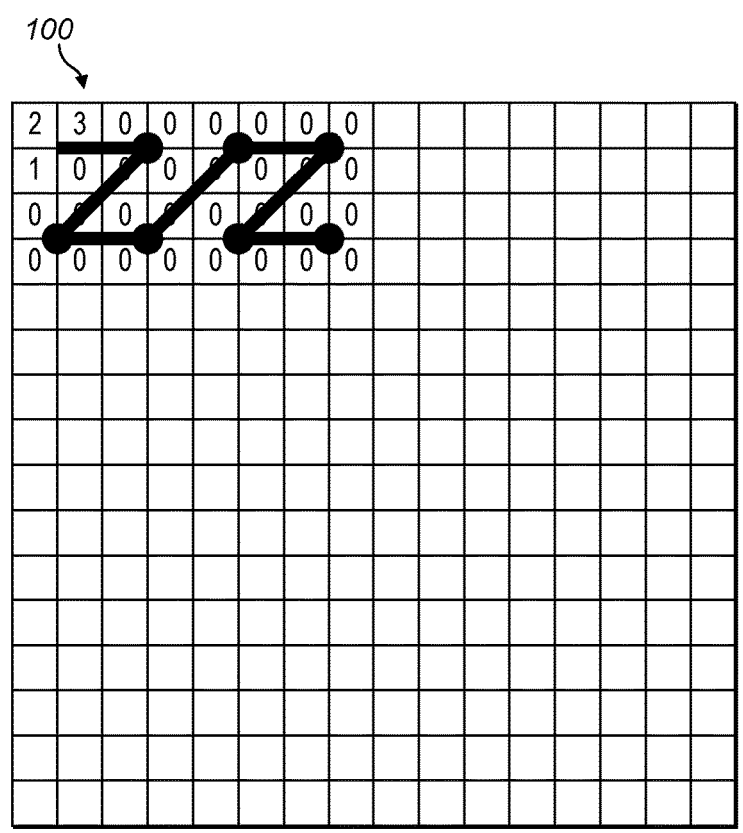

Referring to FIG. 18a, it will be recalled that the node symbol for the parent was 1010. Accordingly, since the node symbol associated with the second branch is zero, the process does not expect to receive any data in the stream for this branch, that is, the sibling. Accordingly, all leaves from this node can be simulated as zero values, that is all values in Layer 0 from this node are zero values. In other words, all values in this quadrant are zero. Once the tree is simulated, the values can be mapped on the grid. As shown in FIG. 18b, following the z-order, the 4×4 block in the top-right of the quadrant can all be mapped as zero values.

Figure 19A:
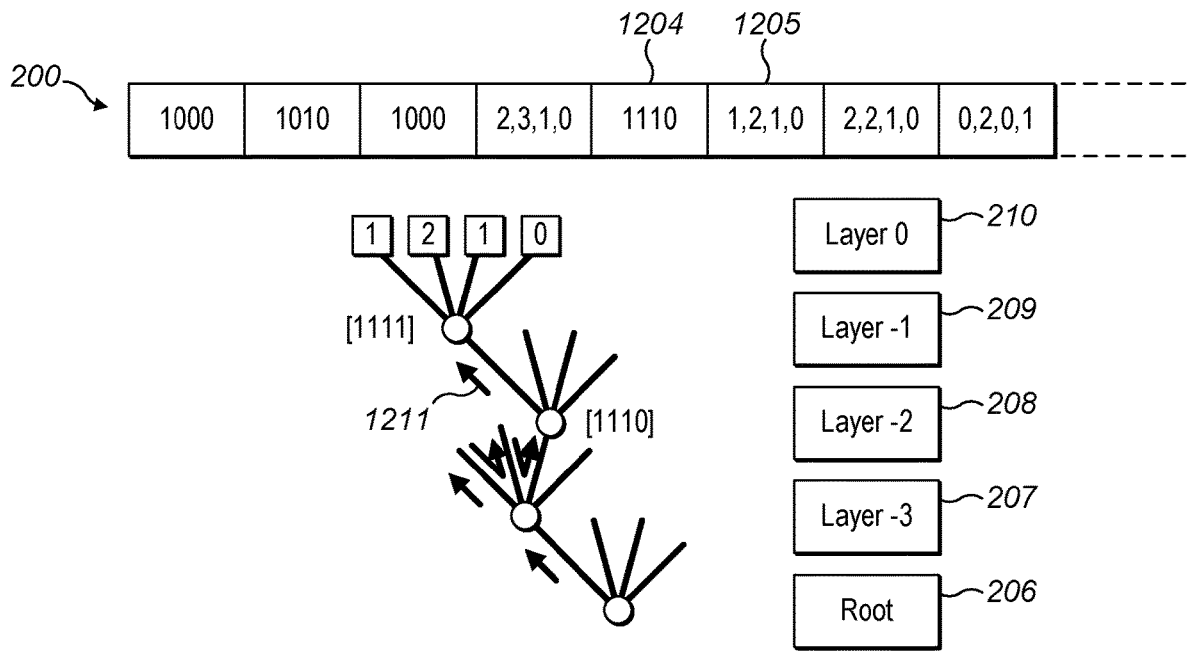
FIG. 19a illustrates a logical representation of a bytestream and an intermediate stage of processing an ordered tree.
Figure 19B:
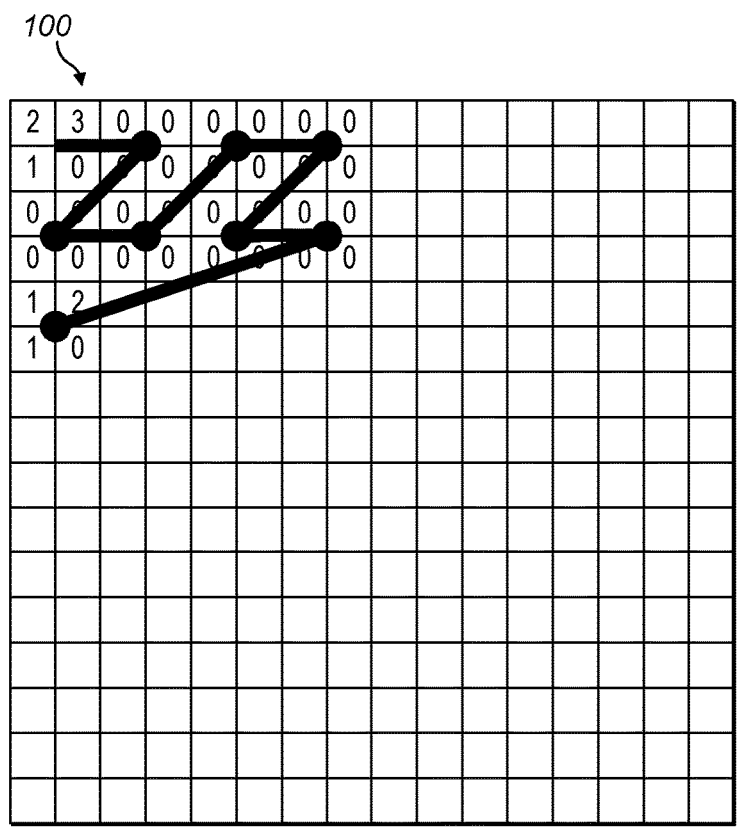

Traversing the tree, the next sibling was indicated by the node symbol as having data in the stream (the corresponding Node Symbol was 1). Accordingly, the process retrieves the next node symbol 1204 from the stream. As shown in FIG. 19a and reconstructed in FIG. 19b, in this example the next node symbol is 1110. This node symbol indicates that three of the nodes in Layer −1, that is three of the Children from the node in Layer −2, have nodes which contain non-zero values. The final node contains only zero values. In FIG. 19a, certain nodes and branches have been redacted and arrow 1211 indicates the traversal.

The process continues in a similar manner and the symbols are retrieved from the bytestream, the tree is built using the symbols as the leaves in Layer 0 and the symbols are mapped to the grid according to the z-order mapping. For brevity, the next steps are not illustrated. For the final sibling of this node, no data is retrieved from the stream as a 0 was indicated in the T-node symbol. The process simulates the tree with zero values as the leaves in Layer 0 from this node. The zeros are mapped to the grid to complete the quadrant. The final sibling from the node in Layer −2 was indicated using the node symbol as being sparse and the process populates the tree with zero values for all leaves descended from that node. The zeros are mapped to the grid with zero values for that 4×4 block in the quadrant.

The traversal now ascends to the next parent node in Layer −3 following the traversal order. Since the first node symbol retrieved from the stream for the root node indicated that this branch does not have a node symbol in the stream, it can be inferred that all leaves in Layer 0 which are descended from this branch, the second branch from the root, are zero values. The process accordingly reconstructs a dense tree while simulating zero values for all leaves in this sub-tree. The zeros are mapped to the grid. The 8×8 quadrant is all represented by zeros. This 8×8 quadrant may be referred to as a sparsified area. A sparsified area is an area of a grid containing zeroes that are not encoded in the stream but are known to be zeroes by default. Zeroes outside the sparsified areas are decoded from node symbols in the same fashion as non-zeroes.

Each branch of the tree may be simulated and each leaf is populated with a zero in turn. However, the linear steps are not essential and the process may intelligently identify that all leaves are zero and map the zeros to the grid accordingly, in one step.

The same process is followed for all siblings for the root as indicated by the original root node symbol. The grid is now completed with the final two 8×8 quadrants being mapped with the zero values from the tree.

Once the process is terminated and all the simulations are made, the decoding process has effectively reconstructed a dense counterpart of the sparse tree received. That is, a tree where every node above Root Layer of the original n-Tree has n children and every Layer is dense.

Figure 20:
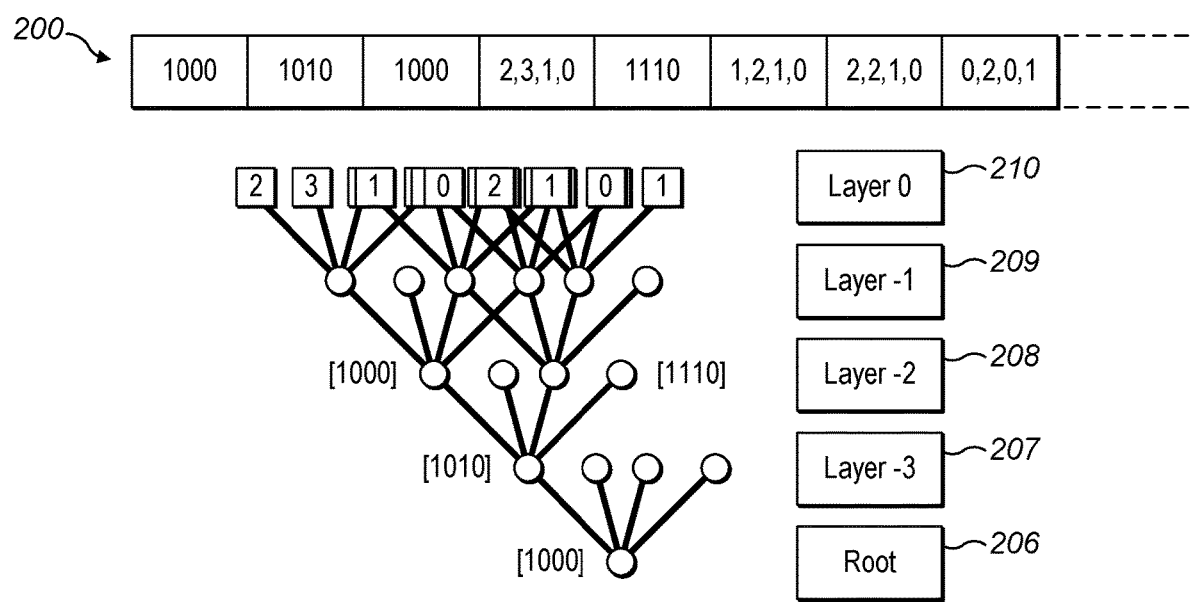
FIG. 20 illustrates a logical representation of a bytestream and summary of processing an ordered tree.

FIG. 20 illustrates a summary and it is recalled that FIG. 8 is the recreated array. 16 leaves are shown with corresponding T-node symbols. 16 symbols (or Labels) have been received in the bytestream. 240 zeros have been encoded "implicitly" as the T-node symbols for the nodes and the decoding and de-sparsification process resulted in an indication that the areas were sparsified. In the received tree derived from the bytestream, there are 7 nodes without descendant nodes. Children of these nodes are optionally simulated in the process to derive a dense tree. The tree is mapped to the grid where the 16 non-zero values are located accurately in the 2D array, while the sparse areas of zeros are placed within the grid without the data being sent in the bytestream.

By using the tree structure, the node symbols (which tell the process which branch will have children and which will have no children) and the depth traversal order, the process can reconstruct a fully sparsified grid by sending only a small set of information. As indicated above, the performance of the decoder is improved as it can be made more efficient. The process maps a constructed tree onto a grid. The grid may contain a sparsified area, that is, an area of a grid containing zeroes that are not encoded in the stream but are known to be zeroes by default. Zeroes outside the Sparsified Areas are decoded from node symbols in the same fashion as non-zeroes.

Figure 21:
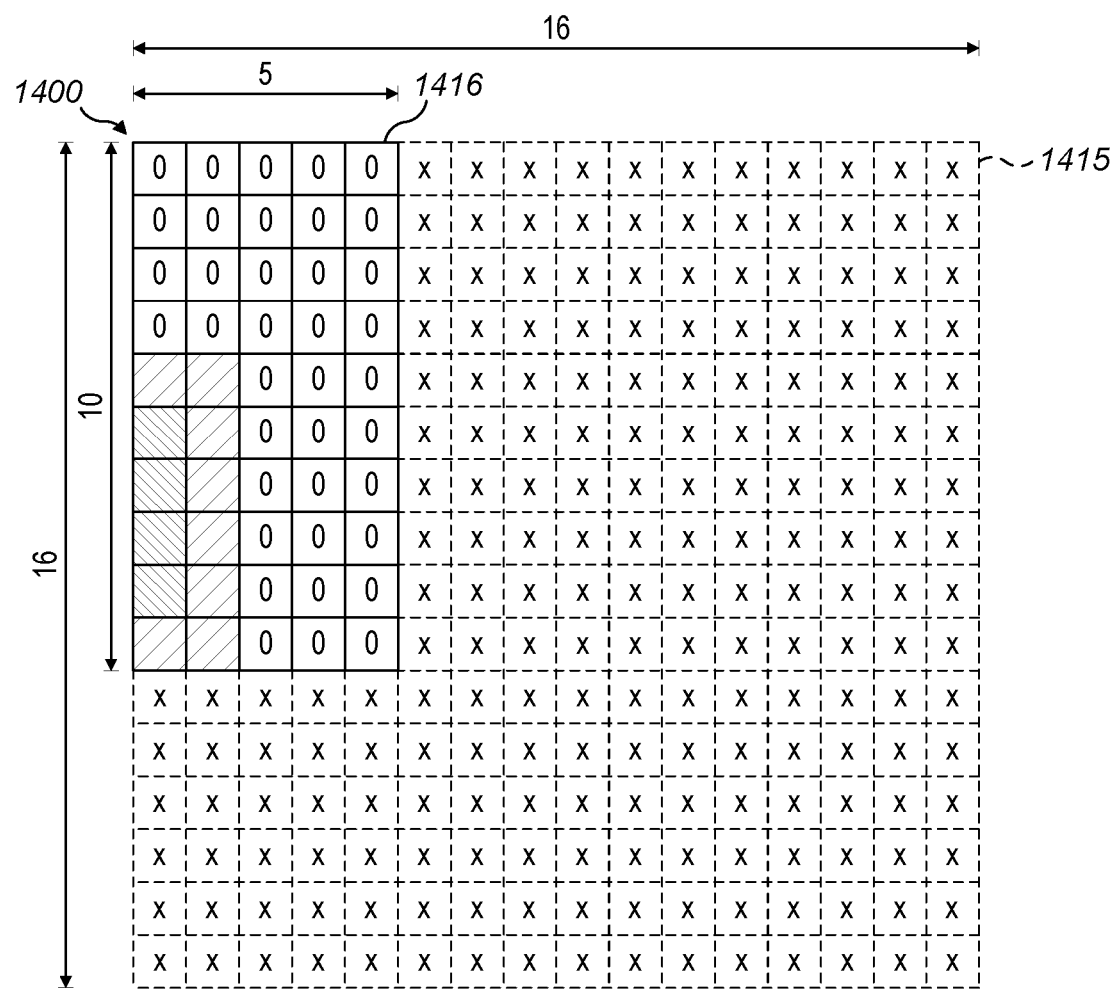
FIG. 21 illustrates a rectangular 2D grid with an inactive region.

The above example considers a square grid, in particular a 16×16 grid where there are 5 layers of the tree and therefore 256 nodes. In the case of a rectangular grid 1400 with a 16 by 16 square grid shown dotted, as illustrated in FIG. 21, there may be masked bits which indicate that sections of the tree are irrelevant and not considered. The tree is still ordered but may no longer be a full quadtree as part of the tree may not be completed. The signalled part of the tree is considered the active volume. If there are 0 or 4 children then the tree may be full, optionally the tree may not be full.

If the signalled part of the tree was an annulus and the decoder was set up for decoding annular videos (e.g. from a spaceship that couldn't see anything in the direction of the sun) then the quadtree would have a particular and anticipatable active volume to determine masking. An implementation of the proposed techniques in a decoder could move the annulus around from frame to frame in line under the control of a pre-determined algorithm. Another example is still a rectangle, but with broken pixels in the camera, which is a very common problem. In a further example there may be areas of useless pixels after a period of degradation.

The example of FIG. 21 shows an active volume 1416 of 5×10 contained within a grid of 16×16. The masked portion of the grid 1415 is signalled with an 'x'. The size of the active volume may be signalled using metadata in the bytestream. The decoder will ignore any part of a node symbol that corresponds to a block which is outside the signalled active volume. Therefore those bits of the node symbols can be any value and are typically chosen by the decoder to optimise entropy. Optionally, the bits of the node symbol may not be transmitted. For example, in FIG. 21, the top right 8×8 block and bottom right 8×8 block are both outside the active volume. Therefore, the first node symbol of the bytestream (to be associated with the root of the tree) would be 1×1x. That is the second and fourth bits of the node symbol can be any value. When building the tree, the decoder will ignore the second and fourth bits as it knows they exist outside of the active volume it has been told separately. When encountering a masked bit or a bit of the node symbol that corresponds to an non-signalled or masked area, the processing of the tree will terminate for that branch, i.e. the traversal will terminate for that branch and carry on to the next node in the order.

It has been described above how the node symbols may signify sections of an array which are sparse or contain a common predetermined value. Optionally, in order to improve the encoding of previous or subsequent encoding stages, it is also considered possible for the common or predetermined values to be explicitly signalled as data symbols with a corresponding positive flag being set in the node symbol. That is, despite the area being sparse, the values may still be explicitly signalled in the bytestream with the node symbol being set accordingly in the bytestream (and tree) for the decoder to properly decode and spatially locate that value. Such selective sparsification may provide benefits where the sparse, or common, value is a cheap value to signify or where such artificial modification of the data stream may provide for improved entropy encoding in a subsequent entropy encoding stage in the encoding chain. The selective sparsification may be set automatically by analysing a predicted bytestream, machine learning, statistical analysis, or through iterative trial and error.

The above description gave an example of how a sparse tree of the invention can be used in the compress of a two dimensional grid however it was also mentioned that the invention could also be applicable to the compression of a linear grid or one dimensional array, below. The examples given are of one or two dimensions. In fact, the techniques can be applied to any numbers of dimensions and with n-Trees that are not 4-Trees. For example, using a 3D variant of Morton Order combined with an octree instead of a quadtree would allow volumetric imaging. As another example, one may show one dimensional de-sparsification with quadtrees but much the same could be done with binary trees i.e. 2-trees.

An example 1D array to be decoded has 50 elements, numbered from 0. This dimension information is assumed to be given in advance. It is known in advance that the default value of every element that is not explicitly decoded by the end of the algorithm is 0. The number of elements being explicitly decoded is not known in advance, except that it is guaranteed to be at least 1. Explicitly decoded elements may be non-zero or 0.

Figure 22:
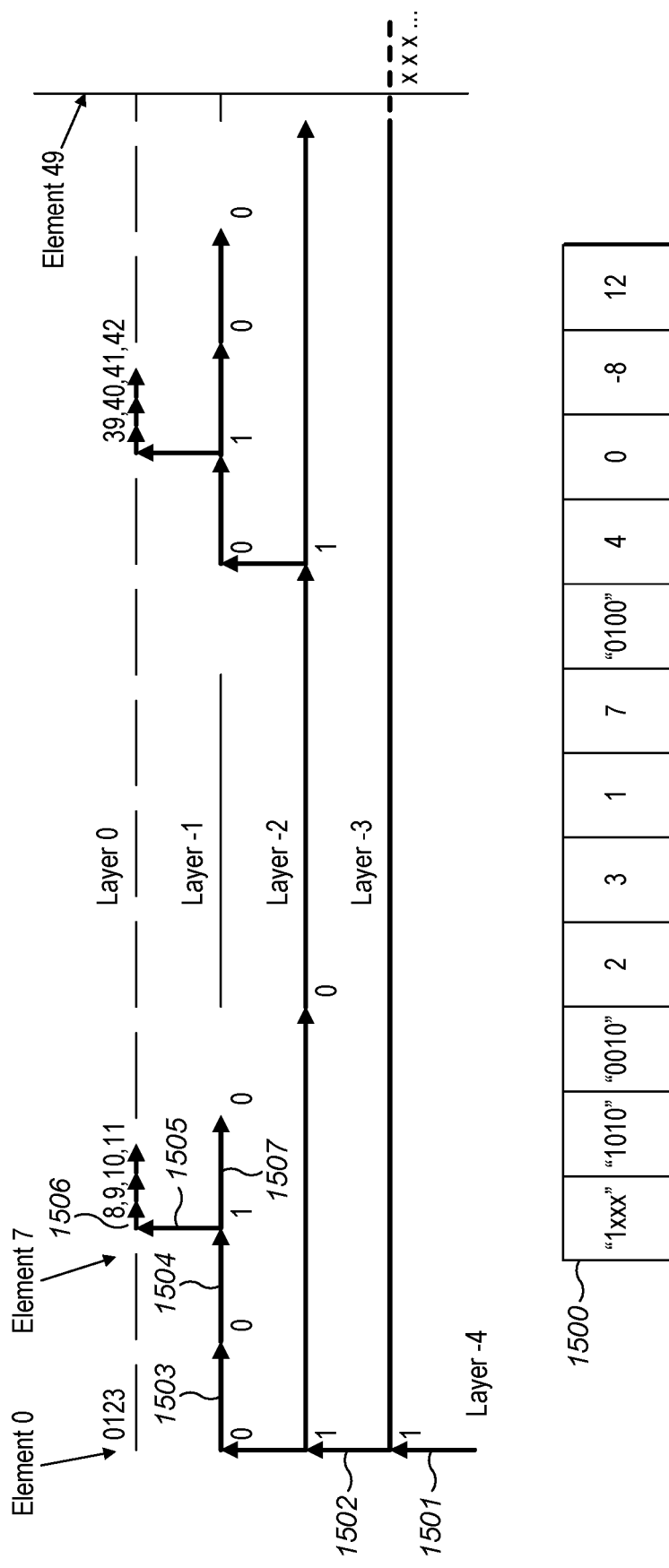
FIG. 22 illustrates a logical representation of a bytestream and a schematic flow of processing.

It is known in advance that the description of the data has five Layers, as shown in FIG. 22. The values in the symbols retrieved indicate how to navigate the layers of the tree. By following the annotations 0, 1 or x on the Figure, one is led to those elements in Layer 0 that are to be explicitly decoded. The meaning of these choices is:

1 means "Jump to the first node in a +1 deeper Layer" (deeper means in the direction of Layer 0)

0 means "Continue to next arrowhead in current Layer. If there is no further arrowhead, backtrack to −1 shallower Layer."

x means "Don't care if 0 or 1, but carry out the 1 actions"

Some digits of the-node symbols in FIG. 22 have been masked with an "x". This is connected with (4,3) being smaller than (16,16). Masked digits indicate that the corresponding child itself is inactive and automatically has zero children. The values of these masked digits play no role in decoding and can be optimized by an encoder to minimize entropy.

So, starting from the root or Layer −4 and following the logical bytestream 1500, the first symbol is a 1 which means jump to the first node in the deeper layer (step 1501). The next symbol is retrieved. Here, the first bit is a 1 and so we jump to the first node in the deeper layer (step 1502). The next symbol is retrieved. The first bit is a 0 and so we continue along the same layer (step 1503). Since we are in the Layer which indicates the data values, the first four elements of the 1D array are not explicitly signalled and are assumed to be of a predetermined value.

Again, a 0 is read next so we continue along the same layer (step 1504). The next bit is a 1 which indicates we should move to the deeper layer (step 1505). We have now reached the Layer in which we should retrieve data values. The data values are retrieved and placed at this location in the tree (step 1506). Following the traversal order we then ascend the tree once more and read the last bit of the symbol which in this case is 0 and so we continue (step 1507). Since we have reached the end of the symbol, we ascend the tree once more following the traversal order and continue the process.

Figure 23:
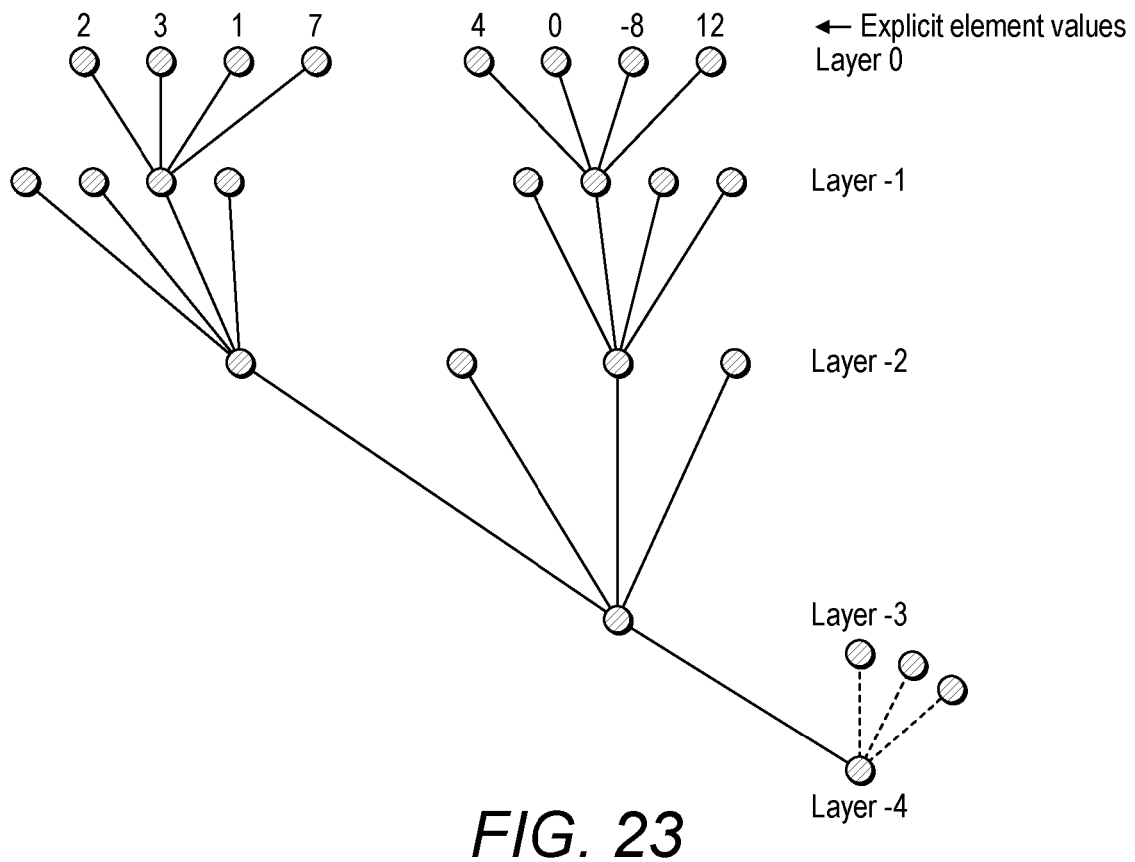
FIG. 23 illustrates an ordered tree after the processing illustrated in FIG. 22.

Once the bytestream has been followed, a tree as shown in FIG. 23 has been populated. The tree is an ordered 4-Tree, so Sibling nodes are ordered (in this figure the order is left to right) and only nodes in Layer 0 may have a Label. The Top Layer includes the explicit element values signalled in the bytestream. The three right hand nodes in Layer −3 are inactive because array length of 50 elements is less than 65. The annotation of x in the Layer −3 symbol indicates that the value of this bit is irrelevant and could be any value because it is ignored. The process is only concerned with the first 50 symbols as we know this is the length of the array. Even if all 50 elements were explicit these nodes would remain childless. This example explicitly codes elements in positions 8, 9, 10, 11 of the 1D array, for example. The explicit elements have explicit values 2, 3, 1, 7 and 4, 0, 8, 12 respectively, as shown by the Labels on the relevant nodes.

The decoding order commences with three node symbols, followed by 4 data values, followed by another node symbol. It is not known whether the following symbol will be a node symbol or a data symbol or value until the previous node symbols have been decoded.

The present invention permits the above described process of decoding received data to be performed in a parallel manner. In particular, the procedure illustrated at FIGS. 9-20 may be executed in such a manner that a plurality of data structures within the stream 200 are processed in parallel, rather than in sequence. By obtaining offset values associated with subsets of the data set 200, the starting locations, or earliest element locations, of those subsets may be identified. This means that subsets that occur later in the stream and correspond to higher tiers, that is tiers more distant from the root tier 206, may be processed as soon as their locations are known, rather than when their locations have been determined by way of having processing the subsets preceding them in the stream.

It has been described above how a bytestream may be constructed and decoded to incorporate a set of interspersed node symbols and data symbols. Once the symbols have been output they may be subsequently entropy encoded. The encoded stream may be entropy decoded before the set of symbols are processed. For example, the symbols may be divided into codes which are then encoded using a Huffman encoding and decoding operation. Alternatively, the stream of symbols may be encoded and decided using an arithmetic coding operation, such as a range encoding and decoding operation. These and other similar entropy coding techniques are well known in the art.

Entropy coding is a type of lossless coding to compress digital data by representing frequently occurring patterns with few bits and rarely occurring patterns with many bits. In broad terms, entropy coding techniques take an input codeword and output a variable-length codeword using the probability of the input codeword occurring in the data set. Therefore, the most common symbols use the shortest codes. The probability information is typically stored in metadata used by the decoder to recreate the input information from the output codeword.

The following describes a technique for entropy coding a bytestream. Immediately above we described how the process of decoding, once performed can then be applied to a process of de-sparsification to identify sparse areas of an array and accurately locate values in the array. The described operation couples the de-sparsification and decoding steps together.

Figure 24:
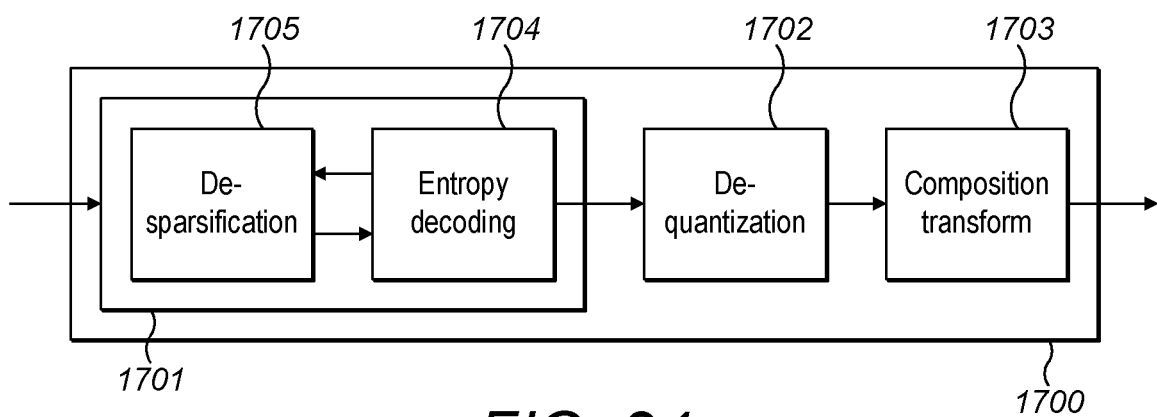
FIG. 24 illustrates an overview of coupled de-sparsification and decoding modules.

A high level overview 1700 is shown in FIG. 24. After the bytestream is decoded in a decoding operation 1701, an output plane of data undergoes a de-quantisation 1702 stage and a composition transform 1703 stage. The composition transform stage 1703 and de-quantisation stage 1702 are known in the art. For example the composition transform stage 1703 may include a directional transform of a plane as described in WO2013/171173 or a wavelet or discrete cosine transform.

It is described herein that the decoding operation 1701 may include two stages, that is, an entropy decoding stage 1704 and a de-sparsification stage 1705. The stages of the decoder are coupled together and are interrelated so as to efficiently identify the compressed information. The entropy decoding stage acts to decode a symbol from a stream of data. The de-sparsification stage acts to analyse the symbol and inform the entropy decoder what type of symbol is next to be decoded.

In preferred embodiments, the de-sparsification stage or module 1705 builds a tree as described above in the context of FIGS. 7 to 23. The de-sparsification stage receives a symbol from the entropy decoder and builds the tree. The de-sparsification stage then, from the process of building the tree informs the entropy decoder what type of symbol to expect next, i.e. a node symbol or a data symbol. By analysing the node symbols in the manner described, the de-sparsification stage can identify that the next symbol will be a node symbol or a data symbol by following the tree traversal and identifying that no data symbol is expected for a branch of the tree where the node symbol includes a flag indicating as such.

The terms de-sparsification stage, de-sparsification module and de-sparsifier may be used interchangeable throughout the present description to refer to the functionality of the module. Similarly, the terms entropy decoding stage, entropy decoding module and entropy decoder may be used interchangeably to refer to the functionality of that module. It will of course be understood that the functionality may be provided by a combined module or multiple sub-modules.

At the entropy decoding stage, the module has access to multiple sets of metadata used to decode different types of symbols using the entropy decoding operation. First, the entropy decoding stage will first decode a symbol using a first set of metadata. The entropy decoding stage will then send that symbol to the de-sparsification stage. The entropy decoding stage will then wait to receive an indication of the type of symbol that is to be expected next. Based on the received indication, the entropy decoding stage will use a respective set of metadata according to the type of symbol expected in order to decode the next symbol using entropy decoding. In this way, different metadata can be used to decode a data set even when the data within the data set does not follow a predetermined pattern and the different symbol types are irregularly interspersed within the original data to be encoded or reconstructed.

It will of course be understood that instead of using one entropy encoder and multiple sets of metadata the system may instead utilise multiple entropy encoder modules for each type of symbol to be decoded. For example, the de-sparsification module may instruct a different module to perform an entropy decoding operation based on the type of symbol it expects next in the dataset.

Figure 25:
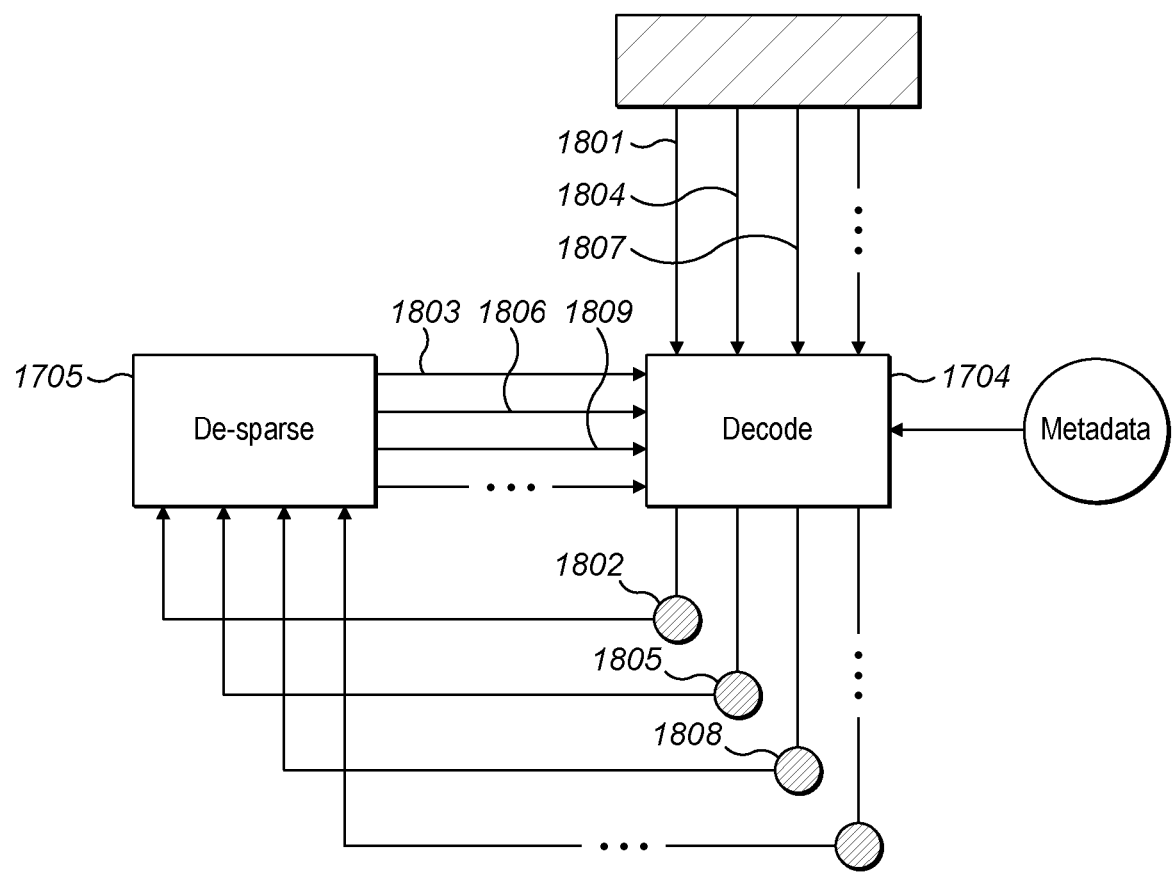
FIG. 25 illustrates an overview of coupled de-sparsification and decoding steps.

The process will now be described in detail in the context of FIG. 25. We start by assuming that the first symbol in the stream is of a first type. In the preferred example implementation it will be recalled from above the first type is a node symbol. In the implementation it is not relevant if the de-sparsification stage 1805 instructs the entropy decoding stage 1804 that the first symbol is of a first type of the entropy decoder inherently has a degree of intelligence or predetermination to identify the first expected type.

The entropy decoding stage will retrieve metadata from a store of metadata corresponding to the first symbol type. The metadata may include decoding parameters for example and may include an indication of probability. For example if the decoding operation is a range decoder, the metadata may include a probability distribution or cumulative distribution function.

After identifying the first symbol (step 1801), this is passed to the de-sparsification stage (step 1802). The first symbol is used by the de-sparsification stage to determine a type of symbol expected later in the stream.

In preferred implementations, the de-sparsification stage follows the process described above. That is, the de-sparsification stage assigns the received symbol to the root of a tree and analyses the bits of the symbol to traverse the tree. For example, if the symbol is [1000] as in the described example of FIG. 9*a*, then the tree is traversed and the de-sparsification stage will identify that the next symbol is to be a node symbol.

The de-sparsification stage returns to the entropy decoding stage the type of symbol to be expected next (step 1803). Based on this information, the entropy decoding stage is able to decode the next symbol from the data stream according to the metadata for the received type of symbol.

Following the example described above, the next symbol will be a node symbol and the entropy decoding stage, if a range decoder, can utilise the cumulative distribution function used for the previous node symbol (step 1804). Again, this is passed to the de-sparsification stage (step 1805). Following the example, the next symbol will be a node symbol which is entropy decoded using the same cumulative distribution function. Here, we have reached the stage of FIG. 11*a*. The tree has been built with three visited nodes. Following the example, the de-sparsification stage assumes the next Layer is not sent in the bytestream and now expects a data symbol.

The de-sparsification stage accordingly now signals to the entropy decoding module that the expected symbol is of a different, second, type (steps 1806). The entropy coding stage thus retrieves metadata for the second type of symbol. Again, if the entropy coding operation is a range coding operation then the store of metadata will include a second, respective, cumulative distribution function. The entropy coding operation thus retrieves the next symbol from the stream using this second set of parameters, i.e. this second cumulative distribution function (steps 1807, 1808).

Returning to the example of FIG. 12*a*, the next three symbols will of course be data symbols as in the example process all four sibling data symbols for a block are explicitly signalled. Thus, the de-sparsification stage will signal to the entropy decoding stage than the next three symbols are of the second type (step 1809). Of course as indicated above, there may be a degree of intelligence or predetermined expectation coded into the entropy decoding stage or module. For example, when it knows a data symbol is to be retrieved it may know to retrieve four. Depending on implementation, the entropy decoding stage may of course wait for an indication of the symbol type each time it tried to identify a symbol from the stream.

In the example, the process will continue according to the traversal of the tree. That is, in the example of FIGS. 14*a* to 19*a*, the next symbol expected will be a node symbol and the de-sparsification stage will instruct the decoder to use the first set of parameters or metadata to identify the next symbol.

Now that the process has been understood, it is recalled that rather than the entropy decoding stage switching between sets of metadata, there may instead be multiple entropy decoding modules, each using one set of metadata and each retrieving a symbol from the stream of interspersed symbols of different types according to which type of symbol is to be expected next.

It was described above that the entropy decoding stage may be any type of entropy decoding module. For example, the entropy decoding module may be a Huffman decoding module where the symbols in the stream are of a fixed length. Preferably however the entropy decoder is a range decoder. If multiple decoding modules are used, the first type of symbols may be decoded using a first type of entropy decoder and the second type of symbols may be decoded using a second type. For example, the fixed length nodes symbols may be decoded using a Huffman decoder and the data symbols may be decoded using an arithmetic decoder, which may be beneficial if the types of symbol are of differing lengths or is one type lends itself to a fixed length operation and the other to a variable length operation.

One contemplated advantage of techniques described herein is the benefit to a decoder in recreating areas of information that has been compressed when only fragments of a bytestream or bitstream have been received. For example, once an earlier tier in the hierarchical data structure has been decoded, i.e. a tableaux, the locations of all the tiles in the hierarchical data structure can be identified. In this manner, the decoder can identify how to spatially locate each of any fragments it has received.

In an additional and/or alternative technique, it is proposed to facilitate understanding during a range decoding process of whether the process will be successful or accurate. One way to begin decoding a bytestream or fragment of a bytestream is to start decoding and stop when there is nothing more to read. However, it is contemplated to signal in a header or in a bytestream what length of stream is sufficient should the decoder only wish to decode a region of interest or a particular section. That is, it may be possible to signal to decode that only 20% of the bitstream is needed in order to accurately identify the symbols in a portion of the bytestream. This is particularly useful for television where one may wish to know in advance what it is reasonable to do and that for this percentage of data received you are not going to decode a blank screen.

Additionally, it is proposed that during a range decoding process, at some point the decoder will ask for more bits from the bytestream as a sample and they will not be there. When this happens, and when recreating an ordered tree is described elsewhere herein, the decoding process may set the leaf of the tree symbol to be 0 and any node symbols to 1111, that is, the rest of the tree will predetermine to be dense and will place 0 in all of the data values such that for example (depending on the type of data encoded) this screen may be made grey so as to not affect the user experience. Where partial data, i.e. a fragment, is retrieved, at the end of the fragment the decoding process may follow the above approach that is to simulate the rest of the tree. Thus, a decoder may be able to recreate a region of interest or a fragment of a bitstream without significantly affecting the rest of the plane of data and identifying how much data is needed in order to accurately decode symbols of a region of interest. To facilitate decoding bytes from the sample, the range decoder may pad the sample with bits or bytes such as FF.

During the decoding process, the decoder may also be configured to periodically check whether the remaining bits in its sample are enough in order to accurately identify a symbol without error. The decoder may be able to perform this check with or without a signalled identifier of accurate sample size for positive symbol determination. If the number of symbols is not enough, then the arranged decoder in certain examples may undertake a simulation exercise as identified above to insert 0 value or otherwise a predetermined value to have a set value in the rest of the plane or array so as to not affect user experience whilst still providing the maximum amount of decoded symbols possible from the bytestream or bitstream available or from the bytestream or bitstream requested.

A technique for decoding a bytestream will now be described.

A decoding module would receive a portion of data to be decoded (e.g., Stream). This portion of data would be part of a data stream, such as a Bytestream or Bitstream. This portion of data may be of variable length (for example, 3 bytes or equivalently 24 bits) and is typically associated with an elementary data structure that describes the data to be decoded, for example the data structure called Tile as further described in the present application and other applications by the same applicant such as European patent application No. 17386045.3 and/or 17386046.1 both filed on 6 Dec. 2017 and incorporated herein by reference.

To enable decoding of the portion of data, use of some additional data such as metadata may be required. This metadata may be present in the portion of data itself (for example, the portion of data may include a header field containing said metadata and a payload field containing data to be decoded), or could be received as part of a separate data field, such as a data field including metadata for multiple portions of data (e.g., for all the Streams in a Surface, wherein Surface is described elsewhere) with the portions of data included in a payload field. This separate data field may be received prior to the portion of data. The header field of the portion of data may be decoded ahead of the payload field in order to enable decoding of the data to be decoded. This separate data field may be decoded ahead of a portion of data. The metadata themselves may be associated with the elementary data structure that describes the metadata, for example the data structure called Tableau as further described in the present application and other applications such as the above-mentioned European patent application No. 17386045.3 and/or 17386046.1.

Note that Tile and Tableau are two embodiments of the same data structure called Tessera, as further described in the present application and other applications by the same applicant such as the above-mentioned European patent application No. 17386045.3 and/or 17386046.1.

As discussed above, the data stream (e.g., Bytestream) may include multiple portions of data. Typically, there are no gaps between different portions of data—in other words, the last byte (or bit) of a first portion of data is followed in the data stream by the first byte (or bit) of a second portion of data. The metadata may be used to indicate a length associated with a portion of data (e.g., a StreamLength). These lengths can range from zero to an arbitrary maximum number of bytes associated with a portion of stream.

Figure 26:
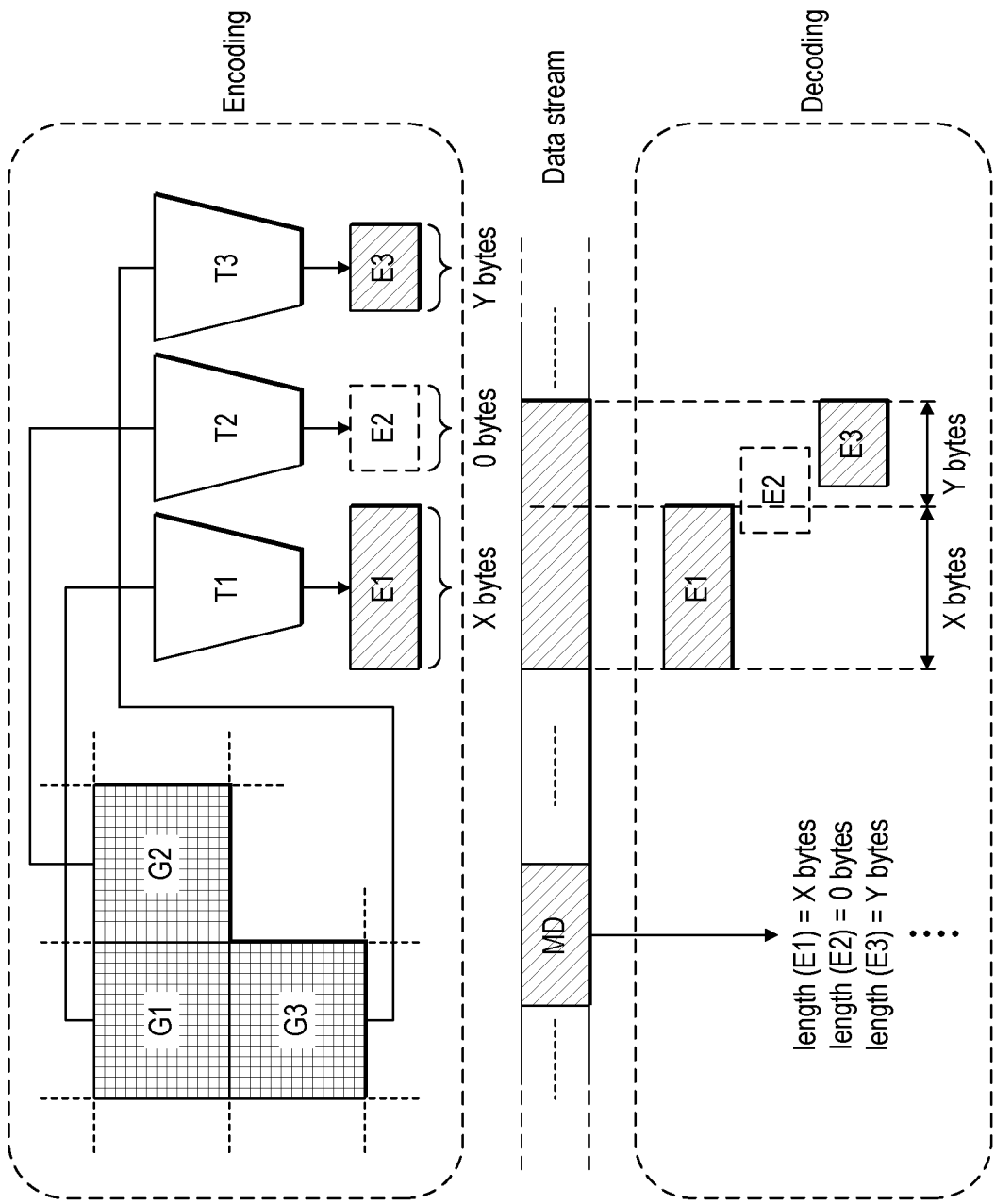
FIG. 26 illustrates an elementary data structure.

During encoding, the data to be encoded (for example, transformed residual data) are processed so that they are divided into groupings of data, with each grouping of data associated with an elementary data structure (e.g., Tessera) as discussed above. For example, with reference to FIG. 26, a first grouping of data G1 may be associated with a first elementary data structure T1 and gets encoded as first encoded data set E1, a second grouping of data may be associated with a second elementary data structure T2 and gets encoded as second encoded data set E2, a third grouping of data G3 may be associated with a third elementary data structure T3 and gets encoded as first encoded data set E1, and so forth. When transmitting to the decoder, a data stream would need to be created, said data stream being formed by a sequence of bytes corresponding to the sequence of encoded data sets, first E1, then E2, then E3 and so forth.

Since the data to be encoded may be sparse in nature (e.g., many of those data to be encoded are either zero or below a certain threshold), some of these groupings of data to be encoded may be completely empty, for example G2 may be completely empty. That means that whilst G1 and G3 contains some data to be decoded and therefore the corresponding encoded data sets E1 and E3, respectively, contains data to be decoded, G2 does not contains any data and therefore the corresponding encoded data set E2 contains no data. Accordingly, the data stream will contain a first portion of data corresponding to E1 and a second portion of data corresponding to E3, with no portion of data corresponding to E2.

Since the decoding module would not know a priori that there is no portion of data corresponding to E2, and since the data stream as discussed above has no gaps, the decoder needs to receive information about the length of each of the portion of data to reconstruct and decode the various groupings of data. Accordingly, the metadata MD will contain information about the length of the various portions of data in the data stream. In the exemplary FIG. 26, E1 has length of X bytes, E2 has a length of 0 bytes, E3 has a length of Y bytes.

The decoding module will extract the length information from the metadata MD, and based on it extract from the data stream the corresponding portions of data. With reference to the exemplary FIG. 26, the decoding module extracts the length of E1 as X bytes, Accordingly, the first X bytes of the payload data will be associated with E1. Further, since the decoding module would extract the length of E2 as 0 bytes whilst the length of E3 as Y bytes, the decoding module will associate the next X bytes in the payload data with E3, therefore knowing that E2 has no data associated with it. Accordingly, the decoding module will decode E1 and E3 to arrive at the reconstructed versions of, respectively, groupings of data G1 and grouping of data G3, but it will not reconstruct any grouping of data G2.

As described in the present application and other applications such as the above-mentioned European patent application No. 17386045.3 and/or 17386046.1, the data to be decoded are organised in tiers of Tesserae, with the top Tier (Tier 0) being the Tesserae associated with transformed residual data (also known as Tiles), Tier −1 being the Tesseare associated with metadata of the Tiles on Tier 0 (these Tesserae also known as Tableaux), Tier −2 being the Tesserae associated with metadata of the Tableaux of Tier −1, and so on and so forth. These metadata could be, for example, the length of the portions of data associated with the Tiles (if we are referring to Tier −1) or the length of the portions of data associated with the Tableaux (if we are referring to Tier −2).

Accordingly, when a decoding module receives the data stream it shall extract information about the length of the portions of data associated with the various Tesserae.

Tesserae are decoded in phases, each phase corresponding to decoding a Tier. This is further described in the present patent application. A Tableau tier decoding phase involves using Streamlengths to "find" the Tableaux for that Tier, then decoding the "found" Tesserae to obtain more Streamlengths. The Tile tier decoding phase involves using Streamlengths to find the Tiles, and decoding the "found" Tiles to get residuals (all other residuals being zero).

Figure 30:
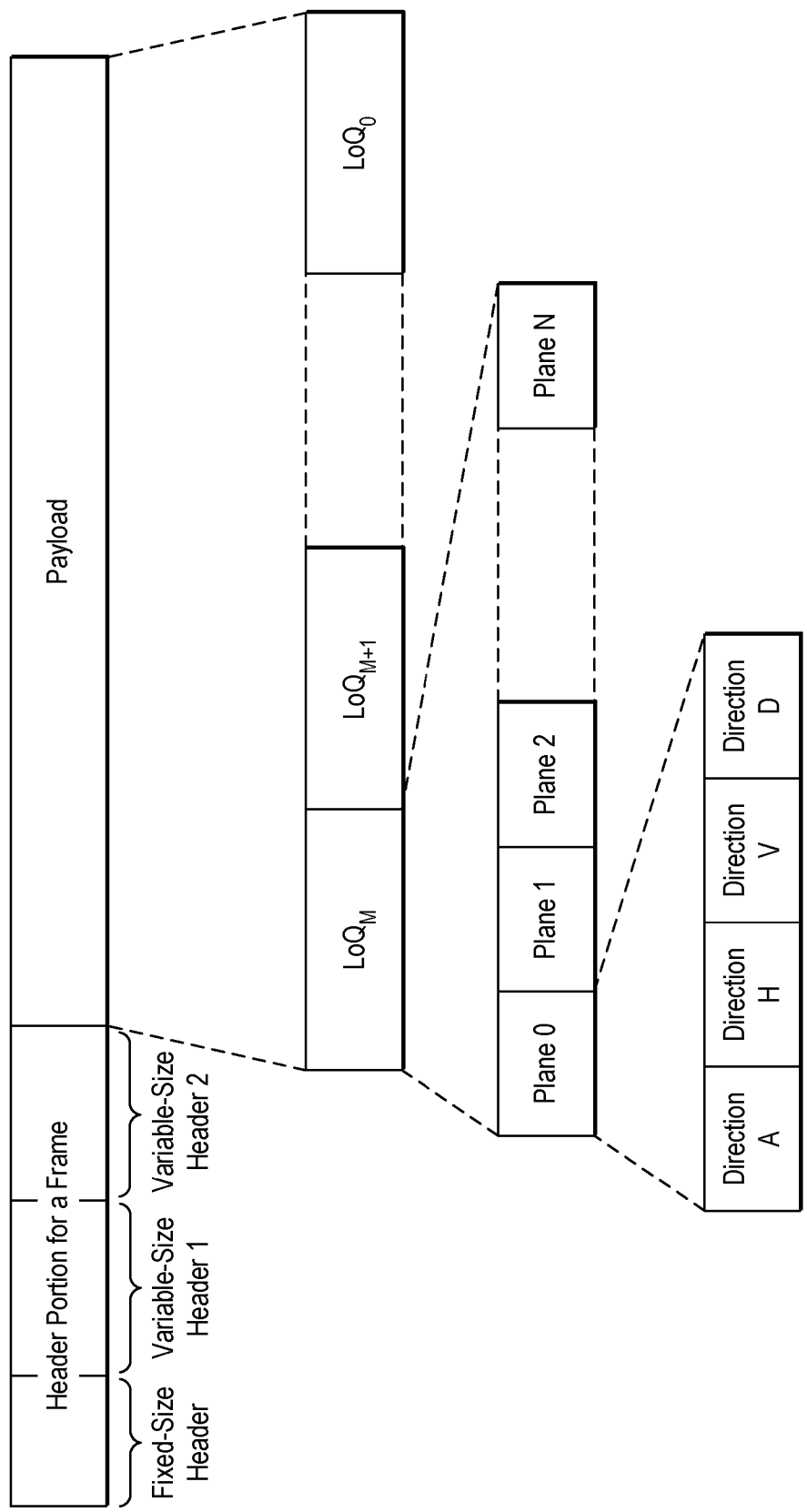
FIG. 30 illustrates a bytestream structure for a frame.

As shown in FIG. 30, the bytestream may include multiple fields, namely one or more headers and a payload. In general, a payload includes the actual data to be decoded, whilst the headers provide information needed when decoding the payload. The payload may include information about a plurality of planes. In other words, the payload is subdivided in portions, each portion corresponding to a plane. Each plane further comprises multiple sub-portions, each sub-portion associated with a level of quality. The logical structure of a Payload is an array of multi-tiered Tableaux, which precedes the Tile Tier with Tiles containing Residuals at their Top Layer. The data in the Payload that represents a Tessera shall be a Stream. In the present example, Streams are ordered by LoQ, then by Plane, then by direction and then by Tier. However, the Streams can be ordered in any other way, for example first direction, then LoQ, the Plane, then Tier. The order between directions, LoQ and Planes can be done in any way, and the actual order can be inferred by using the information in the header, for example the stream_offsets info.

The payload contains a series of streams, each stream corresponding to an encoded tessera. For the purpose of this example, we assume that the size of a tessera is 16×16. First, the decoding module would derive a root tableau (for example, associated with a first direction of a first LoQ within a first plane). From the root tableau, the decoding module would derive up to 256 attributes associated with the corresponding up to 256 tesserae associated with it and which lie in the tier above the root tier (first tier). In particular, one of the attributes is the length of the stream associated with the tessera. By using said streamlengths, the decoding module can identify the individual streams and, if implemented, decode each stream independently. Then, the decoding module would derive, from each of said tessera, attributes associated with the 256 tesserae in the tier above (second tier). One of these attributes is the length of the stream associated with the tessera. By using said streamlengths, the decoding module can identify the individual streams and, if implemented, decode each stream independently. The process will continue until the top tier is reached. Once the top tier has been reached, the next stream in the bytestream would correspond to a second root tableau (for example, associated with a second direction of a first LoQ within a first plane), and the process would continue in the same way.

Figure 27:
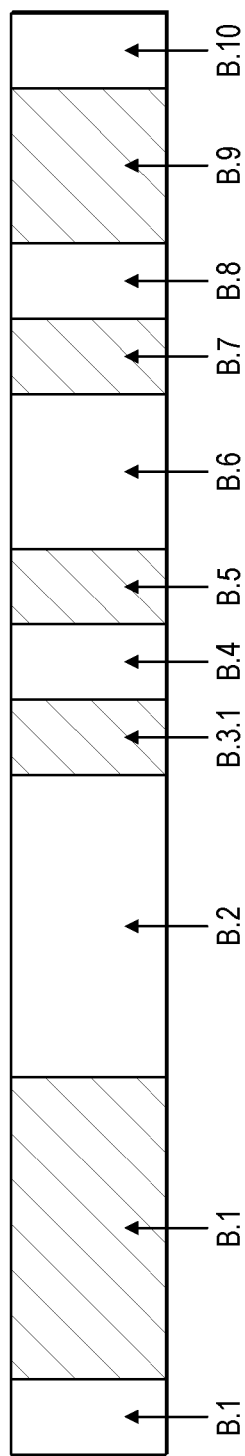
FIG. 27 illustrates a fixed-size header.

The bytestream may include a fixed-sized header, i.e. a header whose byte/bit length is fixed. The header may include a plurality of fields. FIG. 27 shows an example of said fixed-sized header.

The fixed-sized header may include a first field indicating a version of the bytestream format (B.1—also described as format_version: uint8). In an embodiment, this first field may include 8 bits (or equivalently 1 byte). This field may allow flexibility in the encoding/decoding process to use, adapt and/or modify the version of the bytestream format and inform a decoding module of said version. In this way, it is possible to use multiple different version of the encoding/decoding format and allow the decoding module to determine the correct version to be used.

A decoding module would obtain said first field from the bytestream and determine, based on the value included in said first field, a version of the encoding format to be used in the decoding process of said bytestream. The decoding module may use and/or implement a decoding process to adapt to said version.

The fixed-sized header may include a second field indicating a size of the picture frame encoded with a specific bytestream (B.2—also described as picture_size: uint32). The size of the picture frame may actually correspond to the size of the bytestream associated with that picture frame. In an embodiment, this first field may include 32 bits (or equivalently 4 bytes). The size of the picture frame may be indicated in units of bytes, but other units may be used.

This allows the encoding/decoding process flexibility in encoding picture frames of different size (e.g., 1024×720 pixels, 2048×1540 pixels, etc.) and allow the decoding module to determine the correct picture frame size to be used for a specific bytestream.

A decoding module would obtain said second field from the bytestream and determine, based on the value included in said second field, a size of a picture frame corresponding to said bytestream. The decoding module may use and/or implement a decoding process to adapt to said size, and in particular to reconstruct the picture frame from the encoded bytestream to fit into said size.

The fixed-sized header may include a third field indicating a recommended number of bits/bytes to fetch/retrieve at the decoding module when obtaining the bytestream (B.3—also described as recommended_fetch_size: uint32). In an embodiment, this first field may include 32 bits (or equivalently 4 bytes). This field may be particularly useful in certain applications and/or for certain decoding modules when retrieving the bytestream from a server, for example to enable the bytestream to be fetched/retrieved at the decoding module in "portions". For example, this may enable partial decoding of the bytestream (as further described, for example, in European patent application No 17386047.9 filed on 6 Dec. 2017 by the same applicant whose contents are included in their entirety by reference) and/or optimise the retrieval of the bytestream by the decoding module (as for example further described in European patent application No 12759221.0 filed on 20 Jul. 2012 by the same applicant whose contents are included in their entirety by reference).

A decoding module would obtain said third field from the bytestream and determine, based on the value included in said third field, a number of bits and/or bytes of the bytestream to be retrieved from a separate module (for example, a server and/or a content delivery network). The decoding module may use and/or implement a decoding process to request to the separate module said number of bits and/or bytes from the bytestream, and retrieve them from the separate module.

The fixed-sized header may include another field indicating a generic value in the bytestream (B.3.1—also described as element_interpretation: uint8). In an embodiment, this first field may include 8 bits (or equivalently 1 byte).

A decoding module would obtain said another field from the bytestream and determine, based on the value included in said another field, a value indicated by the field.

The fixed-sized header may include a fourth field indicating various system information, including the type of transform operation to be used in the decoding process (B.4—also described as pipeline: uint8). In an embodiment, this first field may include 8 bits (or equivalently 1 byte). A transform operation is typically an operation that transform a value from an initial domain to a transformed domain. One example of such a transform is an integer composition transform. Another example of such a transform is a composition transform. The composition transform (integer and/or standard) are further described in European patent application No. 13722424.2 filed on 13 May 2013 by the same applicant and incorporated herein by reference.

A decoding module would obtain said fourth field from the bytestream and determine, based on at least one value included in said fourth field, a type of transform operation to be used in the decoding process. The decoding module may configure the decoding process to use the indicated transform operation and/or implement a decoding process which uses the indicated transform operation when converting one or more decoded transformed coefficient and/or value (e.g., a residual) into an original non-transform domain.

The fixed-sized header may include a fifth field indicating a type of up-sampling filtering operation to be used in the decoding process (B.5—also described as upsampler: unit8). In an embodiment, this first field may include 8 bits (or equivalently 1 byte). An up-sampling filtering operation comprises a filter which applies certain mathematical operations to a first number of samples/values to produce a second number of samples/values, wherein the second number is higher than the first number. The mathematical operations can either be pre-defined, adapted either based on an algorithm (e.g., using a neural network or some other adaptive filtering technique) or adapted based on additional information received at the decoding module. Examples of such up-sampling filtering operations comprise a Nearest Neighbour filtering operation, a Sharp filtering operation, a Bi-cubic filtering operation, and a Convolutional Neural Network (CNN) filtering operations. These filtering operations are described in further detail in the present application, as well as in UK patent application No. 1720365.4 filed on 6 Dec. 2017 by the same applicant and incorporated herein by reference.

A decoding module would obtain said fifth field from the bytestream and determine, based on at least one value included in said fifth field, a type of up-sampling operation to be used in the decoding process. The decoding module may configure the decoding process to use the indicated up-sampling operation and/or implement a decoding process which uses the indicated up-sampling operation. The indication of the upsampling operation to be used allows flexibility in the encoding/decoding process, for example to better suit the type of picture to be encoded/decoded based on its characteristics.

The fixed-sized header may include a sixth field indicating one or more modifying operations used in the encoding process when building the fixed-sized header and/or other headers and/or to be used in the decoding process in order to decode the bytestream (see below) (B.6—also described as shortcuts: shortcuts_t). These modifying operations are also called shortcuts. The general advantage provided by these shortcuts is to reduce the amount of data to be encoded/decoded and/or to optimise the execution time at the decoder, for example by optimising the processing of the bytestream.

A decoding module would obtain said sixth field from the bytestream and determine, based on at least one value included in said sixth field, a type of shortcut used in the encoding process and/or to be used in the decoding process. The decoding module may configure the decoding process to adapt its operations based on the indicated shortcut and/or implement a decoding process which uses the indicated shortcut.

The fixed-sized header may include a seventh field indicating a first number of bits to be used to represent an integer number and a second number of bits to be used to represent a fractional part of a number (B.7—also described as element descriptor:tuple (uint5, utin3)). In an embodiment, this first field may include 8 bits (or equivalently 1 byte) subdivided in 5 bits for the first number of bits and 3 bits for the second number of bits.

A decoding module would obtain said seventh field from the bytestream and determine, based on at least one value included in said seventh field, how many bits to dedicate to represent the integer part of a number that has both integer and fractional parts and how many bits to dedicate to a fractional number.

The fixed-sized header may include an eighth field indicating a number of planes forming a frame and to be used when decoding the bytestream (B.8—also described as num_plane: unit8). In an embodiment, this first field may include 8 bits (or equivalently 1 byte). A plane is defined in the present application and is, for example, one of the dimensions in a color space, for examples the luminance component Y in a YUV space, or the red component R in an RGB space.

A decoding module would obtain said eighth field from the bytestream and determine, based on at least one value included in said fifth field, the number of planes included in a picture.

The fixed-sized header may include a ninth field indicating a size of an auxiliary header portion included in a separate header—for example the First Variable-Size Header or the Second Variable-Size Header (B.9—also described as aux_header_size: uunt16). In an embodiment, this first field may include 16 bits (or equivalently 2 byte). This field allows the encoding/decoding process to be flexible and define potential additional header fields.

A decoding module would obtain said ninth field from the bytestream and determine, based on at least one value included in said ninth field, a size of an auxiliary header portion included in a separate header. The decoding module may configure the decoding process to read the auxiliary header in the bytestream.

The fixed-sized header may include a tenth field indicating a number of auxiliary attributes (B.10—also described as num_aux_tile_attribute: uint4 and num_aux_tableau_attribute: uint4). In an embodiment, this first field may include 8 bits (or equivalently 1 byte) split into two 4-bits sections. This field allows the encoding/decoding process to be flexible and define potential additional attributes for both Tiles and Tableaux. These additional attributes may be defined in the encoding/decoding process.

A decoding module would obtain said tenth field from the bytestream and determine, based on at least one value included in said tenth field, a number of auxiliary attributes associated with a tile and/or a number of auxiliary attributes associated with a tableau. The decoding module may configure the decoding process to read said auxiliary attributes in the bytestream.

Figure 28:
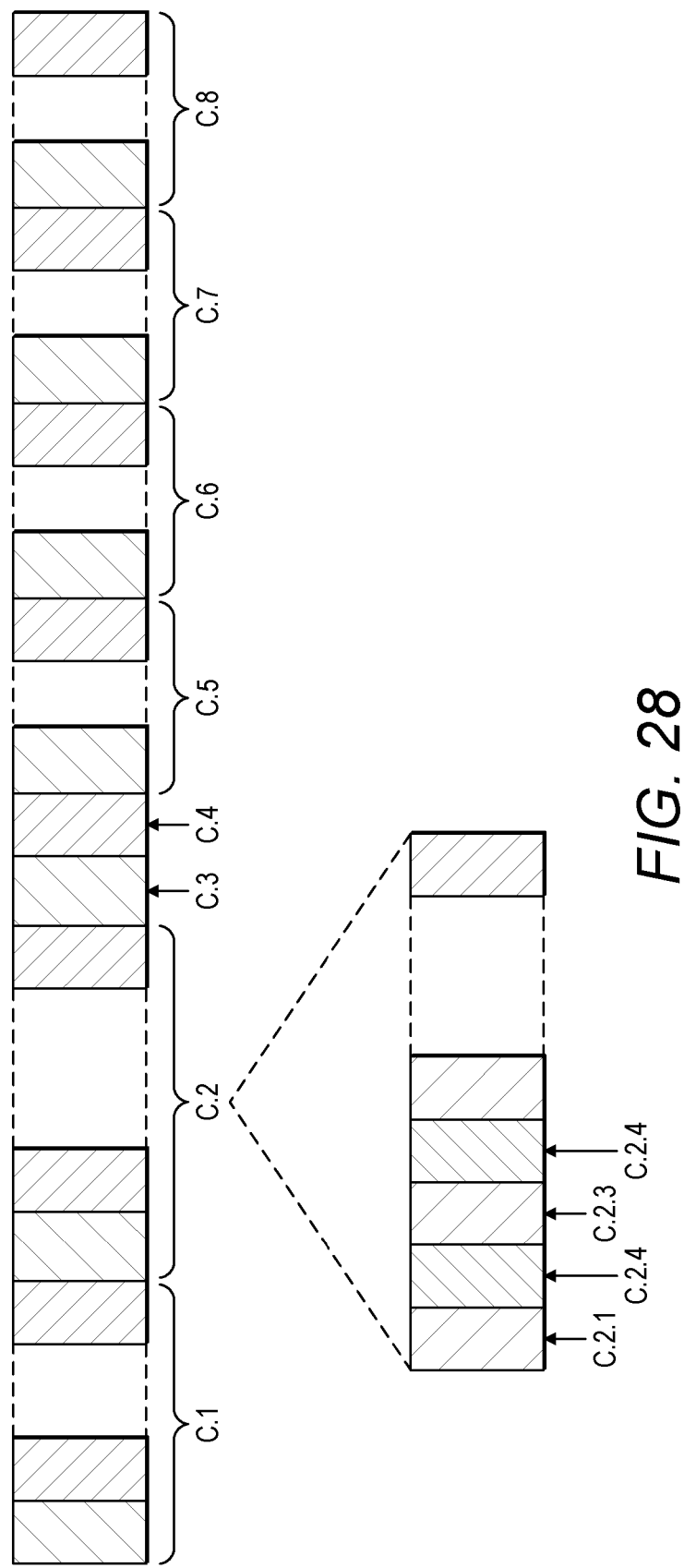
FIG. 28 illustrates a first variable-sized header.

The bytestream may include a first variable-sized header, i.e. a header whose byte/bit length is changeable depending on the data being transmitted within it. The header may include a plurality of fields. FIG. 28 shows an example of said first variable-sized header.

The first variable-sized header may include a first field indicating a size of a field associated with an auxiliary attribute of a tile and/or a tableau (C.1—also described as aux_attribute_sizes: unti16[num_aux_the_attribute+num_aux_tableau_attribute]). In an embodiment, the second field may include a number of sub-fields, each indicating a size for a corresponding auxiliary attribute of a tile and/or a tableau. The number of these sub-fields, and correspondingly the number of auxiliary attributes for a tile and/or a tableau, may be indicated in a field of a different header, for example the fixed header described above, in particular in field B.10. In an embodiment, this first field may include 16 bits (or equivalently 2 bytes) for each of the auxiliary attributes. Since the auxiliary attributes may not be included in the bytestream, this field would allow the encoding/decoding process to define the size of the auxiliary attributes were they to be included in the bytestream. This contrasts, for example, with the attributes (see for example C.2 below) which typically are pre-defined in size and therefore their size does not need to be specified and/or communicated.

A decoding module would obtain said first field from the bytestream and determine, based on a value included in said first field, a size of an auxiliary attribute associated with a tessera, (i.e., either a tile or a tableau). In particular, the decoding module may obtain from said first field in the bytestream, a size of an auxiliary attribute for each of the auxiliary attributes which the decoding module is expecting to decode, for example based on information received separately about the number of auxiliary attributes to be specified. The decoding module may configure the decoding process to read the auxiliary attributes in the bytestream.

The first variable-sized header may include a second field indicating, for each attribute of a tile and/or a tableau, a number of different versions of the respective attribute (C.2—also described as nums_attribute: unti16[4+num_aux_tile_attribute+num_aux_tableau_attribute]). The second field may include a number of sub-fields, each indicating for a corresponding attribute a number of different version of said respective attribute. The number of these sub-fields, and correspondingly the number of standard attributes and auxiliary attributes for a tile and/or a tableau, may be indicated at least in part in a field of a different header, for example the fixed header described above, in particular in field B.10. The attributes may comprise both standard attributes associated with a tile and/or a tableau and the auxiliary attributes as described above. In an embodiment, there are three standard attributes associated with a tile (e.g., Residual Statistics, T-Node Statistics and Quantization Parameters) and two standard attributes associated with a tableau (e.g., Streamlengths Statistics and T-Node Statistics). In an embodiment, since the T-Node Statistics for the tiles and the tableaux may be the same, they may only require to be specified once. In such embodiment, only four different standard attributes will need to be included (and therefore only four sub-fields, C.2.1 to C.2.4, each associated with one of the four standard attributes Residual Statistics, T-Node Statistics, Quantization Parameters and Streamlengths Statistics, are included in the second field, each indicating a number of different versions of the respective attribute). Accordingly, there may be four different sub-fields in said second field, each indicating the number of standard attributes for a tile and/or a tableau which need to be specified for the decoding process. By way of example, if the sub-field associated with the T-Node Statistics indicate a number 20, it means that there will be 20 different available versions of T-Node Statistics to use for tiles and/or attributes.

A decoding module would obtain said second field from the bytestream and determine, based on a value included in said second field, a number of different versions of a respective attribute, said attribute associated with a tile and/or a tableau. The decoding module may configure the decoding process to use the available versions of the corresponding attributes.

The first variable-sized header may include a third field indicating a number of different groupings of tiles, wherein each grouping of tiles is associated with a common attribute (C.3—also described as num_tileset: uint16). In an embodiment, this first field may include 16 bits (or equivalently 2 bytes). In an embodiment, the common attribute may be the T-Node Statistics for a tile. For example, if a grouping of tiles (also known as "tileset") is associated with the same T-node Statistics, it means that all the tiles in that grouping shall be associated with the same T-Node Statistics. The use of grouping of tiles sharing one or more common attributes allows the coding and decoding process to be flexible in terms of specifying multiple versions of a same attribute and associate them with the correct tiles. For example, if a group of tiles belongs to "Group A", and "Group A" is associated with "Attribute A" (for example, a specific T-Node Statistics), then all the tiles in Group A shall use that Attribute A. Similarly, if a group of tiles belongs to "Group B", and "Group B" is associated with "Attribute B" (for example, a specific T-Node Statistics different from that of Group A), then all the tiles in Group B shall use that Attribute B. This is particularly useful in allowing the tiles to be associated with a statistical distribution as close as possible to that of the tile but without having to specify different statistics for every tile. In this way, a balance is reached between optimising the entropy encoding and decoding (optimal encoding and decoding would occur if the distribution associated with the tile is the exact distribution of that tile) whilst minimising the amount of data to be transmitted. Tiles are grouped, and a "common" statistics is used for that group of tiles which is as close as possible to the statistics of the tiles included in that grouping. For example, if we have 256 tiles, in an ideal situation we would need to send 256 different statistics, one for each of the tiles, in order to optimise the entropy encoding and decoding process (an entropy encoder/decoder is more efficient the more the statistical distribution of the encoded/decoded symbols is close to the actual distribution of said symbols). However, sending statistics is impractical and expensive in terms of compression efficiency. So, typical systems would send only one single statistics for all the 256 tiles. However, if the tiles are grouped into a limited number of groupings, for example 10, with each tile in each grouping having similar statistics, then only 10 statistics would need to be sent. In this way, a better encoding/decoding would be achieved than if only one common statistics was to be sent for all the 256 tiles, whilst at the same time sending only 10 statistics and therefore not compromising too much the compression efficiency.

A decoding module would obtain said third field from the bytestream and determine, based on a value included in said third field, a number of different groupings of tiles. The decoding module may configure the decoding process to use, when decoding a tile corresponding to a specific grouping, one or more attributes associated with said grouping.

The first variable-sized header may include a fourth field indicating a number of different groupings of tableaux, wherein each grouping of tableaus is associated with a common attribute (C.4—also described as num_tableauset: uint16). In an embodiment, this fourth field may include 16 bits (or equivalently 2 bytes). This field works and is based on the same principles as the third field, except that in this case it refers to tableaux rather than tiles.

A decoding module would obtain said fourth field from the bytestream and determine, based on a value included in said fourth field, a number of different groupings of tableaux. The decoding module may configure the decoding process to use, when decoding a tableau corresponding to a specific grouping, one or more attributes associated with said grouping.

The first variable-sized header may include a fifth field indicating a width for each of a plurality of planes (C.5—also described as widths: uint16[num_plane]). In an embodiment, this fifth field may include 16 bits (or equivalently 2 bytes) for each of the plurality of planes. A plane is further defined in the present specification, but in general is a grid (usually a two-dimensional one) of elements associated with a specific characteristic, for example in the case of video the characteristics could be luminance, or a specific color (e.g. red, blue or green). The width may correspond to one of the dimensions of a plane. Typically, there are a plurality of planes.

A decoding module would obtain said fifth field from the bytestream and determine, based on a value included in said fifth field, a first dimension associated with a plane of elements (e.g., picture elements, residuals, etc.). This first dimension may be the width of said plane. The decoding module may configure the decoding process to use, when decoding the bytestream, said first dimension in relation to its respective plane.

The first variable-sized header may include a sixth field indicating a width for each of a plurality of planes (C.6—also described as heights: uint16[num_plane]). In an embodiment, this sixth field may include 16 bits (or equivalently 2 bytes) for each of the plurality of planes. The height may correspond to one of the dimensions of a plane.

A decoding module would obtain said sixth field from the bytestream and determine, based on a value included in said sixth field, a second dimension associated with a plane of elements (e.g., picture elements, residuals, etc.). This second dimension may be the height of said plane. The decoding module may configure the decoding process to use, when decoding the bytestream, said second dimension in relation to its respective plane.

The first variable-sized header may include a seventh field indicating a number of encoding/decoding levels for each of a plurality of planes (C.7—also described as num_loqs: uint8[num_plane]). In an embodiment, this seventh field may include 16 bits (or equivalently 2 bytes) for each of the plurality of planes. The encoding/decoding levels correspond to different levels (e.g., different resolutions) within a hierarchical encoding process. The encoding/decoding levels are also referred in the application as Level of Quality A decoding module would obtain said seventh field from the bytestream and determine, based on a value included in said seventh field, a number of encoding levels for each of a plurality of planes (e.g., picture elements, residuals, etc.). The decoding module may configure the decoding process to use, when decoding the bytestream, said number of encoding levels in relation to its respective plane.

The first variable-sized header may include an eighth field containing information about the auxiliary attributes (C.8—also described as aux_header: uint8[aux_header_size]). In an embodiment, this eight field may include a plurality of 8 bits (or equivalently 1 byte) depending on a size specified, for example, in a field of the fixed header (e.g., B.9)

A decoding module would obtain said eighth field from the bytestream and determine information about the auxiliary attributes. The decoding module may configure the decoding process to use, when decoding the bytestream, said information to decode the auxiliary attributes.

Figure 29:
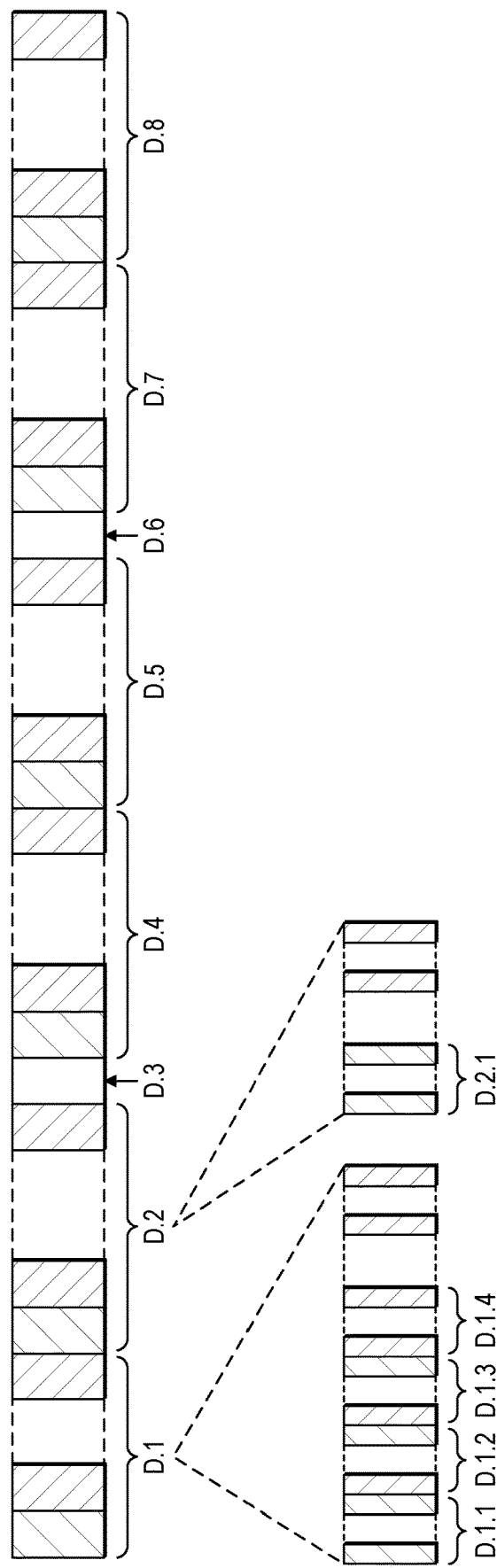
FIG. 29 illustrates a second-variable sized header.

The bytestream may include a second variable-sized header, i.e. a header whose byte/bit length is changeable depending on the data being transmitted within it. The header may include a plurality of fields. FIG. 29 shows an example of said second variable-sized header.

The second variable-sized header may include a first field containing, for each attribute, information about one or more statistics associated with the respective attribute (see D.1). The number of statistics associated with a respective attribute may be derived separately, for example via field C.2 as described above. The statistics may be provided in any form. In an embodiment of the present application, the statistics is provided using a particular set of data information which includes information about a cumulative distribution function (type residual_stat_t).

In particular, a first group of sub-fields in said first field may contain information about one or more statistics associated with residuals values (also D.1.1—also described as residual_stats: residual_stat_t[nums_attribute[0]]). In other words, the statistics may identify how a set of residual data are distributed. The number of statistics included in this first group of sub-fields may be indicated in a separate field, for example in the first sub-field C.2.1 of field C.2 as described above (also indicated as nums_attribute[0]). For example, if nums_attribute[0] is equal to 10, then there would be 10 different residuals statistics contained in said first field. For example, the first 10 sub-fields in the first field correspond to said different 10 residuals statistics.

A second group of sub-fields in said first field may contain information about one or more statistics associated with nodes within a Tessera (also D.1.2—also described as tnode_stats: tnode_stat_t[nums_attribute[1]]). In other words, the statistics may identify how a set of nodes are distributed. The number of statistics included in this second group of sub-fields may be indicated in a separate field, for example in the second sub-field C.2.2 of field C.2 as described above (also indicated as nums_attribute[1]). For example, if nums_attribute[1] is equal to 5, then there would be 5 different t-node statistics contained in said first field. For example, considering the example above, after the first 10 sub-fields in the first field, the next 5 sub-fields correspond to said 5 different t-node statistics.

A third group of sub-fields in said first field may contain information about one or more quantization parameters (also D.1.3—also described as quantization_parameters: quantization_parameters_t[nums_attribute[2]]). The number of quantization parameters included in this third group of sub-fields may be indicated in a separate field, for example in the third sub-field C.2.3 of field C.2 as described above (also indicated as nums_attribute[2]). For example, if nums_attribute[2] is equal to 10, then there would be 10 different quantization parameters contained in said first field. For example, considering the example above, after the first 15 sub-fields in the first field, the next 10 sub-fields correspond to said 10 different quantization parameters.

A fourth group of sub-fields in said first field may contain information about one or more statistics associated with streamlengths (also D.1.4—also described as stream_length_ stats: stream_length_stat_t[nums_attribute[3]]). In other words, the statistics may identify how a set of streamlengths are distributed. The number of statistics included in this fourth group of sub-fields may be indicated in a separate field, for example in the fourth sub-field C.2.4 of field C.2 as described above (also indicated as nums_attribute[3]). For example, if nums_attribute[4] is equal to 12, then there would be 12 different streamlengths statistics contained in said first field. For example, considering the example above, after the first 25 sub-fields in the first field, the next 12 sub-fields correspond to said 12 different streamlengths statistics.

Further groups of sub-fields in said first field may contain information about auxiliary attributes (also described as aux_atttributes: uint1[aux_attributes_size[i]] [num_aux_tile_attribute+num_aux_tableau_attribute]). The number of auxiliary attributes may be indicated in another field, for example in field C.2 as described above.

Specifying one or more versions of the attributes (e.g., statistics) enables flexibility and accuracy in the encoding and decoding process, because for instance more accurate statistics can be specified for a specific grouping of tesserae (tiles and/or tableaux), thus making it possible to encode and/or decode said groupings in a more efficient manner.

A decoding module would obtain said first field from the bytestream and determine, based on the information contained in said first field, one or more attributes to be used during the decoding process. The decoding module may store the decoded one or more attributes for use during the decoding process. The decoding module may, when decoding a set of data (for example, a tile and/or a tableau) and based on an indication of attributes to use in relation to that set of data, retrieve the indicated attributes from the stored decoded one or more attributes and use it in decoding said set of data.

The second variable-sized header may include a second field containing, for each of a plurality of grouping of tiles, an indication of a corresponding set of attributes to use when decoding said grouping (D.2—also described as tilesets: uint16[3+num_aux_tile_attributes] [num_tiles]). The number of groupings of tiles may be indicated in a separate field, for example in field C.3 described above. This second field enables the encoding/decoding process to specify which of the sets of attributes indicated in field D.1 described above is to be used when decoding a tile.

A decoding module would obtain said second field from the bytestream and determine, based on the information contained in said second field, which of a set of attributes is to be used when decoding a respective grouping of tiles. The decoding module would retrieve from a repository storing all the attributes the ones indicated in said second field, and use them when decoding the respective grouping of tiles. The decoding process would repeat said operations when decoding each of the plurality of grouping of tiles.

By way of example, and using the example described above in relation to field D.1, let's assume that for a first grouping of tiles the set of attributes indicated in said second field corresponds to residuals statistics No. 2, t_node statistics No. 1 and to quantization parameter No. 4 (we assume for simplicity that there are no auxiliary attributes). When the receiving module receives said indication, it would retrieve from the stored attributes (as described above) the second residuals statistics from the 10 stored residuals statistics, the first t_node statistics from the 5 stored t_node statistics and the fourth quantization parameter from the 10 stored quantization parameters.

The second variable-sized header may include a fourth field containing, for each of a plurality of grouping of tableaux, an indication of a corresponding set of attributes to use when decoding said grouping (D.4—also described as tableausets: uint16[2+num_aux_tableaux_attributes] [num_tableaux]). The number of groupings of tableaux may be indicated in a separate field, for example in field C.4 described above. This fourth field enables the encoding/decoding process to specify which of the sets of attributes indicated in field D.1 described above is to be used when decoding a tableau.

The principles and operations behind this fourth field corresponds to that described for the second field, with the difference that in this case it applies to tableaux rather than tiles. In particular, a decoding module would obtain said fourth field from the bytestream and determine, based on the information contained in said fourth field, which of a set of attributes is to be used when decoding a respective grouping of tableaux. The decoding module would retrieve from a repository storing all the attributes the ones indicated in said fourth field, and use them when decoding the respective grouping of tableaux. The decoding process would repeat said operations when decoding each of the plurality of grouping of tableaux.

The second variable-sized header may include a fifth field containing, for each plane, each encoding/decoding level and each direction, an indication of a corresponding set of attributes to use when decoding a root tableau (D.5—also described as root tableauset indices: uint16[loq_idx][num_planes][4]). This fifth field enables the encoding/decoding process to specify which of the sets of attributes indicated in field D.1 described above is to be used when decoding a root tableau.

A decoding module would obtain said fifth field from the bytestream and determine, based on the information contained in said fifth field, which of a set of attributes is to be used when decoding a respective root tableau. The decoding module would retrieve from a repository storing all the attributes the ones indicated in said fifth field, and use them when decoding the respective grouping of tiles.

In this way, the decoding module would effectively store all the possible attributes to be used when decoding tiles and/or tableaux associated with that bytestream, and then retrieve for each of a grouping of tiles and/or tableaux only the sub-set of attributes indicated in said second field to decode the respective grouping of tiles and/or tableaux.

The second variable-sized header may include a third field containing information about the statistics of the groupings of tiles (D.3—also described as cdf_tilesets: line_segments_cdf15_t<tilese_index_t>). The statistics may provide information about how many times a certain grouping of tiles occurs. The statistics may be provided in the form of a cumulative distribution function. In the present application, the way the cumulative distribution function is provided is identified as a function type, specifically type line_segments_cdf15_t<x_axis_type>. By using said statistics, the encoding/decoding process is enabled to compress the information about the grouping of tiles (e.g., the indices of tiles) and therefore optimise the process. For example, if there are N different groupings of tiles, and correspondingly N different indexes, rather than transmitting these indexes in an uncompressed manner, which would require $2^{\lceil log_2 N \rceil}$ bits (where $\lceil . \rceil$ is a ceiling function), the grouping can be compressed using an entropy encoder thus reducing significantly the number of bits required to communicate the groupings of tiles. This may represent a significant savings. For example, assume that there are 10,000 tiles encoded in the bytestream, and that these tiles are divided in 100 groupings. Without compressing the indexes, an index needs to be sent together with each tile, meaning that at least $2^{\lceil log_2 100 \rceil}=7$ bits per tile, which means a total of 70,000 bits. If instead the indexes are compressed using an entropy encoder to an average of 1.5 bits per index, the total number of bits to be used would be 15,000, reducing the number of bits to be used by almost 80%.

A decoding module would obtain said third field from the bytestream and determine, based on the information contained in said third field, statistical information about the groupings of tiles. The decoding module would use said statistical information when deriving which grouping a tile belongs to. For example, the information about the tile grouping (e.g., tileset index) can be compressed using said statistics and then reconstructed at the decoder using the same statistics, for example using an entropy decoder.

The second variable-sized header may include a sixth field containing information about the statistics of the groupings of tableaux (D.6—also described as cdf_tableausets: line_segments_cdf15_t<tableauset_index_t>). The statistics may provide information about how many times a certain grouping of tableaux occurs. The statistics may be provided in the form of a cumulative distribution function.

This field works in exactly the same manner as the third field but for grouping of tableaux rather than grouping of tiles. In particular, a decoding module would obtain said sixth field from the bytestream and determine, based on the information contained in said sixth field, statistical information about the groupings of tableaux. The decoding module would use said statistical information when delving which grouping a tableau belongs to. For example, the information about the tableau grouping (e.g., tableauset index) can be compressed using said statistics and then reconstructed at the decoder using the same statistics, for example using an entropy decoder.

The second variable-sized header may include a seventh field containing, for each plane, each encoding/decoding level and each direction, an indication of a location, within a payload of the bytestream, of one or more sub-streams (e.g., a Surface) of bytes associated for that respective plane, encoding/decoding level and direction (D.7—also described as root_stream_offsets: root_stream_offset_t[loq_idx][num_planes][4]). The location may be indicated as an offset with respect to the start of the payload. By way of example, assuming 3 planes, 3 encoding/decoding levels and 4 directions, there will be 3*3*4=36 different sub-streams, and correspondingly there will be 36 different indication of locations (e.g., offsets).

A decoding module would obtain said seventh field from the bytestream and determine, based on the information contained in said seventh field, where to find in the payload a specific sub-stream. The sub-stream may be associated with a specific direction contained in a specific plane which is within a specific encoding/decoding level. The decoding module would use said information to locate the sub-stream and decode said sub-stream accordingly. The decoding module may implement, based on this information, decoding of the various sub-stream simultaneously and/or in parallel. This can be advantageous for at least two reasons. First, it would allow flexibility in ordering of the sub-streams. The decoder could reconstruct, based on the location of the sub-streams, to which direction, plane and encoding/decoding level the sub-stream belongs to, without the need for that order to be fixed. Second, it would enable the decoder to decode the sub-streams independently from one another as effectively each sub-stream is separate from the others.

The second variable-sized header may include an eighth field containing, for each plane, each encoding/decoding level and each direction, a size of the Stream of bytes associated with the root tableau (D.8—also described as root_stream_lengths: root_stream_length_t[loq_idx][num_planes][4]).

A decoding module would obtain said eighth field from the bytestream and determine, based on the information contained in said eighth field, the length of a stream associated with a root tableau.

It has been described above how technique described may allow for the encoding and/or decoding process to be parallelised and allow for random access. The following sets out a summary, non-limiting example of several concepts described above.

In particular, as discussed in this application and other applications by the same applicant such as the above-mentioned European patent application No. 17386045.3, one of the basic building blocks of the encoding/decoding scheme is the structure called tessera. A tessera is an individual structure that can be processed independently from others. Since tesserae are independent structures, they can be encoded and decoded separately and in parallel. The portion of the bytestream that is associated with the tessera is called a "stream" in the present application. When the decoding module receives the bytestream, in order to being able to parallelise the decoding of the streams, it would need to know where the streams are located within the bytestream. This information is delivered to the decoding module via the streamlengths, i.e. that information that explains how long a stream is. Accordingly, when the decoding module receives the bytestream, it derives information about the length of the streams (e.g., the streamlength) and, using said information, separates the bytestream into streams. The decoding module then may decode the streams independently and in parallel, for example by implementing a different decoding instance and/or process for each of the streams. In particular, the decoding module may derive (for each Surface) streamlength for the Root Tableau Tier from stream offsets, decode the Root Tableau Tier and derive, from the info indicated by said Root Tableau Tier, the streamlengths for the Tier immediately above it. The process continues until the decoding module decodes the Tiles. As it can be understood, the Tiles can be decoded only once the streamlength of their streams has been provided from decoding a required Tableau in the previous Tier. For this reason, every Tessera in the previous Tiers must be decoded before a Tile of the associated Surface can be decoded. Note that, although there is a dependency between Tiers in a specific Surface, each tessera in a given Tier can in principle be decoded independently of all other tesserae in the same Tier, and therefore parallel processing can be implemented within a Tier.

In a specific embodiment, streamlengths are carried on leaves of Tableaux as relative differences rather than absolute values (i.e., for a first tessera a first streamlength corresponding to it is indicated in full, then for the second tessera it is indicated a difference between the streamlength of the second tessera and the streamlength of the first tessera, and so on). This allows compression to be optimized on the basis that The Shannon Entropy of relative differences will be smaller than that of raw streamlengths. The same idea can be used when encoding tileset indices or treeset indices, with the added flexibility that the encoder can also optimise the numerical ordering of tilesets and treesets to minimise the entropy of their corresponding indices.

Note that the location (or offset) within the bytestream where the individual "streams" start from is obtained as the cumulative sum of consecutive streamlengths. There are known massively parallel algorithms of calculating such a cumulative sum, most under the names of exclusive prefix sum or scan.

In addition, as the encoding process is a Tier-by-Tier process encoding individual streams, the encoding process also creates supplemental data of streamlengths that it can take as the input of encoding for the next Tier of encoding, and such recursive process continues until only one stream remain. From this point of view, the encoding process is a parallel reduction.

For example, assume the decoding module has derived the streamlength of four consecutive streams as 3, 4, 6, and 3 bits. The decoding module could then identify that the portion of the bytestream from the first bit to the third bit corresponds to the first stream (and therefore the first tessera), the portion of the bytestream from the fourth bit to the seventh bit corresponds to the second stream (and therefore the second tessera), the portion of the bytestream from the eighth bit to the thirteenth bit corresponds to the third stream (and therefore the third tessera) and the portion of the bytestream from the fourteenth bit to the sixteenth bit corresponds to the fourth stream (and therefore the fourth tessera).

It will be clear to one skilled in the art how techniques described herein may be embodied within a system comprising an encoder and a decoder. At the decoder, the encoded data set may be retrieved from a data store or received from a streaming server. In such a further embodiment, one or more streaming server(s) may be connected to a plurality of client devices. At the streaming server, the encoder may receive and encode a video or image stream and deliver the stream (e.g. bytestream or bitstream used interchangeably) to the client devices. Thus the stream can be decoded by a decoder to recreate the information that has been comprised. Any suitable mechanism to deliver the stream may be used, such as unicast or multicast, as would be well-known to the skilled person.

Techniques described here may be suitable for the encoding, decoding and reconstruction of any dimension array of data. However, although the techniques are also applicable to linear data, they are most beneficial for image or video reconstruction. In the case of a picture or video, the data could be values associated with a colour space (e.g., the value of a red component in an RGB colour space, or the value of a Y component in a YUV colour space, etc.), or alternatively the data could be residual data (whether transformed or not) or metadata used to decode a bytestream or bitstream. Residuals are further defined in the present application, but in general residuals refer to a difference between a value of a reference array and an actual array of data. Thus, the techniques are most suitable for any plane of data.

It should be noted that techniques described in the above examples are agnostic as to the meaning or use of the decoded array. Of course, the data set may be used to reconstruct a larger dataset by combining multiple decoded data. Once recreated the data may represent any information which has been compressed, such as an image or sonogram. As will be understood from the following described examples, encoding and decoding techniques wherein a quantity of data to be compressed and transmitted or stored by way of a scheme involving encoding the data in a hierarchy of data structures from which the original data can be reconstructed are especially suitable for use with the invention.

At both the encoder and decoder, for example implemented in a streaming server or client device or client device decoding from a data store, methods and processes described herein can be embodied as code (e.g., software code) and/or data. The encoder and decoder may be implemented in hardware or software as is well-known in the art of data compression. For example, hardware acceleration using a specifically programed GPU or a specifically designed FPGA may provide certain efficiencies. For completeness, such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system).

Generally, any of the functionality described in this text or illustrated in the figures can be implemented using software, firmware (e.g., fixed logic circuitry), programmable or non-programmable hardware, or a combination of these implementations. The terms "component" or "function" as used herein generally represents software, firmware, hardware or a combination of these. For instance, in the case of a software implementation, the terms "component" or "function" may refer to program code that performs specified tasks when executed on a processing device or devices. The illustrated separation of components and functions into distinct units may reflect any actual or conceptual physical grouping and allocation of such software and/or hardware and tasks.

The invention claimed is:

1. A method of decoding a received set of encoded data representing information that has been compressed, wherein the encoded data set is divided into a hierarchy of subsets, the method comprising:
    obtaining, from at least one first subset, a respective set of offset values;
    decoding a plurality of second subsets, each comprising a data structure of metadata and data, to derive a series of data values, wherein each second subset corresponds to a region of the information that has been compressed,
    wherein each offset value is associated with a second subset and indicates a relative position within the encoded data set that corresponds to the earliest element of the associated second subset with respect to the position within the encoded data set that corresponds to an element of another subset of the hierarchy of subsets,
    wherein the decoding the plurality of second subsets includes identifying for each second subset, based on the set of offset values, the position within the encoded data that corresponds to the earliest element of the second subset;
    wherein the relative position indicated by each offset value corresponds to the earliest element of the associated second subset with respect to the position within the encoded data set that corresponds to the earliest element of the other subset, and
    reconstructing the information that has been compressed from the data values.

2. A method according to claim 1, wherein an offset value indicates said relative position by way of comprising a value representing a difference between:
    a value indicating a relative position within the encoded data set that corresponds to the earliest element of the associated second subset with respect to the position within the encoded data set that corresponds to the earliest element of said other subset, and
    a value indicating a relative position within the encoded data set that corresponds to the earliest element of said other subset with respect to the position within the encoded data set that corresponds to the earliest element of a further subset.

3. A method according to claim 1, wherein the identifying the position of a second subset comprises calculating the position as a sum of obtained offset values.

4. A method according to claim 3, wherein the obtained offset values are arranged as a series, and wherein the identifying the position of a second subset comprises calculating a sum of the offset values in the series preceding and including an offset value associated with the second subset.

5. A method according to claim 1, wherein decoding two or more of the plurality of second subsets is performed in parallel in accordance with the identified positions.

6. A method according to claim 5, wherein the decoding in parallel is performed by way of locating the first element of each of the plurality of second subsets prior to the decoding of a first of the plurality being completed.

7. A method according to claim 1, wherein if a first subset contains information indicating a relative position within the encoded data set that corresponds to the earliest element of a second subset with respect to the position within the encoded data set that corresponds to the latest element of that first subset,
the obtaining an offset value from said information is performed in accordance with a predetermined value indicating a relative position that corresponds to the earliest element of said first subset with respect to the position that corresponds to said latest element of said first subset.

8. A method according to claim 1, wherein decoding two or more of the plurality of second subsets is performed sequentially, and wherein a first one of the set of offset values that corresponds to a first one of said two or more second subsets that is to be decoded earlier than a second one of said two or more second subsets is lower than a second one of the set of offset values that corresponds to the second one of said two or more second subsets.

9. A method according to claim 1, further comprising decoding the at least one first subset to derive a series of data values, wherein each first subset corresponds to a region of the information that has been compressed.

10. A method according to claim 1, comprising, if an offset value indicates a difference of zero between the position within the encoded data set that corresponds to the earliest element of an associated second subset and the position within the encoded data set that corresponds to the earliest element of another subset, determining that the associated second subset does not exist in the set.

11. A method according to claim 1, comprising, if an offset value indicates a difference of zero between the position within the encoded data set that corresponds to the earliest element of an associated second subset and the position within the encoded data set that corresponds to the earliest element of another subset, determining that the associated second subset is a duplicate of the other subset.

12. A method according to claim 1, wherein the information that has been compressed is split into a plurality of blocks of data elements, and wherein each second subset corresponds to a region of the information that has been compressed in that it represents one or more of said blocks.

13. A method according to claim 1, wherein the encoded data set includes one or more data elements that are not comprised by a subset and are situated between a position that corresponds to the earliest element of a subset and a position that corresponds to the earliest element of another subset.

14. A method according to claim 1, wherein at least two of the subsets are adjacent in the encoded data set such that no data elements are situated between them.

15. A method according to claim 1, further comprising: decoding a plurality of third subsets, each comprising a data structure of metadata and data, to derive a series of data values, wherein each third subset corresponds to a region of the information that has been compressed,
wherein an offset value indicates a relative position within the encoded data set that corresponds to the earliest element of an associated third subset with respect to the position within the encoded data set that corresponds to the earliest element of another subset,
and wherein the decoding the plurality of third subsets includes identifying for each third subset, based on the set of offset values, the position within the encoded data that corresponds to the earliest element of the third subset; and
reconstructing the information that has been compressed from the data values.

16. A method according to claim 15, wherein the identifying the position of a third subset comprises calculating the position as a sum of offset values obtained from the at least one first subset and, where the method further comprises obtaining a respective set of offset values from at least one of the second subsets, of offset values obtained from said at least one second subsets.

17. A method according to claim 16, wherein the obtained offset values are arranged as a series of offset values, and wherein the identifying the position of a second subset comprises calculating a sum of the offset values in the series preceding and including an offset value associated with the second subset.

18. A decoder apparatus configured to decode a received set of encoded data representing information that has been compressed, wherein the encoded data set is divided into a hierarchy of subsets, wherein the decoder apparatus is configured to:
obtain, from at least one first subset, a respective set of offset values;
decode a plurality of second subsets, each comprising a data structure of metadata and data, to derive a series of data values, wherein each second subset corresponds to a region of the information that has been compressed,
wherein each offset value is associated with a second subset and indicates a relative position within the encoded data set that corresponds to the earliest element of the associated second subset with respect to the position within the encoded data set that corresponds to an element of another subset of the hierarchy of subsets,
wherein the decoding the plurality of second subsets includes identifying for each second subset, based on the set of offset values, the position within the encoded data that corresponds to the earliest element of the second subset;
wherein the relative position indicated by each offset value corresponds to the earliest element of the associated second subset with respect to the position within the encoded data set that corresponds to the earliest element of the other subset, and
reconstruct the information that has been compressed from the data values.

19. A non-transitory computer readable storage medium having stored thereon program code which when executed by a processor cause the processor to decode a received set of encoded data representing information that has been compressed, wherein the encoded data set is divided into a hierarchy of subsets, wherein the program code when executed by the processor causes the processor to:
obtain, from at least one first subset, a respective set of offset values;

decode a plurality of second subsets, each comprising a data structure of metadata and data, to derive a series of data values, wherein each second subset corresponds to a region of the information that has been compressed, wherein each offset value is associated with a second subset and indicates a relative position within the encoded data set that corresponds to the earliest element of the associated second subset with respect to the position within the encoded data set that corresponds to an element of another subset of the hierarchy of subsets, wherein the decoding the plurality of second subsets includes identifying for each second subset, based on the set of offset values, the position within the encoded data that corresponds to the earliest element of the second subset;

wherein the relative position indicated by each offset value corresponds to the earliest element of the associated second subset with respect to the position within the encoded data set that corresponds to the earliest element of the other subset, and reconstruct the information that has been compressed from the data values.

\* \* \* \* \*